(12) United States Patent
Jørgensen et al.

(10) Patent No.: US 11,498,314 B2
(45) Date of Patent: Nov. 15, 2022

(54) VIG UNIT LAMINATION

(71) Applicant: VKR Holding A/S, Hørsholm (DK)

(72) Inventors: Kristian Damholdt Jørgensen, Hørsholm (DK); Thomas Villiam Sejer Mikkelsen, Hørsholm (DK); Karsten Hansgaard Nielsen, Hørsholm (DK); Thomas Lind Madsen, Hørsholm (DK); Henrik Aslak Jensen, Hørsholm (DK); Willibrordus Servatius Bouwens, Hørsholm (DK)

(73) Assignee: VKR HOLDING A/S, Horsholm (DK)

( * ) Notice: Subject to any disclaimer, the term of this patent is extended or adjusted under 35 U.S.C. 154(b) by 227 days.

(21) Appl. No.: 17/057,752

(22) PCT Filed: May 24, 2019

(86) PCT No.: PCT/EP2019/063495
§ 371 (c)(1),
(2) Date: Nov. 23, 2020

(87) PCT Pub. No.: WO2019/224363
PCT Pub. Date: Nov. 28, 2019

(65) Prior Publication Data
US 2021/0197533 A1    Jul. 1, 2021

(30) Foreign Application Priority Data

May 24, 2018   (DK) .............................. PA201870312
Jun. 28, 2018   (DK) .............................. PA201870446

(51) Int. Cl.
*B32B 17/10*   (2006.01)
*B32B 3/10*   (2006.01)
(Continued)

(52) U.S. Cl.
CPC .......... *B32B 17/10871* (2013.01); *B32B 3/10* (2013.01); *B32B 17/10055* (2013.01);
(Continued)

(58) Field of Classification Search
CPC ................................................ B32B 17/10871
See application file for complete search history.

(56) References Cited

U.S. PATENT DOCUMENTS 5,087,502 A   2/1992   Esposito
5,812,332 A   9/1998   Freeman
(Continued)

FOREIGN PATENT DOCUMENTS

CN         2835403 Y    11/2006
CN       202164971 U     3/2012
(Continued)

OTHER PUBLICATIONS

Machine translation of applicant cited CN 206418926 (Year: 2017).
(Continued)

*Primary Examiner* — Scott W Dodds
(74) *Attorney, Agent, or Firm* — Cantor Colburn LLP

(57) ABSTRACT

The present disclosure relates to a method of providing a laminated vacuum insulated glass (VIG) unit (1), wherein the method comprises: providing a lamination assembly (10) comprising a vacuum insulated glass (VIG) unit (11) comprising at least two glass sheets (11a, 11b) separated by a plurality of support structures (12) distributed in a gap (13) between the glass sheets (11a, 11b), and a lamination layer (2) arranged between one of the glass sheets (11a, 11b) of the vacuum insulated glass (VIG) unit (11) and a further sheet (3). The further sheet (3) may be subjected to a first heating temperature (T1) by means of a first heating arrangement (9a), and the glass sheet (11a) of the vacuum insulated glass (VIG) unit (11) facing away from the further sheet (3) may
(Continued)

Figure 1:
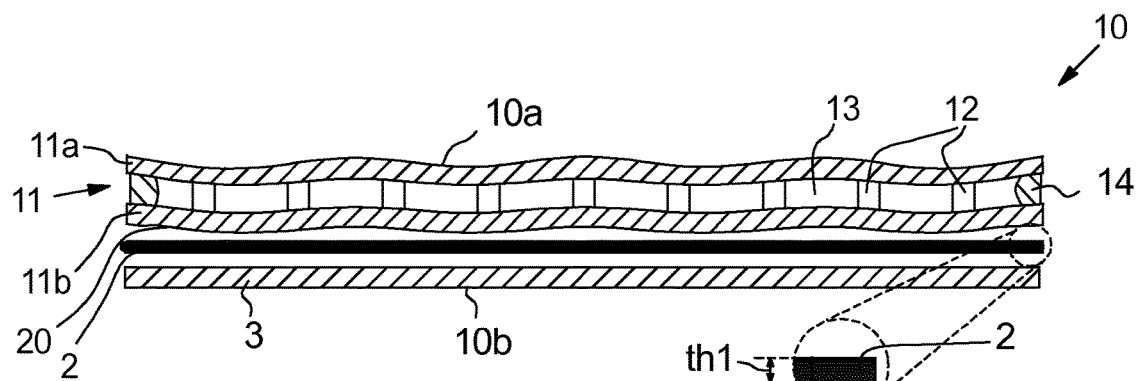

be subjected to a second heating temperature (T2) by means of a second heating arrangement (9b), wherein the first heating temperature (T1) is higher than the second heating temperature (T2). The disclosure additionally relates to a system (100) for providing laminated vacuum insulated glass (VIG) units (1), and use of such a system.

19 Claims, 20 Drawing Sheets

(51) Int. Cl.
- B32B 37/06 (2006.01)
- B32B 37/08 (2006.01)
- B32B 41/00 (2006.01)
- E06B 3/66 (2006.01)
- E06B 3/673 (2006.01)
- B32B 37/00 (2006.01)
- C03C 27/06 (2006.01)
- B32B 38/00 (2006.01)

(52) U.S. Cl.
CPC .. *B32B 17/10091* (2013.01); *B32B 17/10174* (2013.01); *B32B 17/10302* (2013.01); *B32B 17/10743* (2013.01); *B32B 17/10788* (2013.01); *B32B 37/0046* (2013.01); *B32B 37/06* (2013.01); *B32B 37/08* (2013.01); *B32B 38/0036* (2013.01); *B32B 41/00* (2013.01); *C03C 27/06* (2013.01); *E06B 3/6612* (2013.01); *E06B 3/673* (2013.01); *E06B 3/6736* (2013.01); *B32B 2307/304* (2013.01); *B32B 2307/412* (2013.01); *B32B 2315/08* (2013.01); *B32B 2419/00* (2013.01)

(56) References Cited

U.S. PATENT DOCUMENTS

| | | |
|---|---|---|
| 6,071,575 A | 6/2000 | Collins |
| 2006/0154005 A1 | 7/2006 | Misonou |
| 2007/0034317 A1* | 2/2007 | Sklyarevich ............ B32B 37/06 |
| | | 156/380.9 |
| 2012/0210750 A1 | 8/2012 | Cooper |
| 2018/0238104 A1* | 8/2018 | Mikkelsen ............ E06B 3/6736 |

FOREIGN PATENT DOCUMENTS

| | | |
|---|---|---|
| CN | 103359956 A | 10/2013 |
| CN | 206418926 U | 8/2017 |
| EP | 1544180 A1 | 6/2005 |
| EP | 1923921 A2 | 5/2008 |
| JP | 2002326843 A | 11/2002 |
| JP | 2004323317 A | 11/2004 |
| KR | 20140032367 A | 3/2014 |
| WO | 2005000762 A1 | 1/2005 |
| WO | 2010011742 A1 | 1/2010 |
| WO | 2012157616 A1 | 11/2012 |
| WO | 2017210701 A1 | 12/2017 |

OTHER PUBLICATIONS

International Search Report for corresponding application PCT/EP2019/063477 filed May 24, 2019; dated Sep. 30, 2019.
International Search Report for corresponding application PCT/EP2019/063486 filed May 24, 2019; dated Sep. 30, 2019.
International Search Report for corresponding application PCT/EP2019/063491 filed May 24, 2019; dated Sep. 30, 2019.
International Search Report for corresponding application PCT/EP2019/063495 filed May 24, 2019; dated Sep. 30, 2019.

* cited by examiner

VIG UNIT LAMINATION

The present disclosure relates to methods of laminating vacuum insulated glass units, a system for providing laminated vacuum insulated glass units and use of such a system.

BACKGROUND

A desire to laminate vacuum insulated glass (VIG) units is present to for example improve safety in case a glass sheet of the VIG unit breaks. A VIG unit may comprise glass sheets kept separated by support structures arranged in an airtight and evacuated gap between the glass sheets.

CN103359956 A discloses an autoclave based VIG lamination solution. US2006/0154005, U.S. Pat. No. 6,071,575 and JP 2004-323317 discloses further solutions for laminating VIG units.

It has however shown that issues relating to laminating VIG units may occur. The present disclosure may e.g. relate to providing an improved solution for laminating VIG units such as VIG units for covering apertures in buildings and/or for other purposes.

SUMMARY

The present inventors have seen indications that a control of the heating of the glass sheets of a VIG unit comprising glass sheets enclosing an evacuated gap may be advantageous in order to control a thermal deflection of the VIG unit of a lamination assembly, such as to avoid a too large thermal deflection of the VIG unit of the assembly during lamination. The inventors have seen indications that an uneven heating of the glass sheets of the VIG unit may cause a thermal deflection of the VIG unit that may provide the risk of damaging or even breaking the VIG unit, e.g. at or near the edge sealing of the VIG unit during a lamination process. The thermal deflection may be caused by the properties of an edge sealing connecting the glass sheets of the VIG unit and enclosing the evacuated gap. Such a VIG unit edge sealing may be made from a glass material such as a solder glass material or another suitable type of edge sealing material such as a metal solder which may be very rigid. A matching of/to the thermal expansion coefficient of the VIG unit glass sheets may thus provide that the edge sealing is not damaged or broken. However, the further sheet and the lamination layer may provide a delay in the temperature elevation of the glass sheet of the VIG facing the lamination layer, as the heat needs to be transferred through these to the VIG unit.

The present disclosure may relate to a method of providing a laminated vacuum insulated glass (VIG) unit. The method comprises:

providing a lamination assembly comprising
a vacuum insulated glass (VIG) unit comprising at least two glass sheets separated by a plurality of support structures distributed in a gap between the glass sheets, and
a lamination layer arranged between one of the glass sheets of the vacuum insulated glass (VIG) unit and a further sheet,
the further sheet may be subjected to a first heating temperature by means of a first heating arrangement, and the glass sheet of the vacuum insulated glass (VIG) unit facing away from the further sheet may be subjected to a second heating temperature by means of a second heating arrangement. The first heating temperature may be higher than the second heating temperature.

This may be especially advantageous when laminating VIG units where the heat capacity at the different sides of the VIG unit is different, for example if one side of the VIG unit is provided with the lamination layer and the further sheet while the other side is maintained un-laminated, or may be provided with a layer having a lower heat capacity.

The present disclosure may thus e.g. provide a solution where a thermally asymmetric and/or thermal delay may be provided at the outer, major surfaces of the lamination assembly during the heating in order to control the thermal deflection of the VIG unit, and hence help to e.g. avoid damaging the VIG unit during or due to the lamination, as the temperature of the VIG unit glass sheets may be maintained at a desired temperature range. It may also help to provide an enhanced VIG unit lamination quality.

The different temperatures may e.g. also help to provide a solution where an increased heat flux to the further sheet and the lamination layer may be provided compared to the heat flux provided to the VIG unit glass sheet facing away from the further sheet, while avoiding a too large temperature difference between the glass sheets during the lamination. This may help to speed up the heating process.

The heating by the first and second heating temperatures may thus in one or more aspects of the present disclosure be adapted in order to provide a substantially equal temperature (or a temperature difference below a desired value such as below 65° C. such as below 45° C., for example below 20° C.) or below 10° C.) of the glass sheets of the VIG unit at the same point in time during the heating to provide the lamination process. In further aspects, a certain deflection may be taken up by a resilient layer as e.g described in more details later on.

It is understood that said first heating temperature is higher than the second temperature at the same point in time. This may be provided in the start, the middle and/or the end of the heating process, or through substantially the entire heating process.

In one or more aspects of the present disclosure, the initial heating temperature at the outwardly facing major surface of the further sheet may be higher than the initial heating temperature subjected to the major surface of the glass sheet of the vacuum insulated glass (VIG) unit facing away from the further sheet.

This may e.g. help to maintain an equal heating of the VIG glass sheets during the lamination process while taking the larger heat capacity provided by the lamination layer and the further sheet into account, and also providing a fast heating of the major surfaces of the lamination assembly.

In one or more aspects of the present disclosure, a start of the heating of the major surface of the glass sheet of the vacuum insulated glass (VIG) unit facing away from the further sheet may be time delayed compared to the start of the heating at the outwardly facing major surface of the further sheet, thereby providing that said first heating temperature is higher than the second heating temperature.

This may e.g. help to provide that said first temperature is higher than the second temperature, as the lamination layer and further sheet may initially be increased in temperature before the heating is provided at the other side of the VIG unit.

It is understood that the time delay may provide that the lamination assembly is subjected to different temperatures at the same point in time at the oppositely directed outer major surfaces of the lamination assembly, which may enable an adaption of the heating of the lamination assembly to varying heat capacity characteristics at the different sides of the VIG unit to be laminated.

The outer major surface of the lamination assembly facing away from the further sheet may be a major surface of the VIG unit.

In aspects of the present disclosure, said further sheet may be heated by means of conduction heating, and also, the sheet of the vacuum insulated glass unit facing away from the further sheet may be heated by means of conduction heating. In further aspects of the present disclosure, other heating solutions, such as controlled, e.g. forced convection heating may be used for heating e.g. the glass sheet of the vacuum insulated glass unit facing away from the further sheet.

Said time delay may in further aspects provide a delayed heating such as conduction heating at the major surface of the vacuum insulated glass unit facing away from the further sheet.

This may provide that the first temperature is higher than the second temperature, as the surface facing away from the further sheet may not be heated or merely heated by radiation heating and/or natural convection heating until the delayed conduction heating is initiated at this surface.

In one or more aspects of the present disclosure, the heating temperature at the outwardly facing major surface of the further sheet is gradually increased, and wherein the heating temperature subjected to the major surface of the glass sheet of the vacuum insulated glass (VIG) unit facing away from the further sheet is gradually increased at a slower rate than said first heating temperature.

In one or more aspects of the present disclosure, said temperature difference between the first heating temperature and the second heating temperature may be caused by a differences in heat transmissivity between the first heating arrangement and the further sheet, and the heat transmissivity between the second heating arrangement and the glass sheet of the vacuum insulated glass unit facing away from the further sheet, respectively.

This may e.g. be caused by that the further sheet may be heated by conduction heating by the first heating arrangement, whereas the surface of the glass sheet of the vacuum insulated glass (VIG) unit facing away from the further sheet may initially not be heated by conduction heating. For example, if the lamination assembly is arranged between two clamping surfaces, the lamination assembly may initially only be conduction heated by supporting on one of these clamping surfaces. Thus, the other clamping surface may be arranged with a distance to the other outer surface of the lamination assembly, thereby creating an air gap between the clamping surface and that lamination assembly surface. This will provide a thermal boundary layer, and hence a natural convection heating and e.g. also radiation heating may be the only heating for heating that surface. Accordingly, the lamination assembly will experience that the first heating temperature is higher than the second heating temperature, at least until the distance between the surface of the lamination assembly facing away from the further sheet and the clamping surface is reduced to provide conduction heating to both surfaces of the lamination assembly.

In one or more aspects of the present disclosure, the outer major surfaces of the lamination assembly may be heated according to different heating profiles. This may e.g. provide that the lamination assembly may experience that said first heating temperature may be higher than the second heating temperature during at least a part of the heating process. In one or more aspects of the present disclosure, the first temperature and the second temperature may be configured follow different heating profiles.

Generally, the different heating profiles may e.g. be obtained by a time delay in start of the heating provided at the different outer surfaces of the lamination assembly, it may comprise different temperature regulations during the heating, it may comprise that the heating at one of the surfaces is stopped and/or started at different time points compared to the heating at the other major surface of the lamination assembly, and/or the like. It may also or alternatively comprise switching from subjecting a lamination assembly surface to convection heating and/or radiation heating and to utilizing conduction heating at that surface so as to change heat transmissivity and/or the like.

These different heating profiles may help to ensure that a different amount of heat energy is transferred to the different major surfaces of the VIG unit while being able to control the thermal deflection of the VIG unit.

In one or more aspects of the present disclosure, $dT1/dt > dT2/dt$ during the lamination process and determined at the same point in time, where T1 is said first temperature and T2 is said second temperature.

In one or more aspects of the present disclosure, the first and/or second heating arrangement may comprise one or more electrical heaters and/or one or more heating arrangements configured to provide heating by means of a fluid such as a liquid, such as water or an oil.

The heating provided by the heating arrangements may hence be transferred to provide a conduction heating of the lamination assembly's outer major surfaces.

In one or more aspects of the present disclosure, the temperature difference between the first and second temperature may be caused at least partly by different temperature settings of the first and second heating arrangements.

In further aspects, the temperature settings of the heating arrangements may be substantially the same, e.g. within 10 or 20° C., and the temperature difference may mainly be provided by a delayed conduction heating of the outer major surface facing away from the further sheet.

In one or more aspects of the present disclosure, more thermal heat energy may be provided to one of the other major surfaces of the lamination assembly by means of one of said heating arrangements than the amount of thermal energy provided to heat the other outer, major surface of the lamination assembly by means of the other of said heating arrangements during said heating process. This may e.g. help to adapt the heating process to the constitution of the lamination assembly given e.g. by different heat capacities at the different sides of the VIG unit and hence e.g. avoid or control a thermal deflection of the VIG unit and/or help to provide a faster lamination process.

For example, in one or more aspects of the present disclosure, more thermal heat energy may be provided to the further sheet by means of one of said heating arrangements than the amount of thermal energy provided to heat the outer, major surface of the glass sheet of the vacuum insulated glass (VIG) unit facing away from the further sheet and the lamination layer by means of the other of said heating arrangements during said heating process. This may be relevant in for example a lamination assembly where only one of the VIG unit's surfaces is to be attached to a further glass sheet by a lamination layer, or if e.g. different lamination solutions are used for the different major surfaces of the VIG unit.

This control of the thermal energy supplied may be provided by using different heating solutions, by providing different heating temperatures and/or different heating times (such as conduction heating times) for the respective outer surfaces of the lamination assembly (e.g. caused by a heating time delay of one of the surfaces).

This may e.g. be determined by calculating, measuring and/or estimating the amount of heat energy provided to the further sheet, and the amount of heating energy provided to the glass sheet of the VIG unit facing away from the further sheet during a lamination process, and based thereon determining whether the amount of heat energy provided to the further sheet s higher than the amount of heat energy provided to the glass sheet of the VIG unit facing away from the further sheet.

In the event that the heating is provided by a heated fluid such as a liquid, it may e.g. be determined by measuring the accumulated heat energy disposed in the lamination assembly during the lamination process. This may e.g. be provided by measuring the entering temperature and exit temperature of the heated fluid and based thereon calculating the heat energy provided to the lamination assembly e.g. by an integration over the manufacturing time.

If the heating is provide by one or more electrical heaters, it may be measured by measuring the electric current supplied to the heating arrangement(s) for providing the heating in the lamination process, Based thereon the amount of electrical power in e.g. Watt [J/sek] provided to the different major surfaces of the lamination assembly during the lamination process may be determined, e.g. by an integration over the manufacturing time for the lamination of the VIG assembly.

The term "heating process" (may also be referred to as heating step) refers to the heating so as to soften the lamination layer to a desired extent, and it may be determined from the moment a heating by one or more heating arrangements is started at one of the lamination assembly's outer major surfaces, and until the heating is stopped, e.g. by removing the lamination assembly from the heating arrangement.

In one or more aspects of the present disclosure, the amount of thermal energy provided to the further sheet may be at least 1.5 times, such as at least 2 times, e.g. at least 2.5 times higher than the amount of thermal energy provided to heat the glass sheet of the vacuum insulated glass (VIG) unit facing away from the further sheet and the lamination layer, during the heating process.

In one or more aspects of the present disclosure, the temperature provided to the further sheet may be 1.05 to 2.5 times higher, such as 1.3 to 1.5 times higher than the temperature provided to heat the glass sheet of the vacuum insulated glass (VIG) unit facing away from the further sheet and the lamination layer during the lamination process at the same point in time.

In one or more aspects of the present disclosure, the lamination assembly may be arranged between first and second heating bodies comprising heating surfaces transferring heat to the VIG assembly at outwardly facing major surfaces of the lamination assembly so as to obtain said first and second temperature.

This may e.g. provide an advantageous conduction heating solution.

In one or more aspects of the present disclosure, said first heating body may comprise said first heating arrangement and said second heating body may comprise said second heating arrangement.

This may e.g. provide a more controlled and constant temperature due to the heat capacity of the clamping bodies which may e.g. be metal bodies with the heating arrangement(s) embedded therein, e.g. between two clamping body parts made from a metal such as brass, aluminium or copper.

Alternatively, in further aspects of the present disclosure, the heating arrangements may be a heating arrangement such as a mat arranged between the respective clamping body and the lamination assembly.

In one or more aspects of the present disclosure, said heating bodies may provide clamping bodies such as rigid clamping bodies configured to be displaced by one or more clamping body displacers such as mechanical clamping body displacers to provide a compression pressure.

In one or more aspects of the present disclosure, the lamination assembly may be arranged between clamping surfaces, wherein at least one of said clamping surfaces is displaced to reduce the distance between the clamping surfaces so as to provide said compression pressure to major, outer surfaces the lamination assembly.

In one or more aspects, said first and second heating bodies may hence provide clamping surfaces that are also heating surfaces, where at least one of said clamping/heating surfaces is configured to be displaced by one or more clamping body displacers to change the distance between the clamping surfaces. These/this clamping body displacer(s) is operated by a control arrangement to provide the compression pressure to the lamination assembly by means of the clamping surfaces.

Heating and providing a compression pressure may help to provide a fast and controlled manufacturing solution for laminating VIG units, which may fit larger scale VIG unit manufacturing capacity demands/desires. Additionally, it may help to provide a lamination solution providing an improved yield of laminated VIG units having a high lamination quality.

Also or alternatively, the compression pressure may help to remove surface roughness in the lamination layer and/or may help to cause the lamination layer to adapt to possible surface variations in the outer major surface of the tempered glass sheet facing the lamination layer. The heating softens the lamination layer to provide that a reduced compression pressure may be need to obtain a sufficient bonding, thereby reducing the risk of damaging the VIG unit.

The compression pressure may also help to even out/ remove certain bends in the VIG unit that may be present without a temperature different between the VIG unit's glass sheets, and/or caused by a temperature difference between the glass sheets during the heating process.

It is generally understood that the further sheet may be a glass sheet such as an annealed glass sheet or a tempered glass sheet.

It is hence understood that the compression pressure may be provided simultaneously with said heating of the lamination assembly.

Said compression pressure and/or said heating is may advantageously be provided substantially evenly to substantially the entire major, outer surfaces of the lamination assembly.

In one or more aspects of the present disclosure, the compression pressure (F) applied to the lamination assembly (10) may be between 1.5 and 3.5 Newton/cm$^2$, for example between 2 and 3 Newton/cm$^2$, such as between 2.4 and 2.8 Newton/cm$^2$ This may help to provide a faster lamination and handle/ even out potential bending of the lamination assembly during the heating step. The compression pressure may also (together with a sufficient heating of the lamination layer) even out surface roughness at the lamination layer with a reduced risk of damaging the VIG unit.

In one or more aspects of the present disclosure, one or more resilient layers such as a mat, may be arranged between the lamination assembly and at least one of said heating surfaces, such as between the outer major surface of the lamination assembly facing away from the lamination layer and a proximate heating surface, and/or between the surface of the further sheet facing away from the lamination layer and a proximate heating surface.

The resilient layer may provide a force distribution of the compression pressure and/or spare the major surface of the lamination assembly while the compression pressure is applied. Also or alternatively, the resilient layer, such as a silicon or rubber mat, may help to provide an improved contact between the lamination assembly's outer major surface(s) and the heating arrangement used for heating and softening the lamination layer. The VIG unit may initially, without even providing a temperature difference between the VIG unit glass sheets, be subjected to an initial bending/deflection which may provide poor or even no heating at certain points of the VIG unit if the resilient layer is not present.

Also or alternatively, the VIG unit may be subjected to thermal deflection caused by a temperature difference between the VIG unit glass sheets, This thermal deflection may occur due to the good insulation properties provided by the evacuated gap, and that a rigid edge seal encloses the gap between the VIG units. This thermal deflection may cause a poor lamination quality and/or a poor control of the VIG unit deflection at certain areas of the VIG unit during the heating and pressing. The resilient layer may however help to solve or reduce issues occurring due to a deflection or unevenness of the VIG unit.

For example, a resilient layer, such as a mat, may be arranged between the outer major surface of the lamination assembly facing away from the lamination layer and a proximate clamping surface, and/or between the surface of the further sheet facing away from the lamination layer and a proximate clamping surface.

The resilient layer may comprise a resilient layer arranged between the major surface of lamination assembly facing away from the further sheet and one of said clamping surfaces. This surface may be unlaminated and hence a further sheet and a lamination layer may be arranged at this side of the VIG unit. This resilient layer may help to protect the unlaminated VIG unit glass sheet surface, enhance distribution of the compression pressure and/or help to take up deflections of the VIG unit assembly during the heating and applying of the compression pressure.

Also or alternatively, said resilient layer Said resilient layer may comprise a resilient layer arranged between the further sheet and a clamping surface.

This may help to protect the further sheet, enhance distribution of the compression pressure and/or help to take up deflections of the VIG unit assembly during the heating and applying of the compression pressure.

Said resilient layers may in aspects of the present disclosure have a thickness (measured in an uncompressed state) between 2 mm and 10 mm, such as between 2 mm and 4 mm or between 4 mm and 10 mm.

In one or more aspects of the present disclosure, said compression pressure is provided simultaneously with said heating of the lamination assembly.

In one or more aspects of the present disclosure, said at least two glass sheets of the vacuum insulated glass unit are tempered glass sheets such as thermally tempered glass sheets.

The tempered glass sheets may provide e.g. an advantage of improved structural strength of the VIG, which may help to provide a solution wherein support structures such as pillars may be arranged with larger mutual distance in the gap between the glass sheets of the VIG unit, thereby reducing the number of potential "cold bridges" in the VIG unit per selected surface area unit, e.g. per $m^2$ VIG unit surface.

For example, thermally tempered glass sheets may though suffer from "wavy" surface topography variations of e.g. up to ±0.1 mm, providing a height difference between "crests" and "troughs" of the surface up to 0.2 mm or even more. Some tempered glass sheets may even suffer from "wavy" surface topography variations of e.g. up to ±0.3 mm. Moreover, such tempered glass sheets may suffer from further "global" bending between minor outer edges of the glass sheets. It is understood that the evacuation of the gap in the VIG unit and the edge seal enclosing the gap may force at least some of the surface topography variations to be smaller. These surface variation may e.g. be surface variations on the VIG glass sheet surface to be laminated that may be undesired, but that are caused during for example the tempering process of the glass sheets. Such surface variations may however be taken up by the lamination layer due to the applied compression pressure and the heating.

It is generally understood that the further sheet may be a glass sheet such as an annealed glass sheet or a tempered glass sheet.

In one or more aspects of the present disclosure, the thickness of the lamination layer may be between 0.25 mm and 3 mm, such as between 0.4 mm and 2.7 mm, e.g. between 0.7 mm and 2.4 mm.

This may provide a lamination layer having a thickness that is sufficient to take up potential surface variations of the glass sheet of the VIG unit and/or the further sheet facing the lamination layer, and still provide a proper bonding. The thickness is measured before the heating step. After the lamination process, the thickness of the lamination layer may in further aspects vary in accordance with the surface variations of the glass sheet of the VIG unit facing the lamination layer and/or surface variations of the further sheet.

In one or more aspects of the present disclosure, said method may comprise arranging the lamination assembly in a vacuum enclosure and subjecting the lamination assembly to an evacuation step in the vacuum enclosure, such as prior to and/or during applying said compression pressure, and/or prior to and/or during subjecting the lamination assembly to said first and second heating temperatures.

This evacuation step may help to remove gas bobbles/remains between the lamination layer and the VIG unit and/or between the lamination layer and the further sheet such as a lamination glass sheet.

Moreover, the evacuation step may help to apply a part of a compression pressure, and the remaining compression pressure may e.g. be provided by means of operating clamping body displacers and hence at least one of the clamping bodies. The vacuum enclosure may e.g. in one or more aspects of the present disclosure be a flexible sheet separate to the clamping bodies, such as a plastic sheet, that covers the VIG unit and which can be evacuated to press onto the lamination assembly and evacuate gas remains between the further sheet and the VIG unit.

In one or more aspects of the present disclosure, said lamination layer may be a Polyvinyl butyral (PVB) or a Ethylene Vinyl Acetate (EVA) layer.

In one or more aspects of the present disclosure, said heating may comprise heating the lamination layer to a target temperature between 85° C. and 160° C., such as between 90° C. and 155° C., e.g. between 95° C. and 150° C., such as between 90° C. and 110° C.

In aspects of the present disclosure, said heated lamination assembly may be subjected to a cooling step after said heating by means of the heating arrangements, wherein said cooling step is provided by a cooling system, wherein said cooling step comprises providing a controlled cooling of one or both major outer surfaces of the heated lamination assembly so as to cool said heated lamination assembly to harden said lamination layer.

The present disclosure additionally relates to a method of providing a laminated vacuum insulated glass (VIG) unit according to a second aspect, wherein the method comprises:

providing a lamination assembly comprising
a vacuum insulated glass (VIG) unit comprising at least two glass sheets, such as tempered glass sheets, separated by a plurality of support structures distributed in a gap between the glass sheets, and a lamination layer arranged between one of the glass sheets of the vacuum insulated glass (VIG) unit and a further sheet,
arranging said lamination assembly between first and second clamping bodies providing clamping surfaces, wherein at least one of said clamping surfaces is configured to be displaced by one or more clamping body displacers to change the distance between the clamping surfaces,
wherein a controller controls said one or more clamping body displacers to provide a compression pressure to the lamination assembly by means of the clamping surfaces,
subjecting the further sheet to a conduction heating between said clamping bodies by means of a first heating arrangement, and
subjecting the surface of the lamination assembly facing away from the further sheet to a conduction heating between said clamping bodies by means of a second heating arrangement,
wherein the start of the conduction heating of the surface of the lamination assembly facing away from the further sheet is time delayed compared to the start of said conduction heating of the further sheet.

This may e.g. provide one or more of the previously mentioned advantages. For example, it may provide an advantageous solution when laminating VIG units where the heat capacity at the different sides of the VIG unit is different, for example if one side of the VIG unit is provided with the lamination layer and the further sheet while the other side is maintained un-laminated, or may be provided with a layer having a lower heat capacity. For example, it may help to provide a controlled heating of the glass sheets of the VIG unit enclosing the evacuated gap in order to control a thermal deflection of the VIG unit of the lamination assembly.

In one or more aspects of said second aspect, the time delay may provide that the further sheet is subjected to a first heating temperature, and that the glass sheet of the vacuum insulated glass unit facing away from the further sheet is subjected to a second temperature, wherein the first heating temperature is higher than the second heating temperature.

It is understood that said first heating temperature is higher than the second temperature at the same point in time. This may be provided in the start, the middle and/or the end of the heating process, or through substantially the entire heating process.

In one or more aspects of said second aspect, said first clamping body comprises said first heating arrangement and said second clamping body comprises said second heating arrangement.

In one or more aspects of said second aspect, the time delayed conduction heating of the surface of the lamination assembly facing away from the further sheet may be started by said controller by that the controller operates said clamping body displacers so as to reduce the distance between said clamping surfaces, thereby providing a compression pressure to the lamination assembly by means of the clamping surfaces.

This also provides a start of a time delayed conduction heating of the surface of the lamination assembly facing away from the further sheet.

In one or more aspects of said second aspect, said time delay of said conduction heating is more than 50 seconds, e.g. more than 3 minutes, such as more than 5 minutes.

For example, the time delay may be between 10 seconds and 10 minutes or between 50 seconds and 20 minutes.

In one or more aspects of said second aspect, said time delay may be determined from the start of the conduction heating of said further sheet. The conduction heating of the further sheet may in aspects of the present disclosure be provided prior to arranging the lamination assembly in between the clamping bodies, e.g. by arranging the further sheet with the lamination layer and VIG unit on the top of the further sheet so that is supports on a heating surface comprising a heating arrangement, where the surface is distant to the space between the claming bodies. Hence, substantially after providing the lamination assembly with the preheated further sheet in between the clamping bodies, the compression pressure may be applied. However, in other aspects of said second aspect, said time delay may be determined/calculated from the start of the conduction heating of said further sheet by means of said first heating arrangement while the lamination assembly supports on one of said clamping bodies to be heated.

In one or more aspects of the second aspect, said method may comprise arranging the lamination assembly in a vacuum enclosure and subjecting the lamination assembly to an evacuation step in the vacuum enclosure, such as prior to and/or during applying said compression pressure, and/or prior to and/or during subjecting the lamination assembly to said conduction heating.

In one or more aspects of said second aspect, one or more resilient layers such as a mat, may be arranged between the lamination assembly and at least one of said clamping surfaces. This may help to provide a good heat and pressure distribution as e.g. previously explained. Also it may be advantageous in order to handle surface variations of the VIG unit's outer surfaces. For example, in one or more aspects, a resilient layer such as a may be between the outer major surface of the lamination assembly facing away from the lamination layer and the proximate clamping surface, and/or between the outer major surface of the further sheet facing away from the lamination layer and the proximate clamping surface.

In one or more aspects of said second aspect, said time delay provides that more thermal heat energy is provided to one of the outer major surfaces of the lamination assembly by means of one of said heating arrangements than the amount of thermal energy provided to heat the other outer, major surface of the lamination assembly by means of the other of said heating arrangements during said heating process.

In one or more aspects of said second aspect, said clamping bodies may be rigid clamping bodies made from a metal such as aluminium, copper or brass, and wherein said clamping bodies provides heating bodies for heating the lamination assembly.

In one or more aspects of said second aspect, said compression pressure applied to the lamination assembly may be between 1.5 and 3.5 Newton/cm², for example between 2 and 3 Newton/cm², such as between 2.4 and 2.8 Newton/cm²

This may e.g. reduce the risk if damaging the VIG unit.

In one or more aspects of said second aspect, said heated lamination assembly may be subjected to a cooling step provided by a cooling system, wherein said cooling step comprises providing a controlled cooling of one or both major outer surfaces of the heated lamination assembly so as to cool said heated lamination assembly to cool and hence harden said lamination layer.

The present disclosure additionally, in a third aspect, relates to a system for providing laminated vacuum insulated glass units, wherein the laminated vacuum insulated glass (VIG) units, comprises a vacuum insulated glass (VIG) unit comprising at least two, glass sheets separated by a plurality of support structures distributed in a gap between the glass sheets, and a lamination layer arranged between one of the glass sheets of the vacuum insulated glass unit and a further sheet. The system comprises clamping bodies providing clamping surfaces, wherein at least one of said clamping and heating surfaces is configured to be displaced by one or more clamping body displacers to change the distance between the clamping surfaces, a controller configured to control said one or more clamping body displacers to provide a compression pressure to a lamination assembly by the clamping and heating surfaces, and a first and a second heating arrangement configured to heat said clamping and heating surfaces so as to heat major outer surfaces of a lamination assembly while the clamping and heating surfaces are pressed towards outer major surfaces of the lamination assembly.

In one or more aspects of the third aspect, said system may be configured to provide that more thermal heat energy is provided to the further sheet by means of one of said first and second heating arrangements than the amount of thermal energy provided to heat the outer, major surface facing away from the further sheet and the lamination layer by means of the other of said first and second heating arrangements.

In one or more aspects of the third aspect, the amount of thermal energy provided to the further sheet is at least 1.5 times, such as at least 2 times, e.g. at least 2.5 times higher than the amount of thermal energy provided to heat the glass sheet of the vacuum insulated glass unit facing away from the further sheet and the lamination layer, during the heating process.

In one or more aspects of the third aspect, said controller may be configured so as to provide that a start of the heating, such as a start of a conduction heating, of the outer major surface of the glass sheet of the vacuum insulated glass unit facing away from the further sheet by means of one of said heating arrangements is time delayed compared to the start of the heating, such as the start of a conduction heating, of the outwardly facing major surface of the further sheet provided by means of the other of said first and a second heating arrangements.

This may provide that the further sheet may initially experience a first heating temperature which is higher than the second heating temperature. The time delay may e.g. be provided by the controller which may time delay the movement of a clamping and heating surface of the system.

In one or more aspects of the third aspect, said system may be configured so that the further sheet is subjected to a first heating temperature by means of said first heating arrangement, and wherein said system is configured so that the glass sheet of the vacuum insulated glass (VIG) unit facing away from the further sheet is subjected to a second heating temperature by means of said second heating arrangement, wherein the first temperature is higher than the second temperature.

This may e.g. be provided by different temperature settings of the heating arrangements, it may be provided by a time delayed conduction heating at outer major surfaces of a lamination assembly for a laminated VIG unit, By providing different temperature regulation and/or the like.

In one or more aspects of the third aspect, the outer major surfaces of the lamination assembly (10) may be configured to be heated according to different heating profiles by means of said system. This may e.g. be provided by means of an automatic control of the heating arrangements and/or said clamping body displacer(s). These heating profiles may e.g. be obtained by a time delay in start of the heating provided at the different outer surfaces of the lamination assembly, it may comprise different temperature regulations during the heating, it may comprise that the heating at one of the surfaces is stopped and/or started at different time points compreated to the heating at the other major surface of the lamination assembly, and/or the like, it may comprise switching from subjecting a lamination assembly surface to a natural or forced convection heating and/or radiation heating and to utilizing conduction heating at that surface so as to change heat transmissivity and/or the like.

In one or more aspects of the third aspect, said system may be configured to provide the method of any of claims 1-37.

In a fourth aspect, the present disclosure relates to use of a system according to any of claims 38-43 for laminating vacuum insulated glass units, such as according to a method of any of claims 1-37.

The present disclosure may additionally relate to a further, fifth aspect comprising a method of providing a laminated vacuum insulated glass (VIG) unit, wherein the fifth method comprises:

providing a lamination assembly comprising a vacuum insulated glass (VIG) unit comprising at least two glass sheets separated by a plurality of support structures distributed in a gap between the glass sheets, and a lamination layer arranged between one of the glass sheets of the vacuum insulated glass (VIG) unit and a further sheet, subjecting the glass sheet of the vacuum insulated glass (VIG) unit facing away from the further sheet to a heating, such as a conduction heating, by means of a heating arrangement, wherein said heating is time delayed compared to a heating, such as a conduction heating, provided to the further sheet by means of a second heating arrangement so as to soften said lamination layer, and wherein said time delayed heating is provided during the heating of said further sheet.

This fifth aspect may e.g. be provided according to the method of any of the described aspects of the first, second third, fourth and/or sixth aspects and/or according to any of claims 1-37.

The present disclosure additionally, in a sixth aspect, relates to a method of providing a laminated vacuum insulated glass unit, wherein the method comprises:

providing a lamination assembly comprising a vacuum insulated glass (VIG) unit comprising at least two glass sheets separated by a plurality of support structures distributed in a gap between the glass sheets, and a lamination layer arranged between one of the glass sheets of the vacuum insulated glass (VIG) unit and a further sheet, providing a heating step so as to heat said lamination assembly, wherein said heating step comprises heating said further sheet by means of a first heating arrangement so as to soften said lamination layer, and heating the outer major surface of the lamination assembly facing away from the further sheet by means of a second heating arrangement, wherein said heating of the further sheet, and said heating of the outer major surface of the lamination assembly facing away from the further sheet are provided so as to keep the temperature difference between said glass sheets of the vacuum insulated glass unit below 65° C., such as below 45° C., for example below 20° C. such as below 10° C., such as below 10° C. during at least 50% of said heating step such as during at least 70% of said heating step such as during at least 95% of said heating step.

This may e.g. help to provide one or more of the above mentioned advantages, e.g. in order to avoid a too large thermal deflection of the VIG unit of the assembly.

In one or more aspects of the sixth aspect, said heating step may be started when at least one of said further sheet and said outer major surface facing away from the further sheet starts to be heated by means of one of said heating arrangements.

In one or more aspects of the sixth aspect, said heating step is terminated when the heating of said further sheet and the heating of said outer major surface facing away from the further sheet by means of said heating arrangements have been terminated. The termination of the heating step may e.g. be provided by removing the lamination assembly from the heating arrangements, for example by means of a transport arrangement such as a conveyer solution.

In one or more aspects of the sixth aspect, one or both of said heating arrangements may be configured to provide a conduction heating, such as by means of a surface of a heating body.

Generally, in one or more aspects of the present disclosure one, the heating of for example the major surface facing away from the further sheet may be provide by means of a convection heating such as a forced convection heating and/or by means of radiation heating.

In one or more aspects of the sixth aspect, the lamination assembly may be arranged in a vacuum enclosure and subjected to an evacuation step in the vacuum enclosure, such as prior to and/or during applying said compression pressure and/or providing said heating step.

It is though understood that in in one or more aspects of the sixth aspect, said heating by the heating arrangements may be a conduction heating provided while clamping surfaces provides a compression pressure to the outer major surfaces of the lamination assembly.

Said clamping surfaces may in one or more aspects of the sixth aspect provide said heating of the outer major surfaces of the lamination assembly.

In one or more aspects of the sixth aspect, the start of the conduction heating of the surface of the lamination assembly facing away from the further sheet may be time delayed compared to the start of said conduction heating of the further sheet. This may help to keep the temperature difference between the VIG unit glass sheets within a desired range.

It is generally understood that the compression pressure may be provided due to the weight of a heating/clamping body and/or by means of one or more clamping body displacers such as mechanical clamping body displacers.

In one or more aspects of the sixth aspect, the time delayed conduction heating of the surface of the lamination assembly facing away from the further sheet may be started by a controller by the controller operating said clamping body displacers to reduce the distance between said clamping surfaces, thereby providing a compression pressure to the lamination assembly by means of the clamping surfaces. This may e.g. be provided by a timer functionality and/or a closed or open loop regulation.

In one or more aspects of the sixth aspect, said time delay ($\Delta t$) of the conduction heating may be more than 50 seconds, e.g. more than 3 minutes, such as more than 5 minutes.

In one or more aspects of the sixth aspect, said time delay ($\Delta t$) is determined from the start of the conduction heating of said further sheet. The start of the heating of the further sheet may represent the start of the heating step.

In one or more aspects of the sixth aspect, one or more resilient layers such as a mat, is arranged between the lamination assembly and at least one of said clamping surfaces.

In one or more aspects of the sixth aspect, said time delay may provide that more thermal heat energy is provided to one of the outer major surfaces of the lamination assembly by means of one of said heating arrangements than the amount of thermal energy provided to heat the other outer, major surface of the lamination assembly by means of the other of said heating arrangements during said heating process.

In one or more aspects of the sixth aspect, said clamping bodies may be rigid clamping bodies made from a metal such as Aluminium, copper or brass, such as wherein said clamping bodies provides heating bodies for heating the lamination assembly.

In one or more aspects of the sixth aspect, said compression pressure applied to the lamination assembly may be between 1.5 and 3.5 Newton/cm2, for example between 2 and 3 Newton/cm2, such as between 2.4 and 2.8 Newton/cm2

It is generally understood that the aspects described in relation to one or more of the first, second, third, fourth, fifth and/or sixth aspect of the present disclosure may be combined in further aspects of the present disclosure. Additionally, the advantages and/or effects described in relation to one or more of the first, second, third, fourth, fifth and/or sixth aspect of the present disclosure may apply for one or more of the other of the other first, second, third, fourth, fifth and/or sixth aspects.

FIGURES

Figure 2:
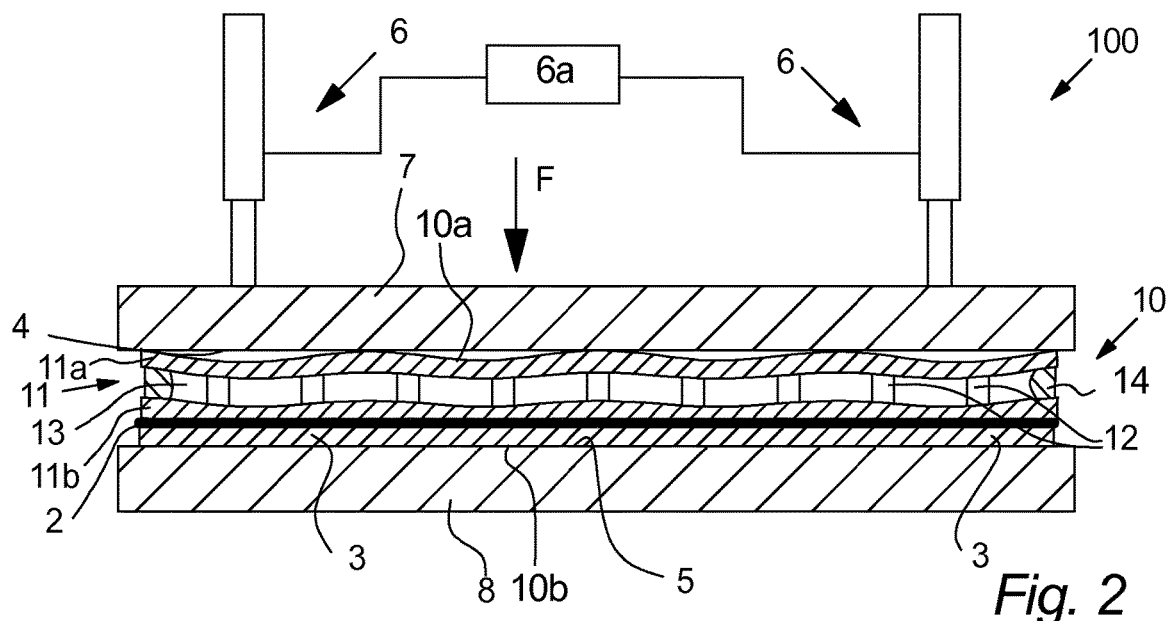
Figure 3:
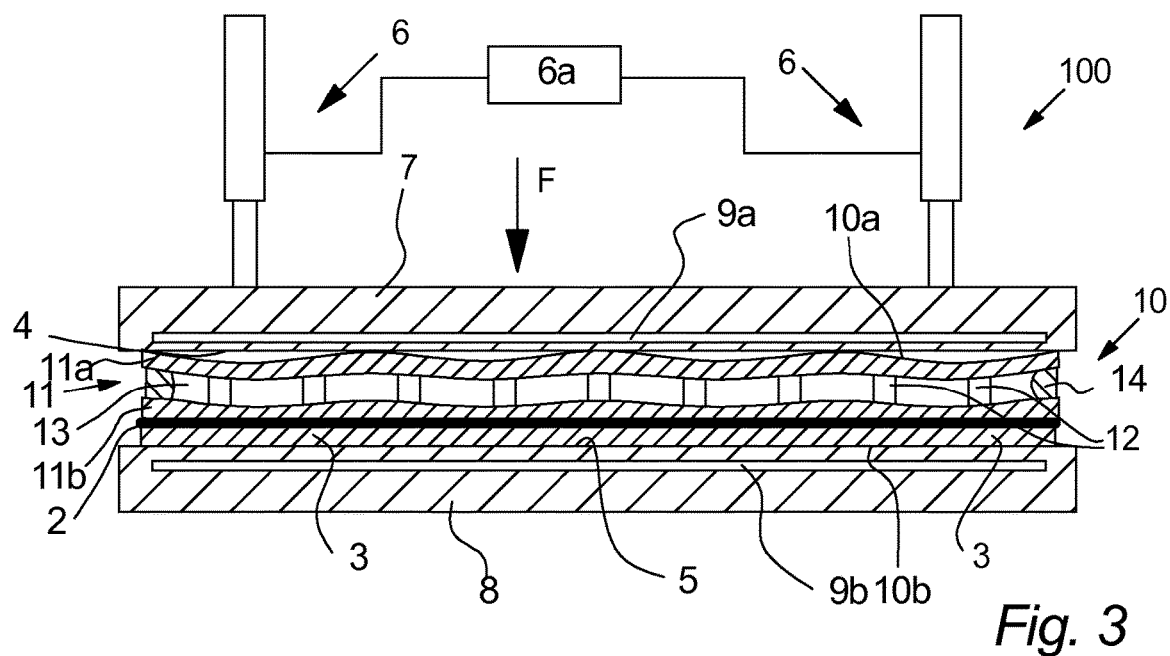
Figure 4:
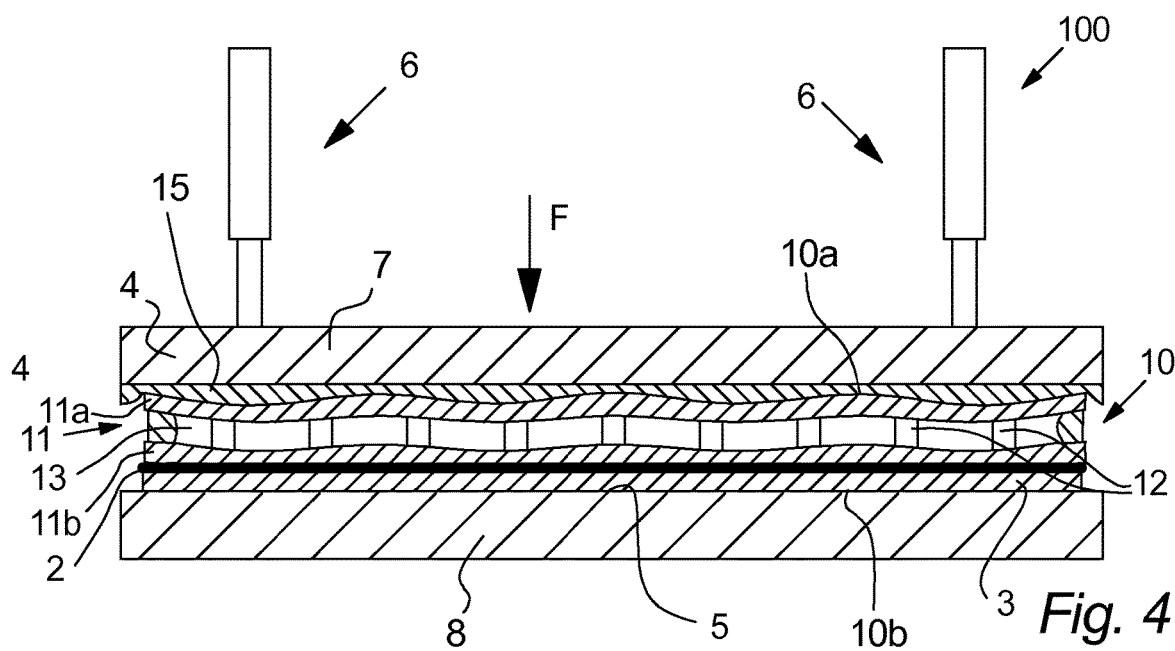
Figure 5:
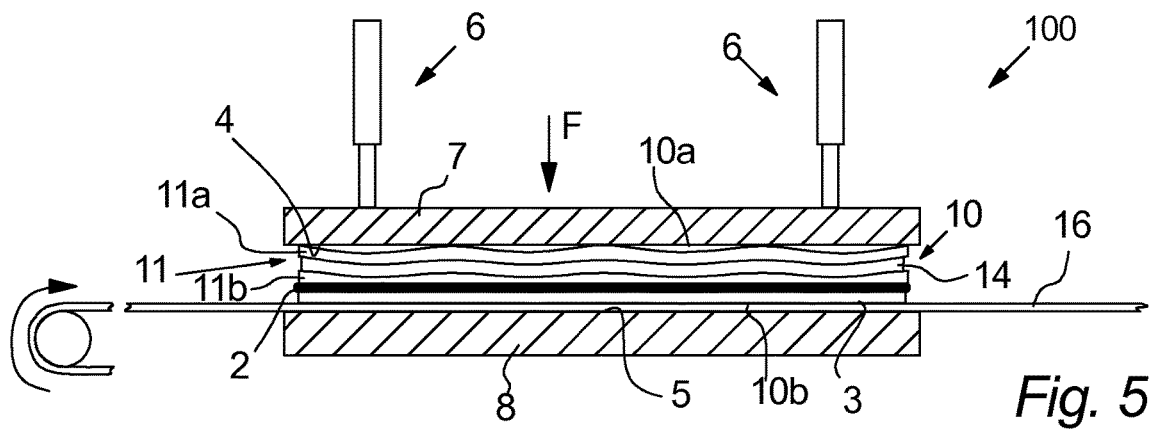
Figure 6:
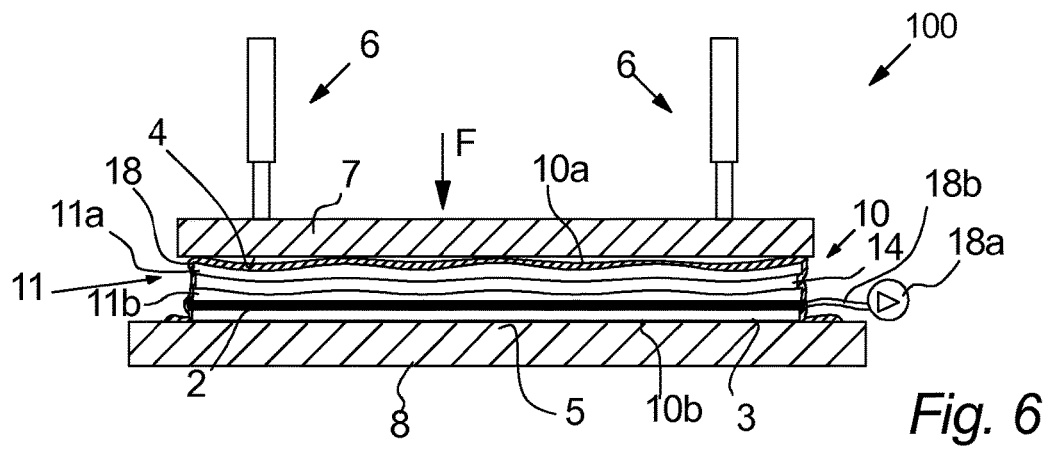
Figure 11:
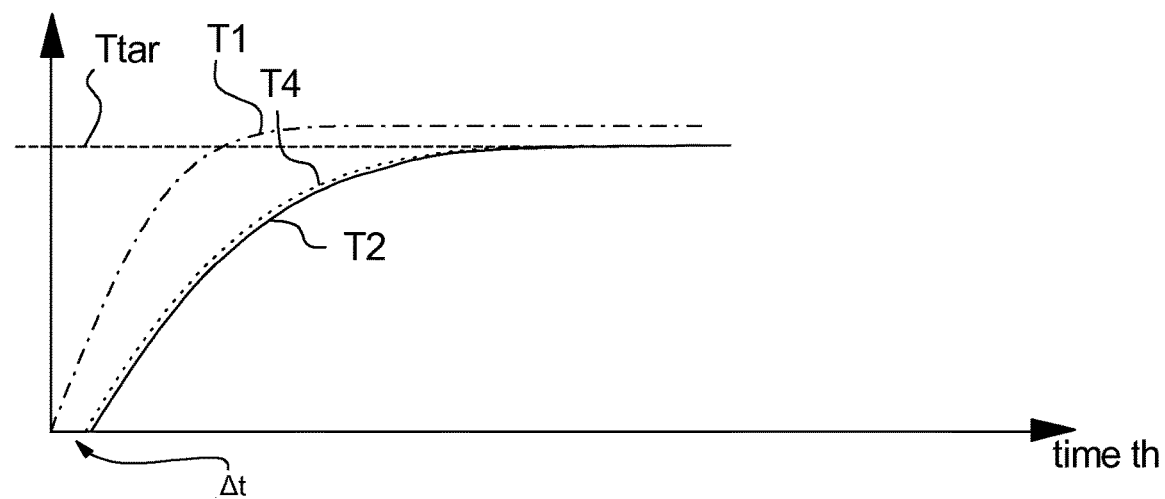
Figure 12:
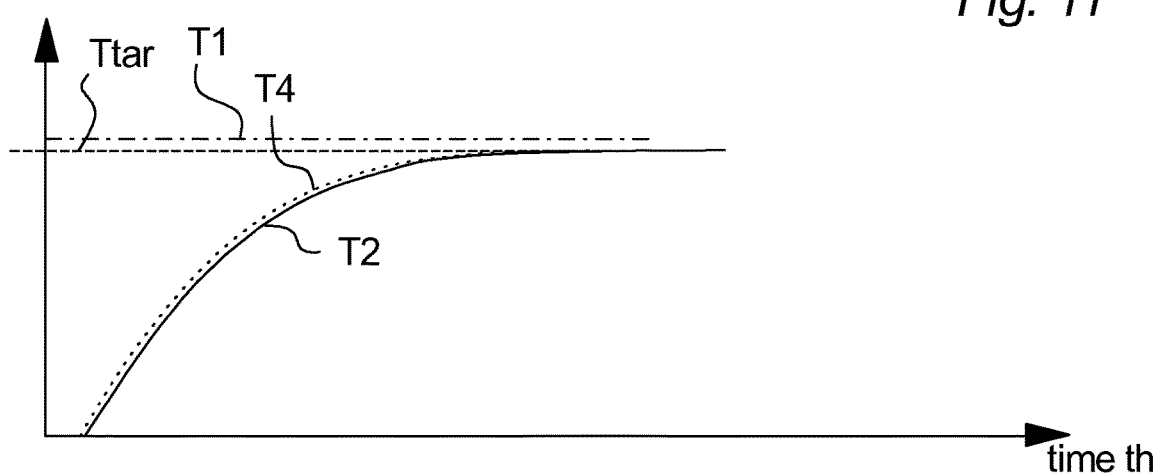
Figure 13:
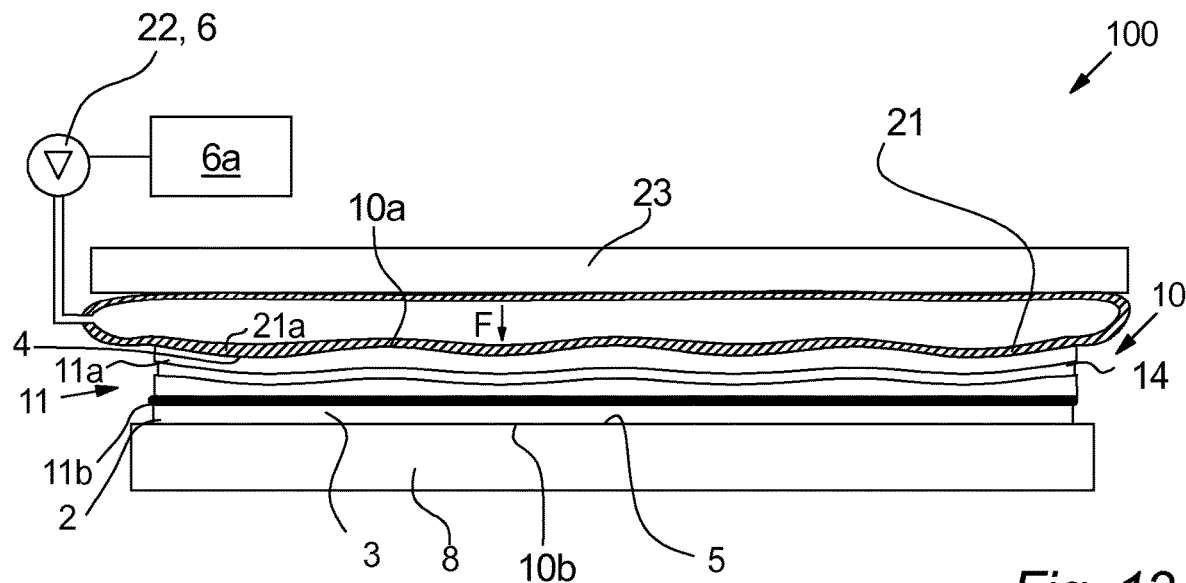
Figure 13A:
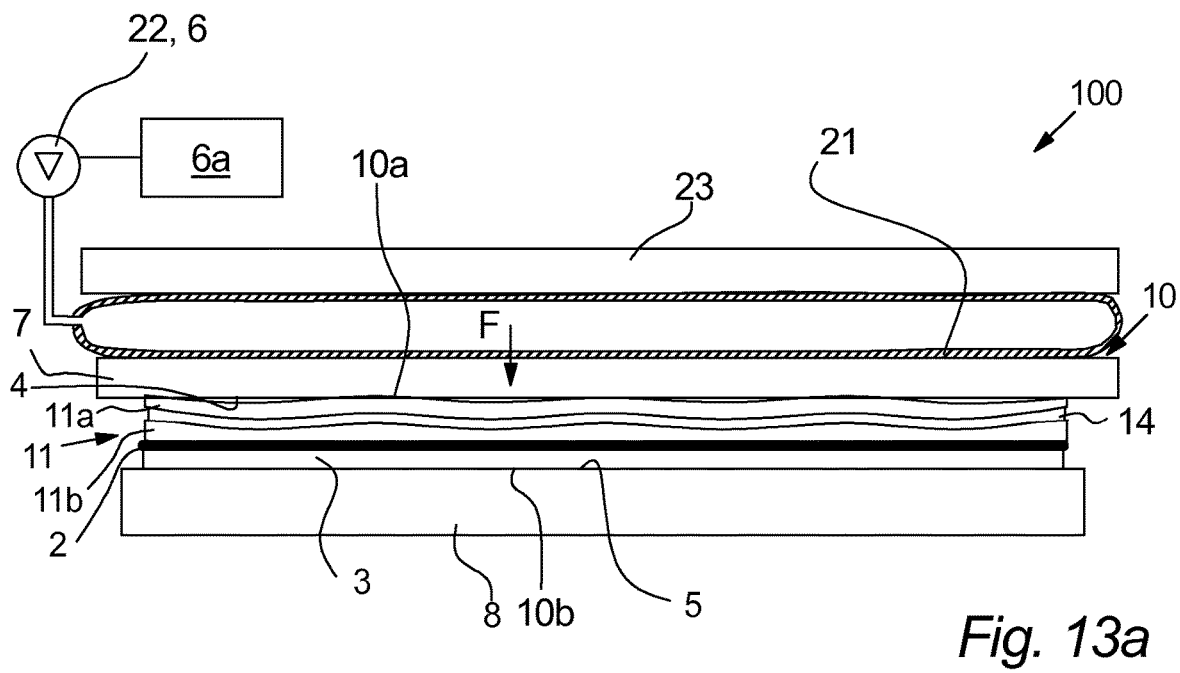
Figure 14:
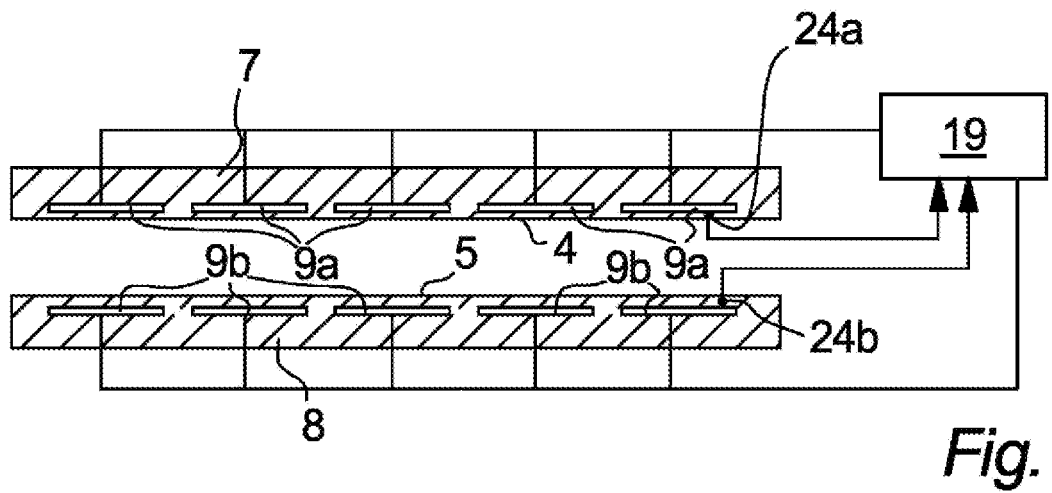
Figure 15:
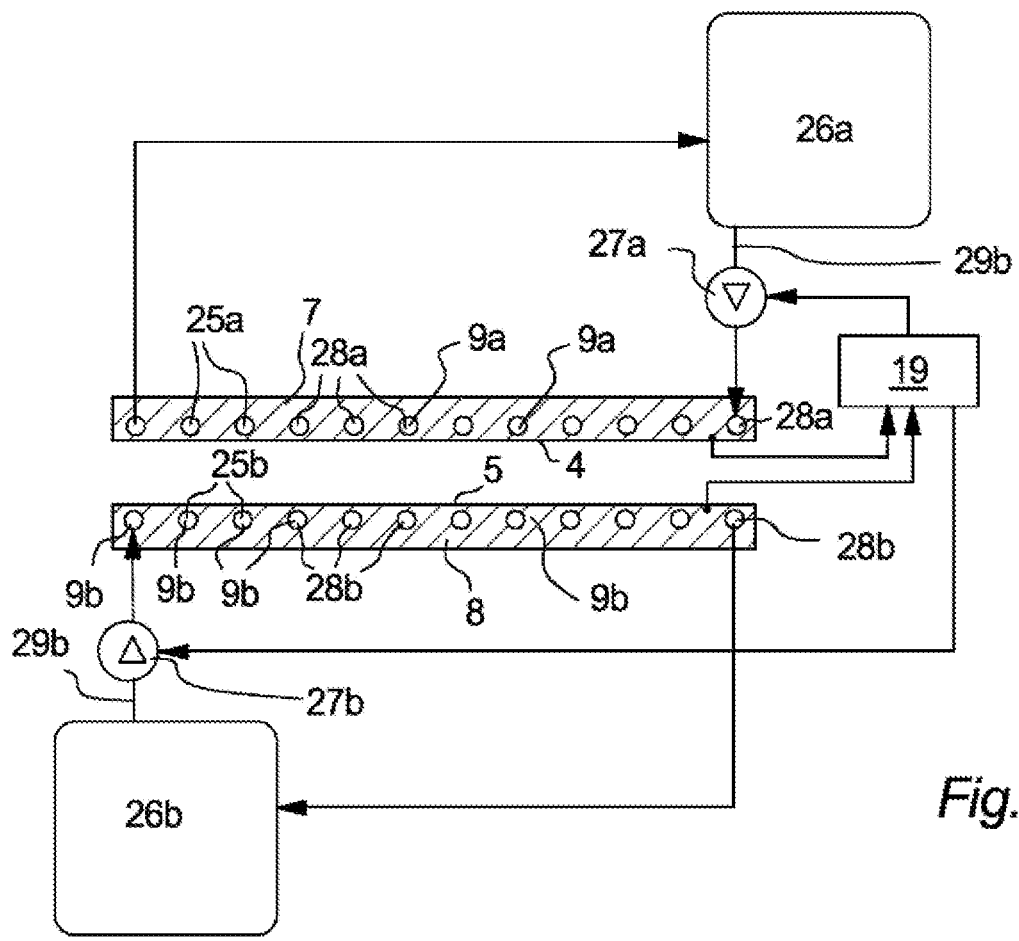
Figure 16A:
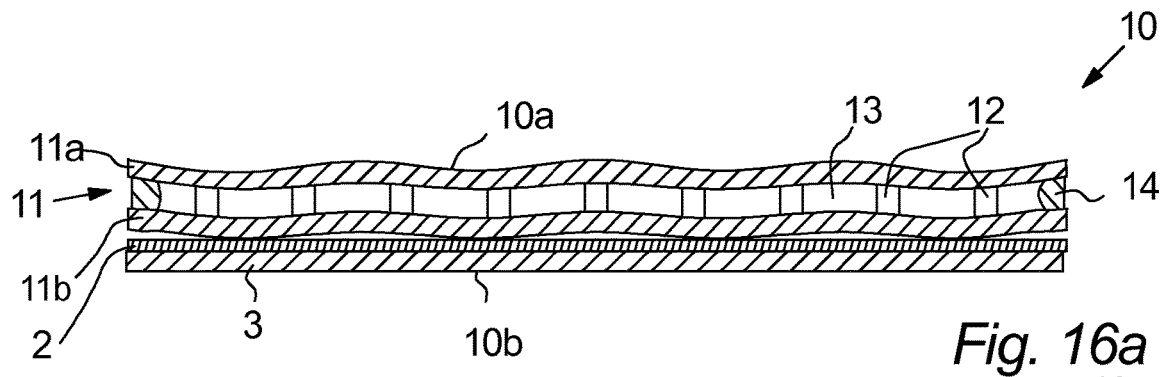
Figure 16B:
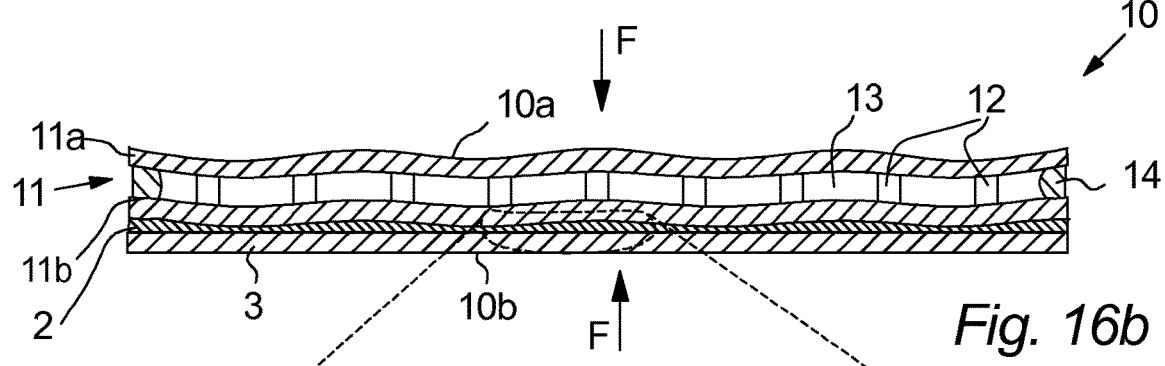
Figure 17A:
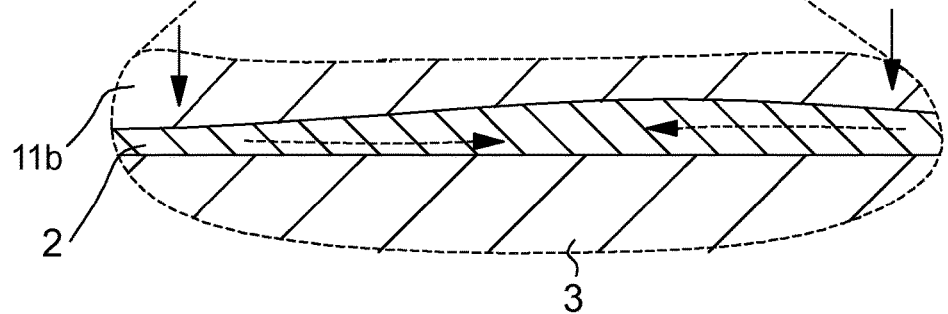
Figure 17A:
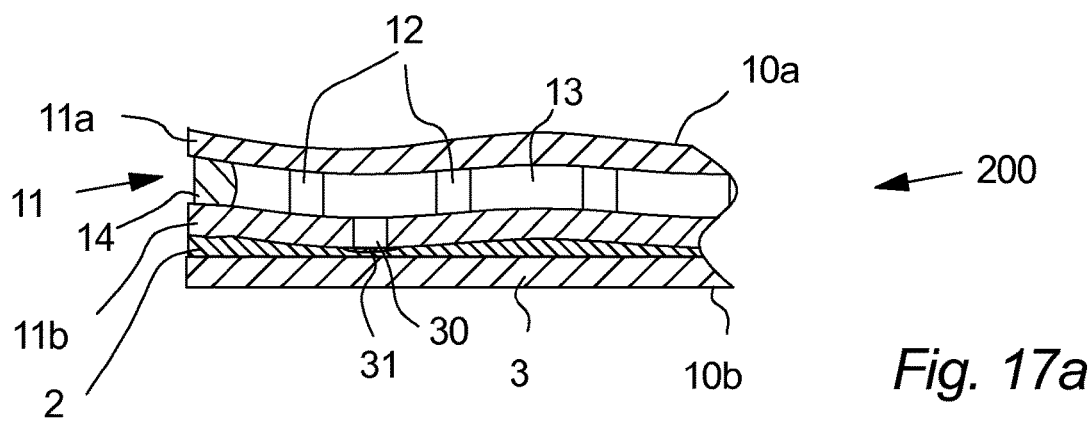
Figure 17B:
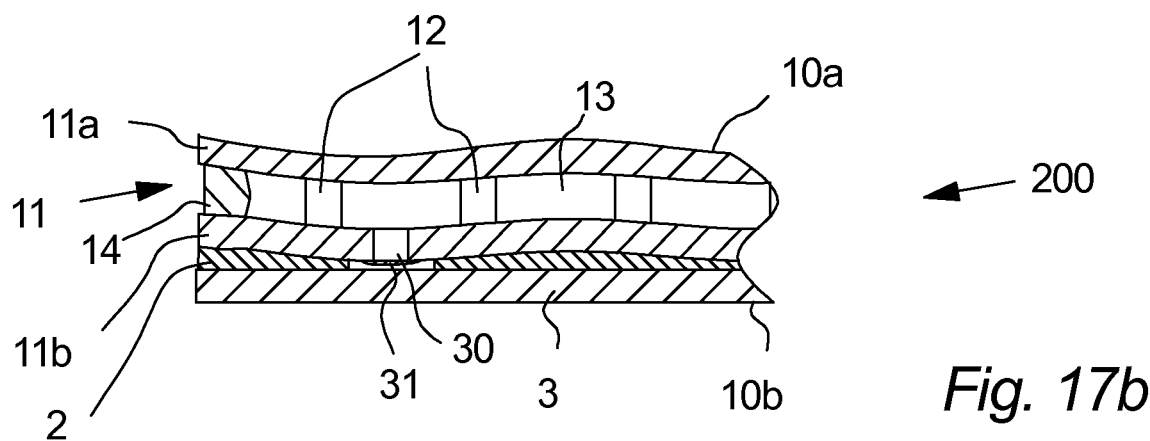
Figure 17C:
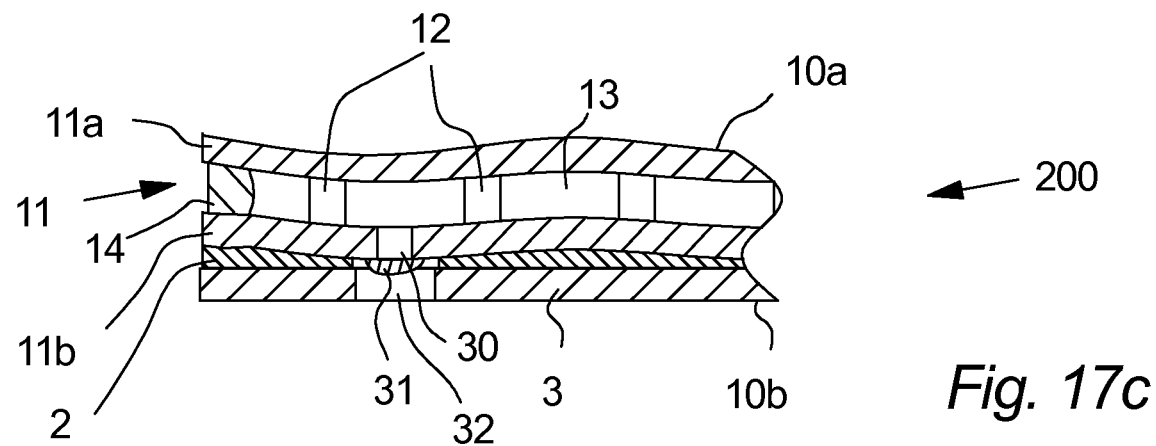
Figure 17D:
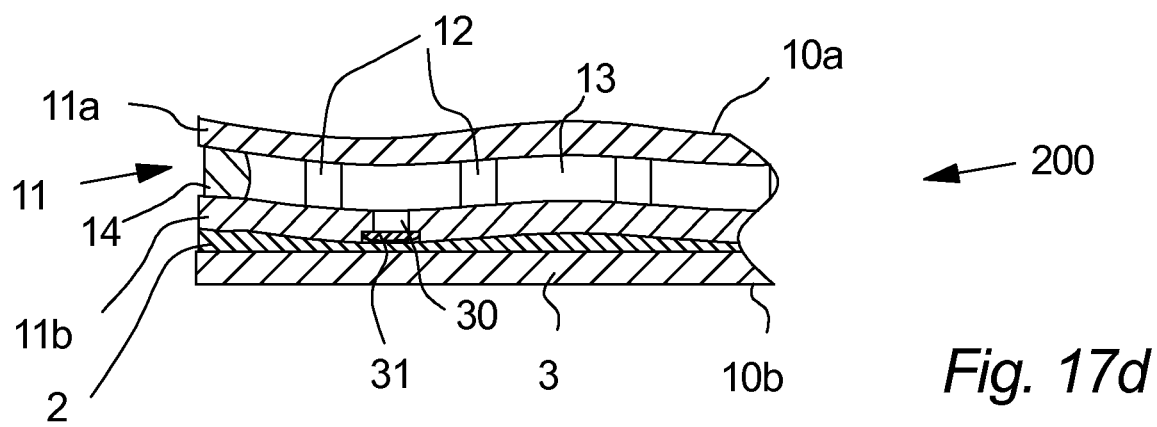
Figure 18:
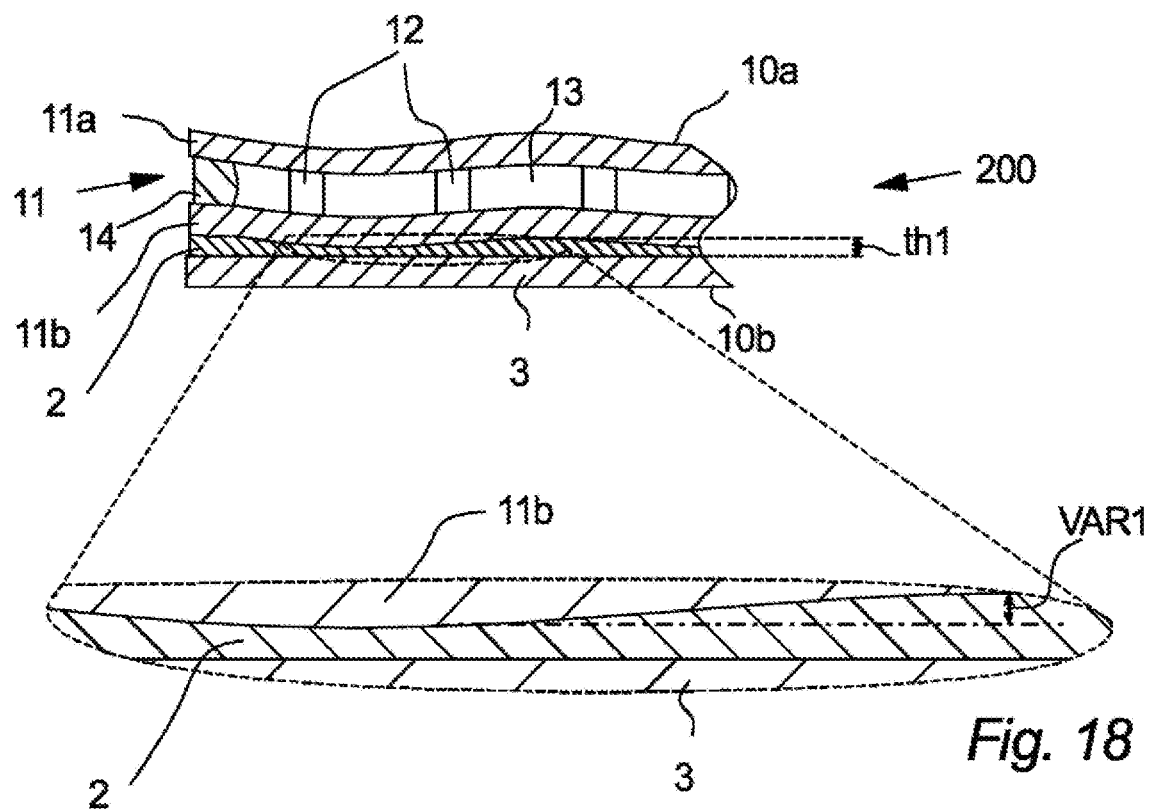
Figure 19:
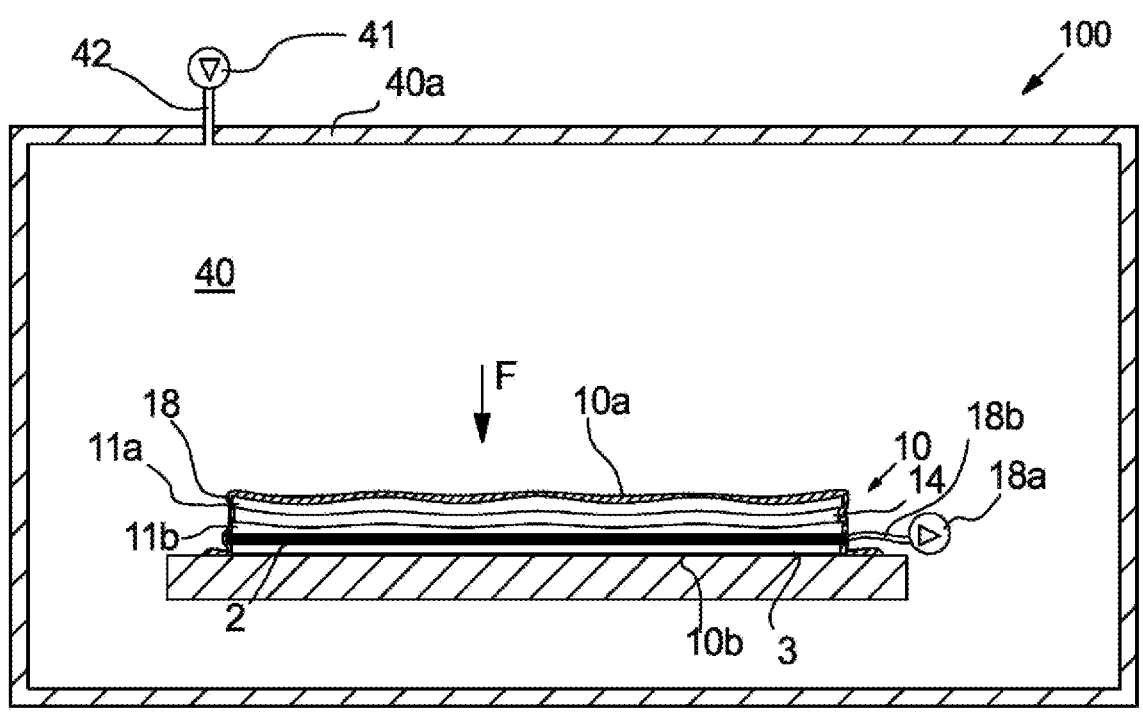
Figure 20:
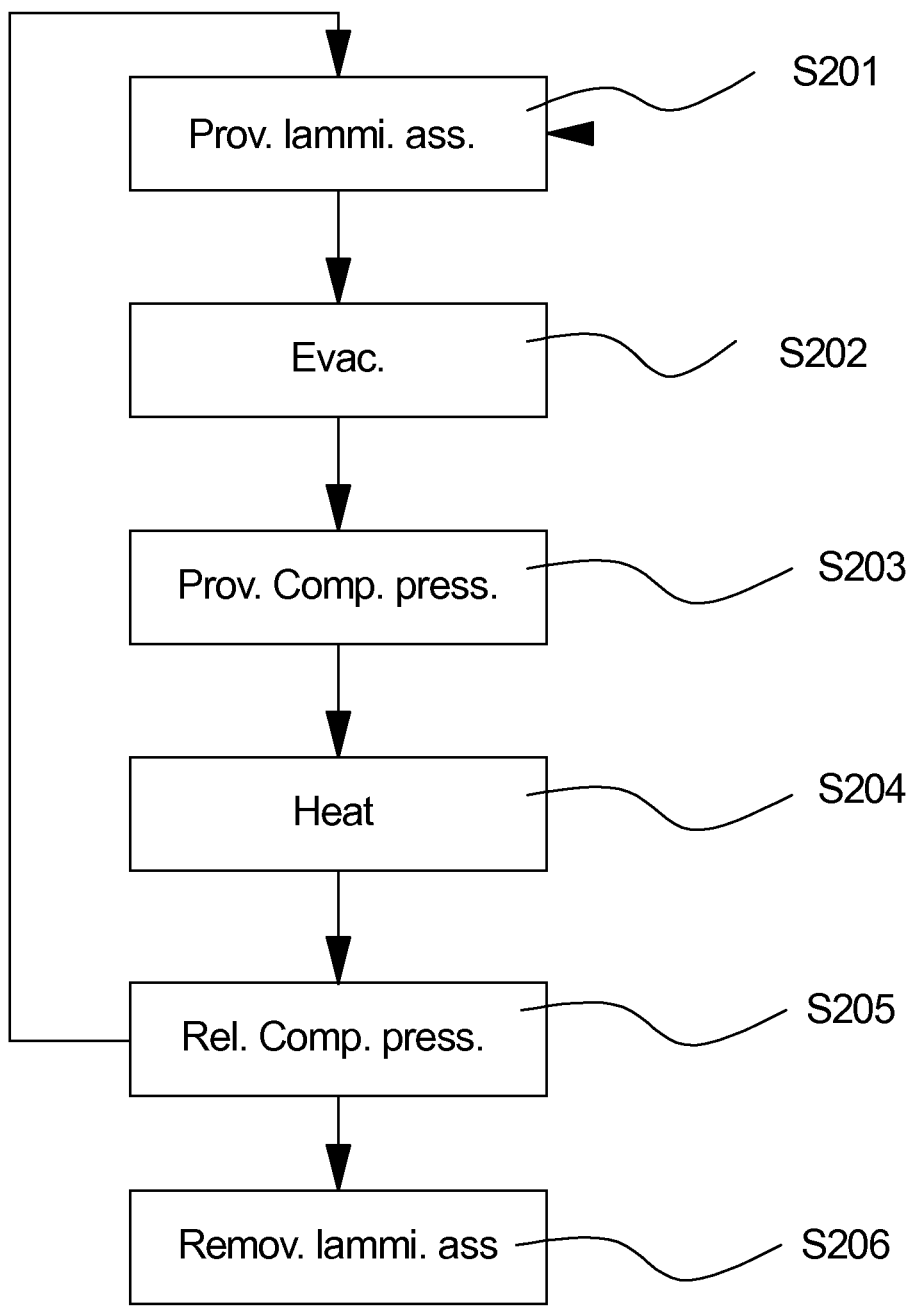
Figure 21:
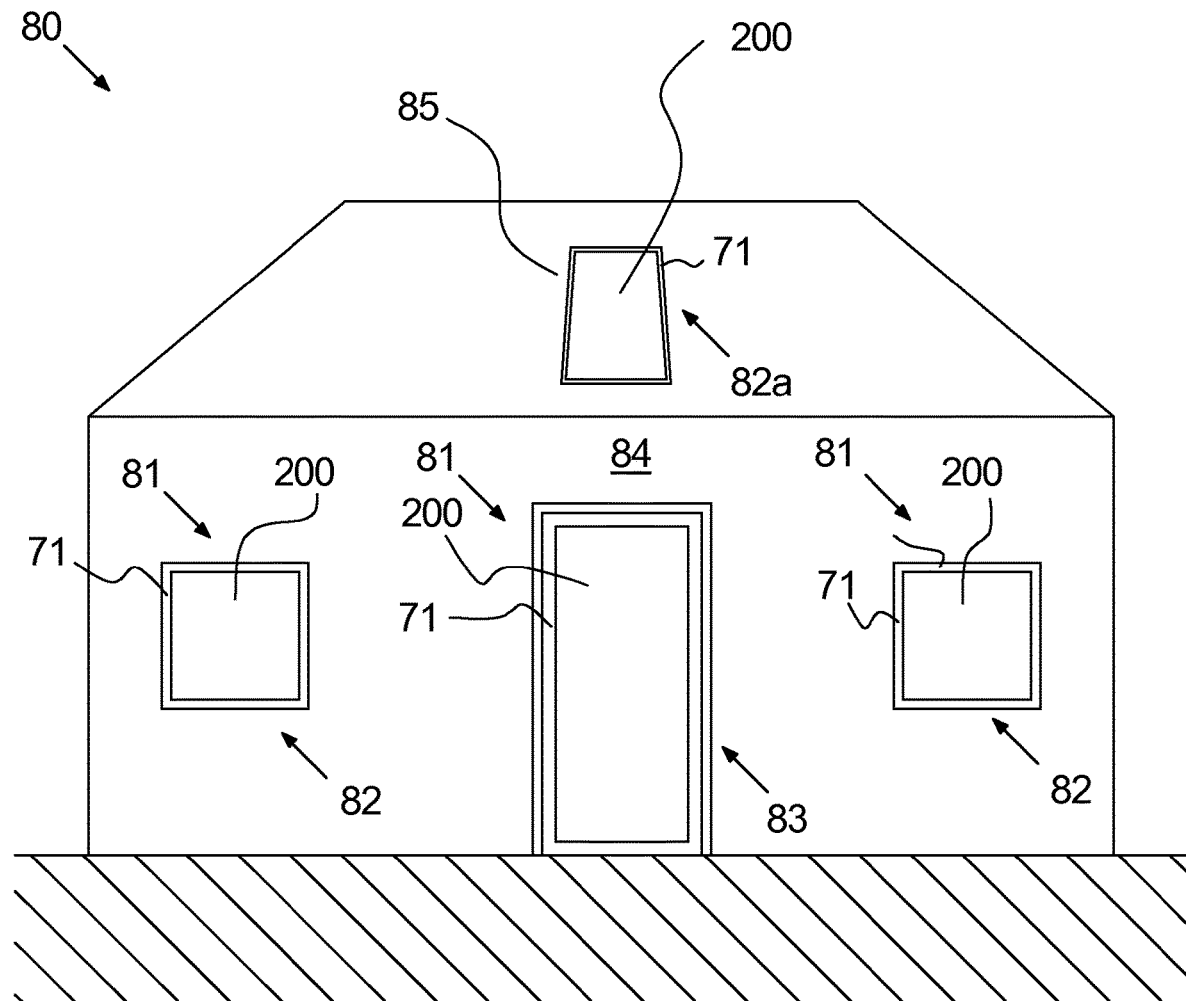
Figure 22:
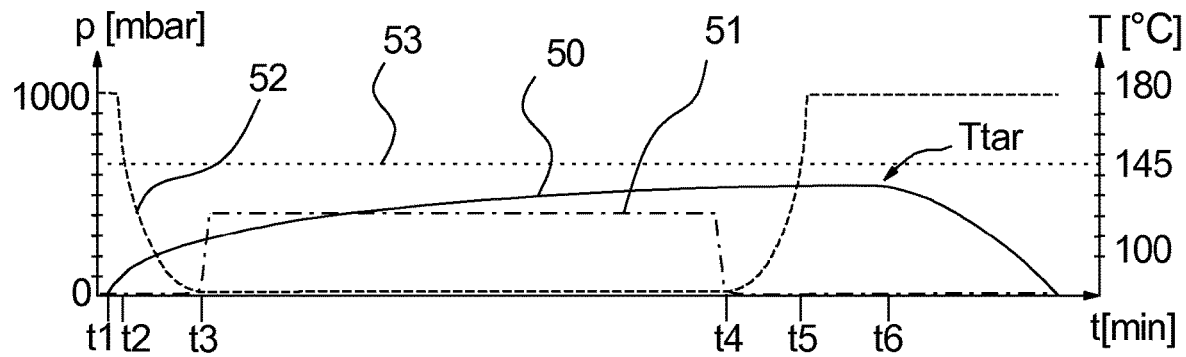
Figure 23:
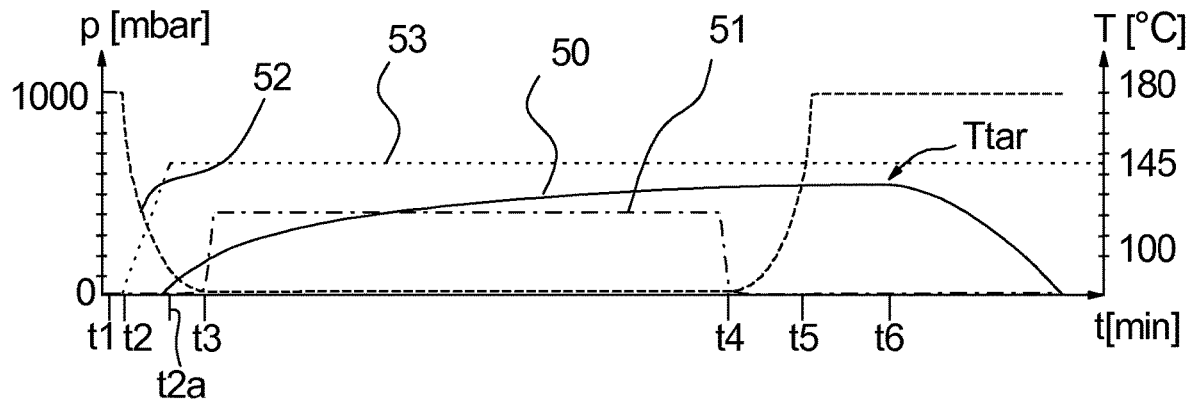
Figure 24:
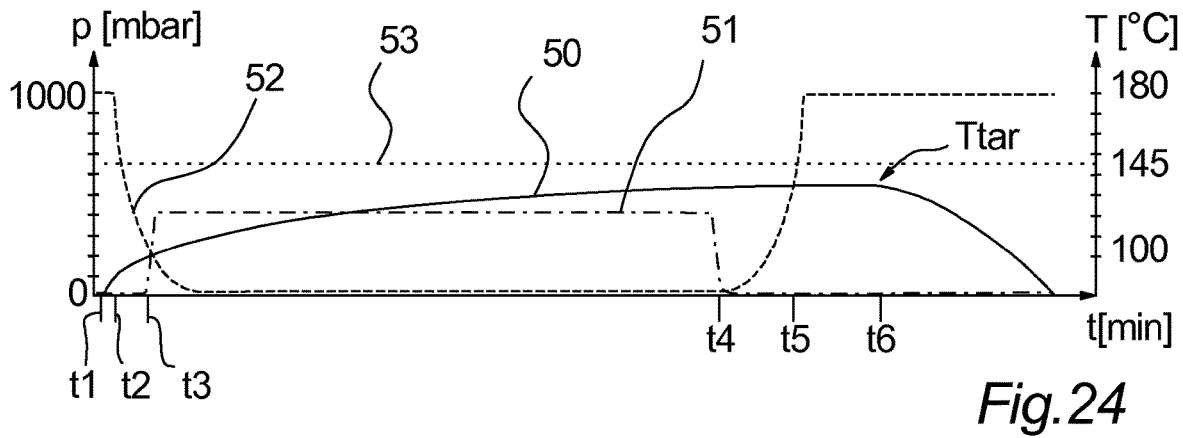
Figure 25:
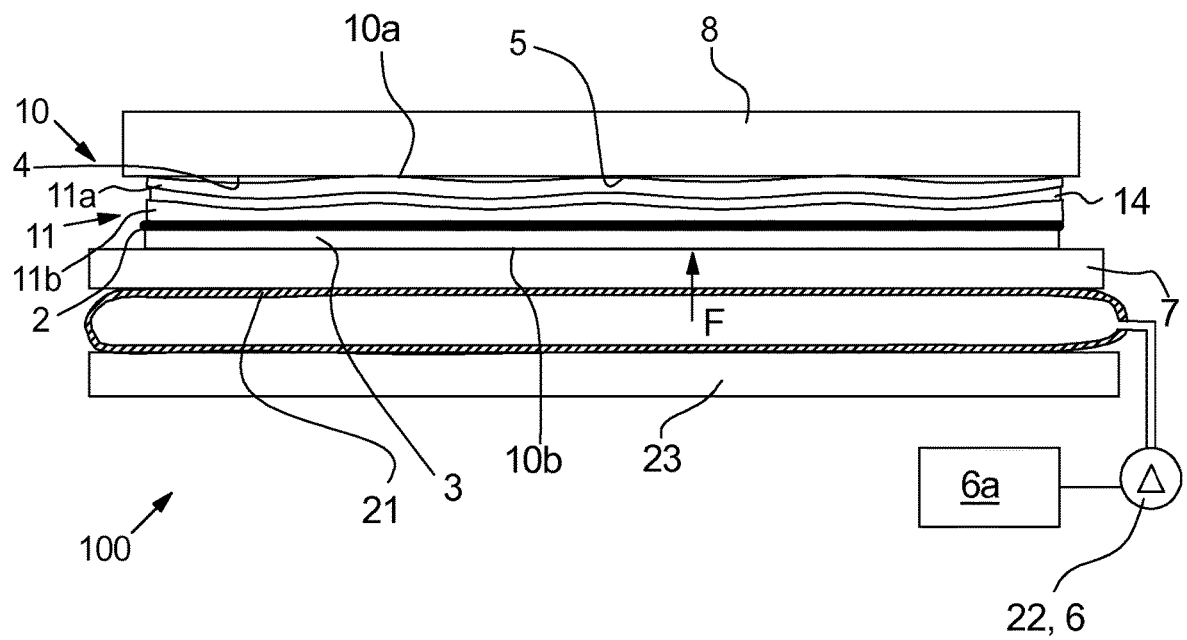
Figure 26:
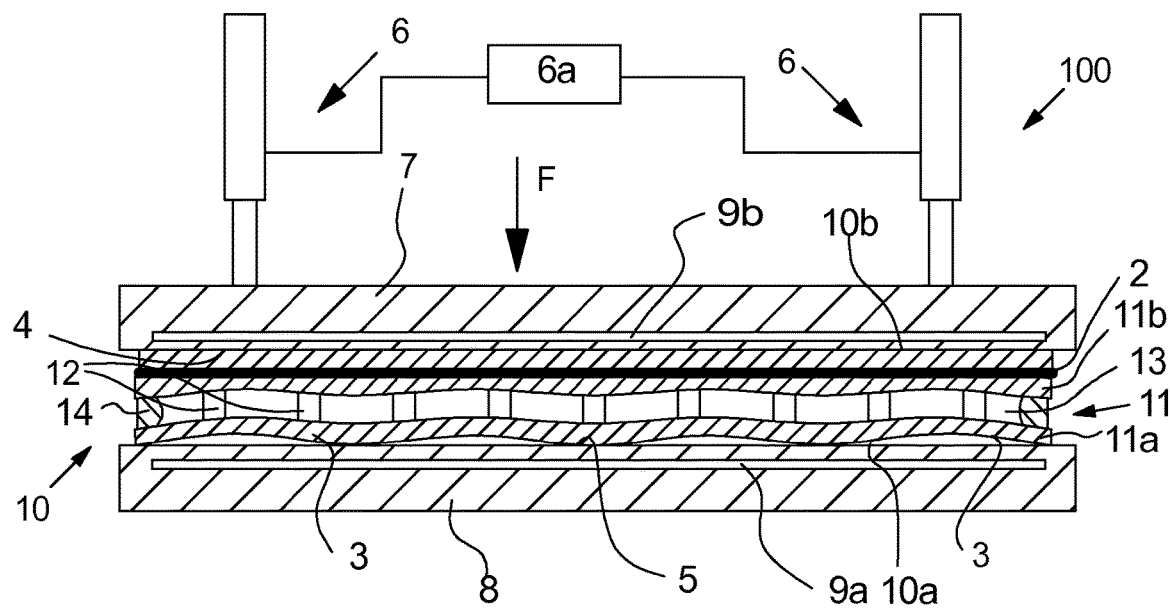
Figure 27:
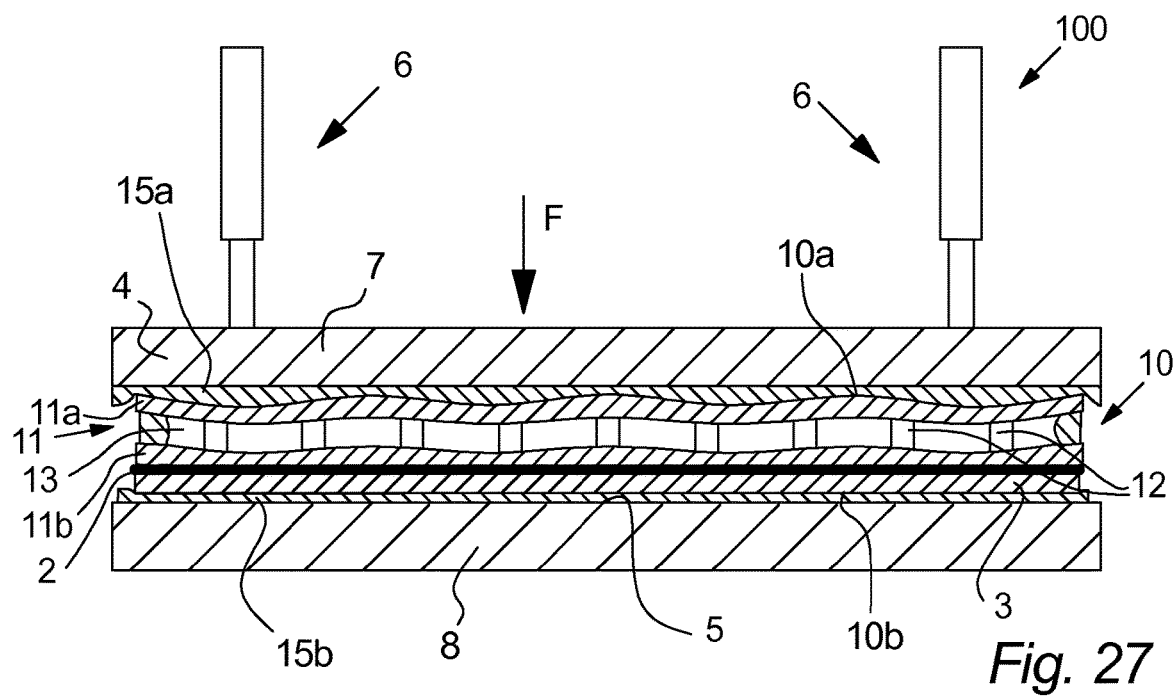
Figure 27A:
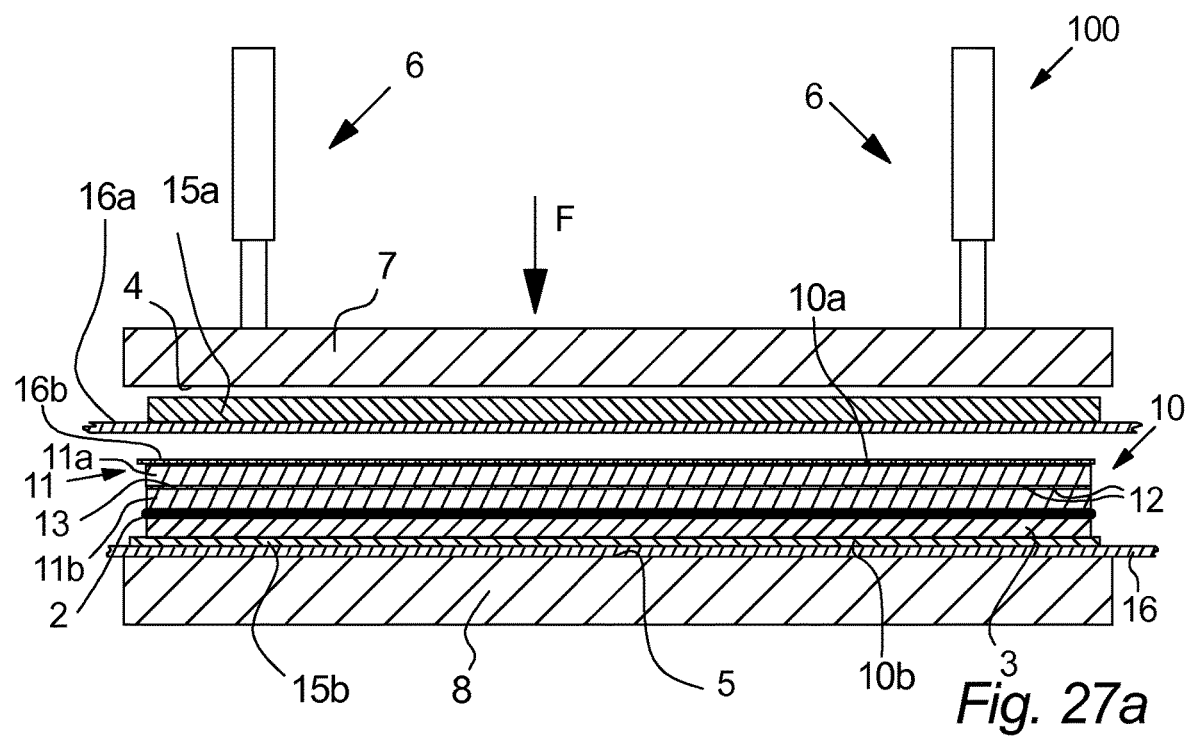
Figure 27B:
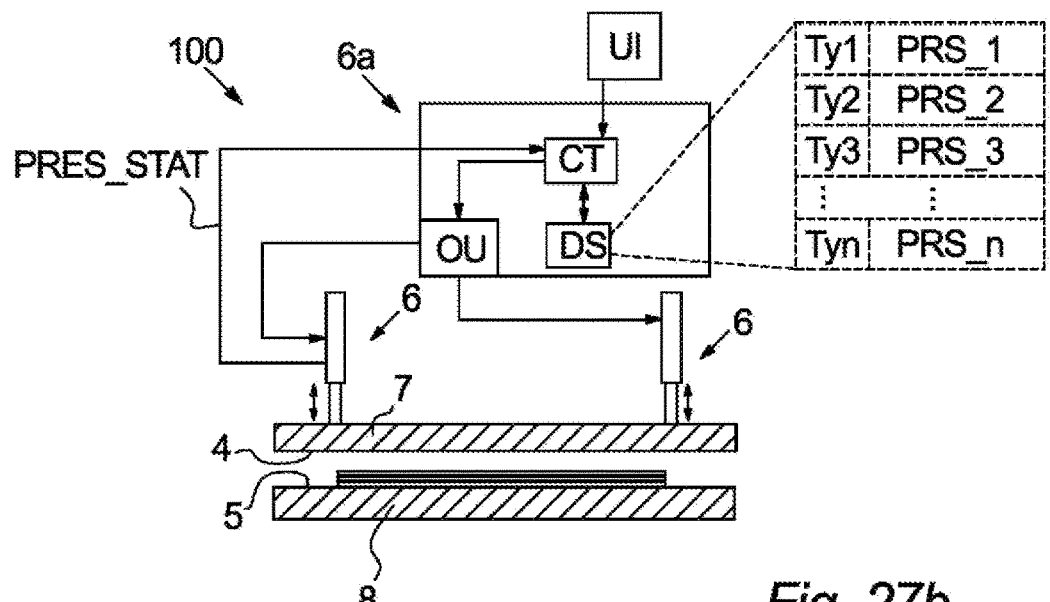
Figure 28:
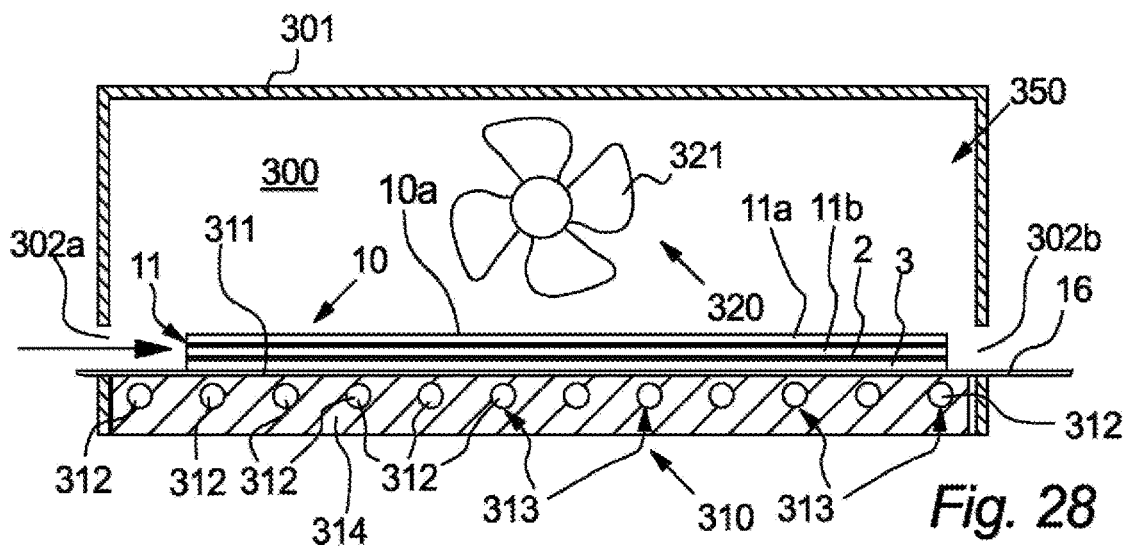
Figure 29:
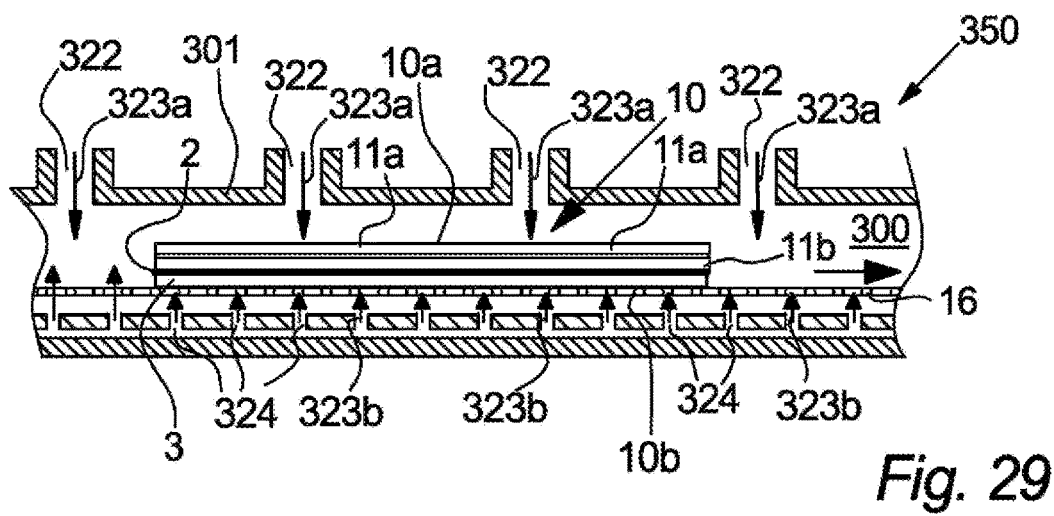
Figure 30:
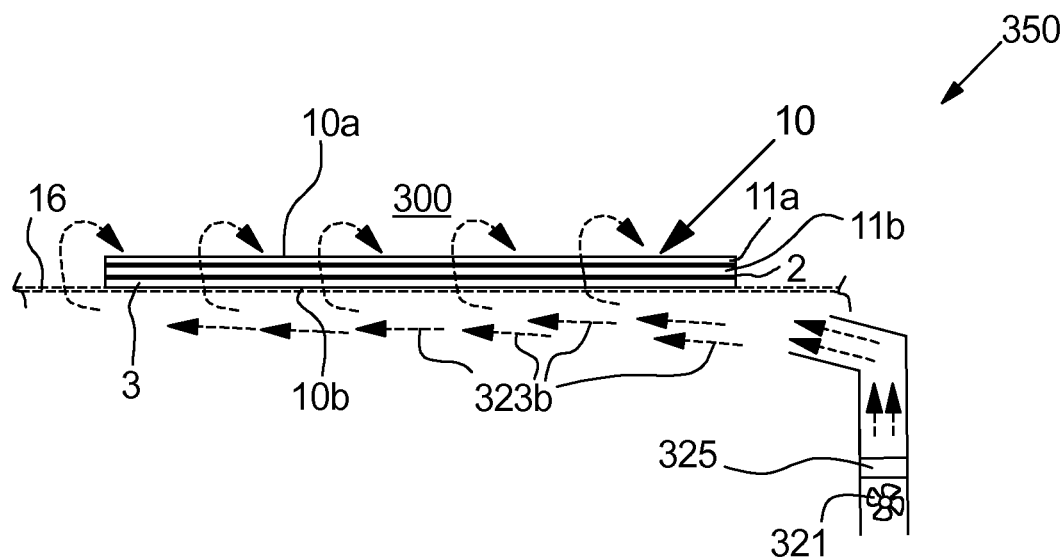
Figure 31:
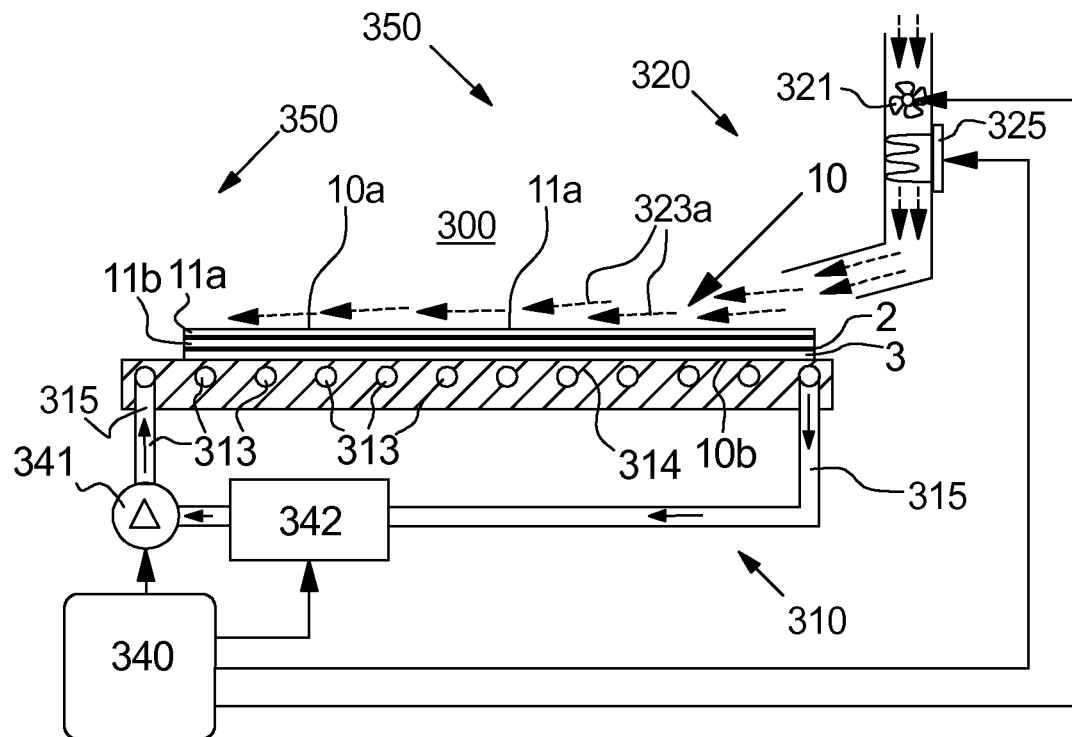
Figure 32:
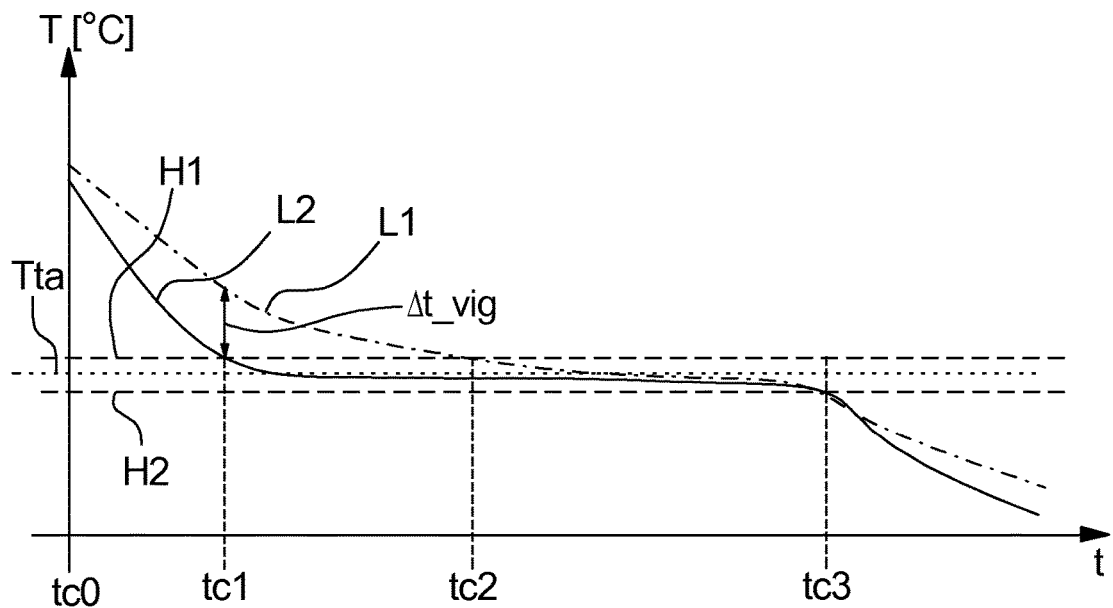
Figure 33:
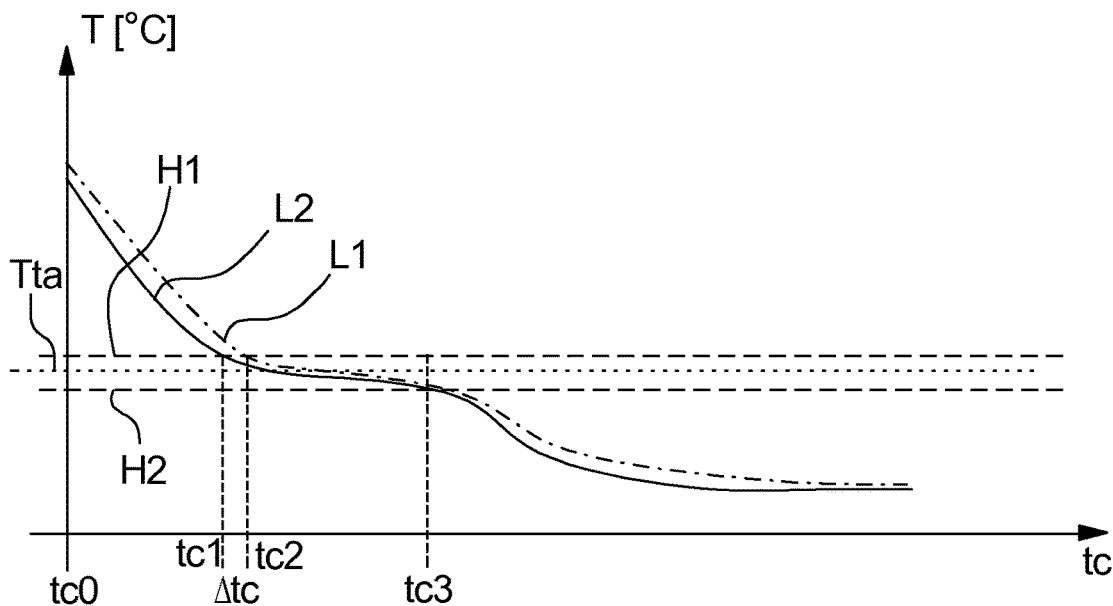
Figure 34:
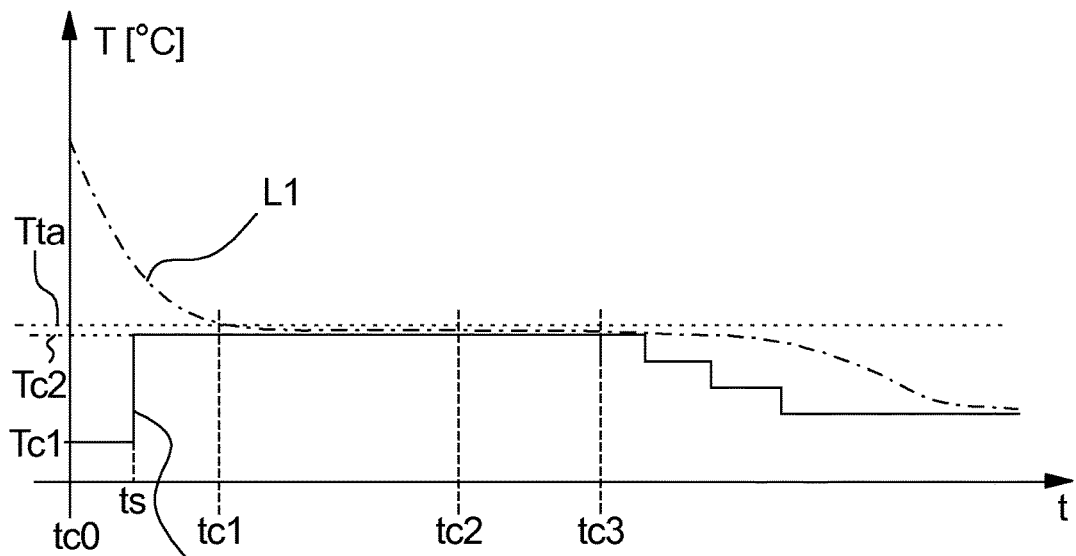
Figure 35:
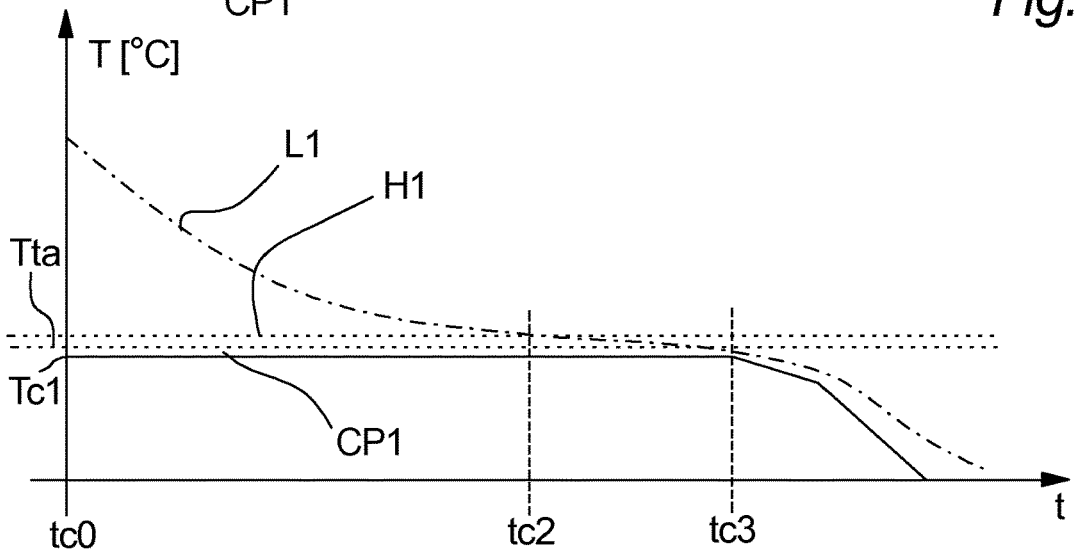
Figure 36:
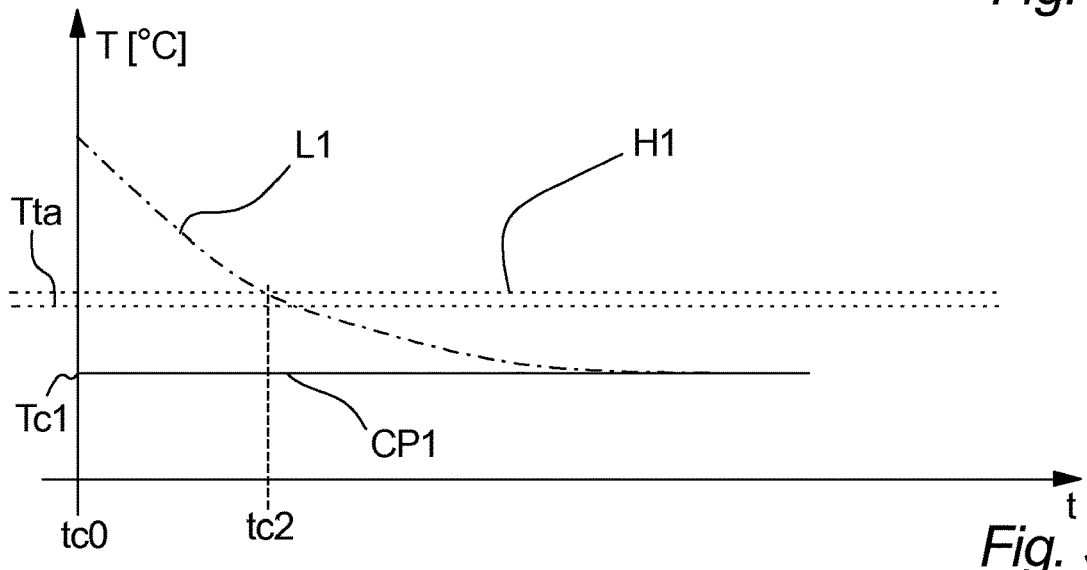
Figure 37:
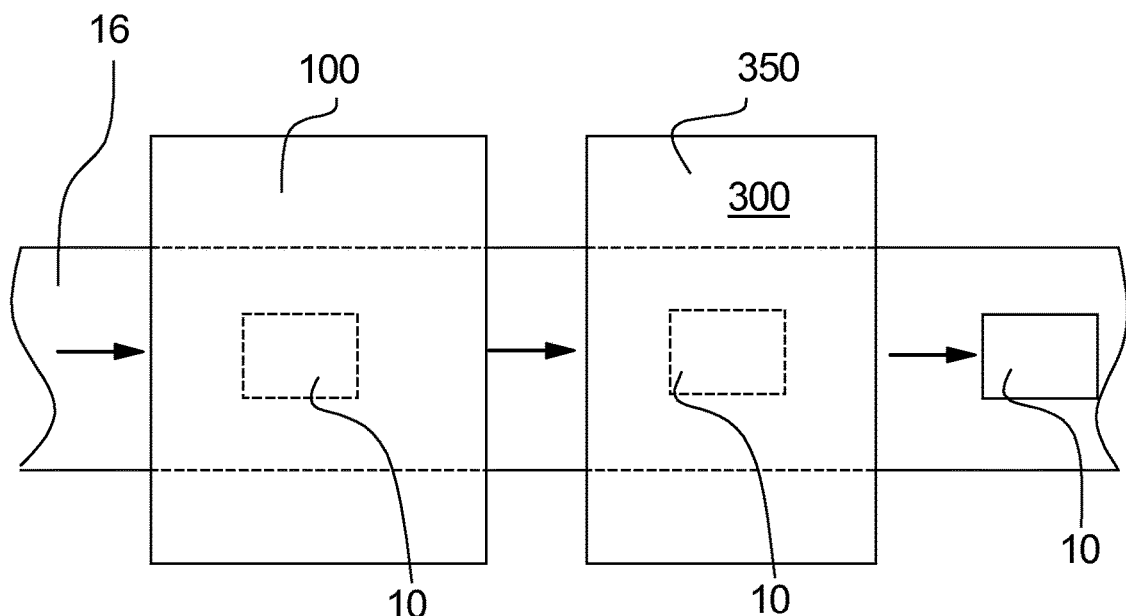
Figure 38:
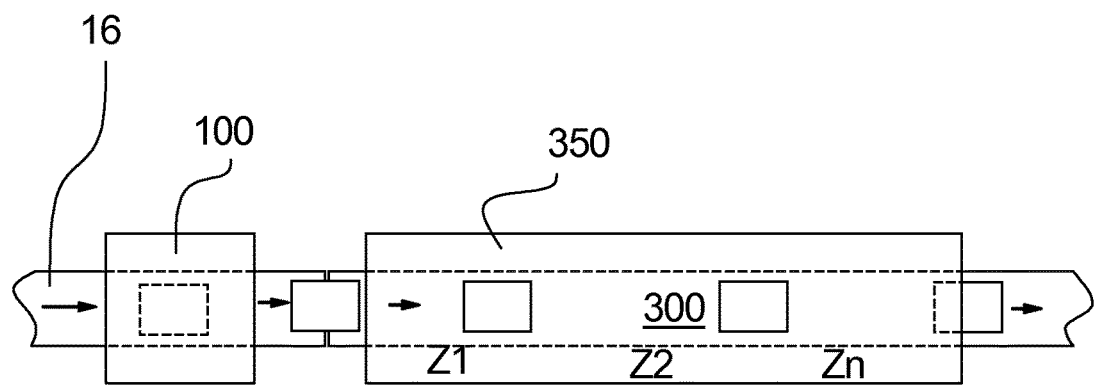
Figure 39:
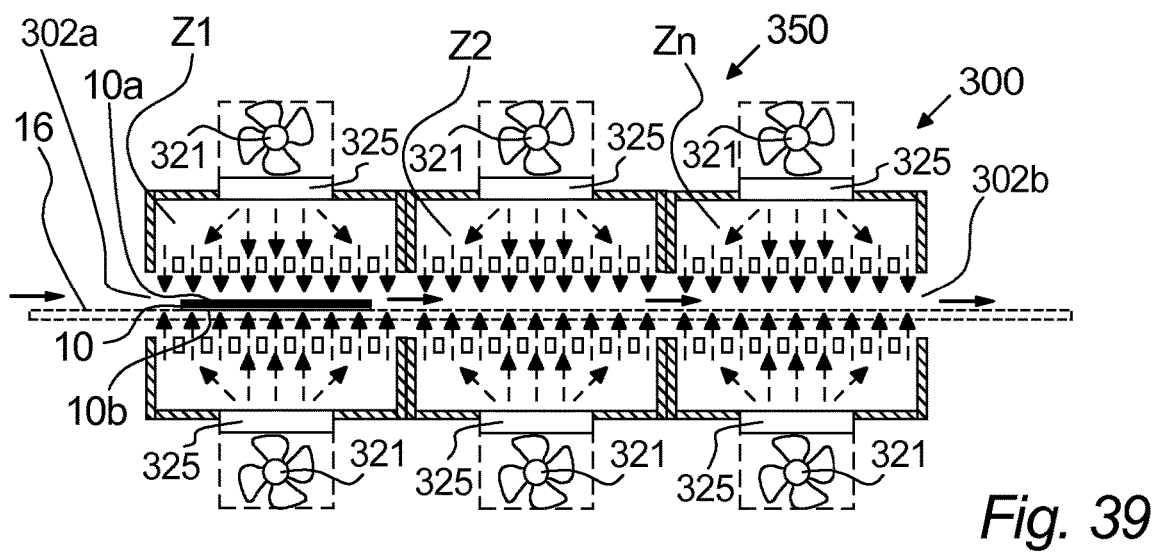
Figure 40:
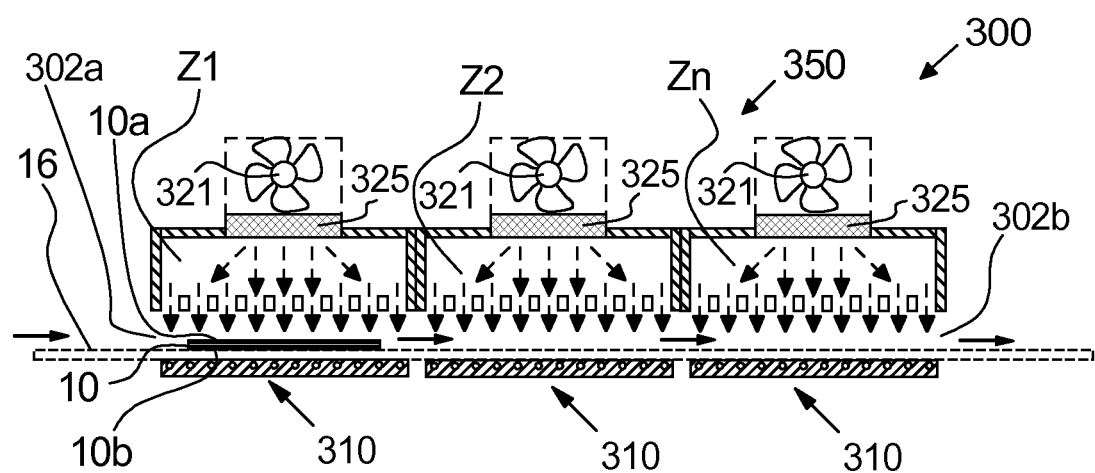

Aspects of the present disclosure will be described in the following with reference to the figures in which:

FIG. 1: illustrates a lamination assembly according to embodiments of the present disclosure, FIG. 2: illustrates a method and system for providing a lamination of a lamination assembly according to embodiments of the present disclosure, FIG. 3 illustrates embodiments of the present disclosure wherein one or more heater elements are placed in or at clamping bodies, FIG. 4 illustrates embodiments of the present disclosure where a resilient layer is used, FIG. 5 illustrates a lamination assembly supported by a transport member according to embodiments of the present disclosure, FIG. 6 illustrates schematically embodiments of the present disclosure where a lamination assembly is arranged in a vacuum enclosure, FIGS. 7-12 illustrates embodiments of the present disclosure where a lamination assembly is subjected to different temperatures during lamination, FIGS. 13-13a illustrates embodiments of the present disclosure wherein an inflatable member is used, FIGS. 14-15 illustrates embodiments of the present disclosure relating to heating arrangements for heating a lamination assembly, FIGS. 16a-16b illustrates a lamination assembly before and after a lamination process according to embodiments of the present disclosure, FIGS. 17a-18 illustrates a laminated VIG unit according to various embodiments of the present disclosure, FIG. 19 illustrates embodiments of the present disclosure where a pressure chamber is used for providing a compression pressure, FIG. 20 illustrates a flowchart according to embodiments of the present disclosure, FIG. 21 illustrates a building comprising one or more laminated VIG units according to embodiments of the present disclosure, FIGS. 22-24 illustrates a lamination process according to various embodiments of the present disclosure, FIG. 25 illustrates embodiments of the present disclosure where an inflatable member for providing a compression pressure is arranged below a lamination assembly, FIG. 26 illustrates embodiments of the present disclosure where a further sheet and lamination layer of a lamination assembly are arranged on top of the VIG unit, FIG. 27 illustrates embodiments of the present disclosure where resilient layers are used at both sides of a VIG assembly during a lamination cycle, FIG. 27a illustrates a heating step according to further embodiments of the present disclosure, FIG. 27b illustrates an embodiment of the present disclosure where different compression pressure settings are applied dependent on VIG unit assembly type, FIG. 28 illustrates embodiments of the present disclosure, where a heated lamination assembly is subjected to a cooling step, FIG. 29 illustrates embodiments of the present disclosure where a cooling step is provided by means of convection cooling, FIG. 30 illustrates embodiments of the present disclosure where a cooling step is provided by means of convection cooling directed at one major surface, FIG. 31 illustrates further embodiments of the present disclosure where conduction and convection cooling is provided in a cooling step, FIGS. 32-33 illustrates graphs of a cooling step according to embodiments pf the present disclosure, provided by means of a cooling system FIGS. 34-36 illustrates graphs of cooling profiles according to various embodiments of the present disclosure, FIG. 37 illustrates a lamination solution comprising a heating step followed by a cooling step, according to embodiments of the present disclosure, FIG. 38 illustrates a lamination solution comprising a heating step followed by a zone-divided cooling step, and FIGS. 39-40 illustrates zone-divided cooling steps according to various embodiments of the present disclosure.

DETAILED DESCRIPTION

In relation to the figures described below, where the present disclosure may be described with reference to various embodiments, without limiting the same, it is to be understood that the disclosed embodiments are merely illustrative of the present disclosure that may be embodied in various and alternative forms. The figures are not to scale; some features may be exaggerated or minimized to show details of particular components. Therefore, specific structural and functional details disclosed herein are not to be interpreted as limiting, but merely as a representative basis for e.g. teaching one skilled in the art to variously employ the present disclosure.

FIG. 1 illustrates schematically a cross sectional view of a lamination assembly 10 according to embodiments of the present disclosure.

The lamination assembly 10 comprises a vacuum insulated glass (VIG) unit 11. The VIG unit 11 comprises two thermally tempered glass sheets 11a, 11b separated by a plurality of support structures 12 distributed in a gap 13 between the tempered glass sheets 11a, 11b. An edge sealing 14 made from e.g. a soldering material such as a low temperature solder glass material which may be lead free, or alternatively a metal seal, extend between the glass sheets and enclose the gap 13 so it is sealed. The gap 13 is been evacuated to a pressure below $10^{-3}$ bar such as at or below $10^{-2}$, $10^{-3}$ or $10^{-4}$ mbar, and has been sealed. The evacuation of the gap 13 may e.g. have been established, prior to the lamination, through an evacuation opening (not illustrated in FIG. 1) in one of the glass sheets 11a, 11b which is subsequently sealed to maintain the reduced pressure in the gap 13.

The distance between the major surfaces of the VIG unit's glass sheets 11a, 11b facing the evacuated gap may in embodiments of the present disclosure be less than 0.5 mm, such as less than 0.3 mm, for example around 0.2 mm or below 0.2 mm, for example around 0.1 mm The glass sheets 11a are made from tempered glass such as thermally tempered glass, and as illustrated, the major surface of the glass sheets are uneven/wavy which may be a result/side effect of the thermal tempering. The variation may be up to ±0.1 mm, providing a height difference between "crests" and "troughs", or also denoted as "peaks" and "valleys", of the surface tempered glass sheet surface of up to 0.2 mm or even more. It is however understood that the surface variations are exaggerated in order to enhance the understanding of the figures.

The lamination assembly 11 moreover comprises a lamination layer 2 arranged between an outer surface 20 of the tempered glass sheets 11b of the VIG unit 11 and a further sheet 3 of the lamination assembly 10. The further sheet 3 may have substantially the same width and length as the glass sheets of the VIG unit. The further sheet 3 may in one or more embodiments of the present disclosure be an annealed glass sheet, it may be a thermally tempered glass sheet, it may be a hard polymer plate transparent to light in the visible range and/or the like.

The lamination layer may in one or more embodiments of the present disclosure be a Polyvinyl butyral (PVB) or a Ethylene Vinyl Acetate (EVA) layer, or it may be a Sentry-Glass® plus lamination layer.

The lamination layer 2 may in one or more embodiments be a multi-layer lamination layer made from a plurality of sheets of lamination material such as e.g. PVB or EVA.

The outer major surface 10b of the further sheet 3 may provide a first outer major surface of the lamination assembly 10, and the outer major surface 10a of the glass sheet 11a of the VIG unit 11 facing away from the lamination layer may provide the other outer major surface (10a) of the lamination assembly 10.

It is to be understood that the outer surfaces 10a, 10b may be coated with a coating layer (not illustrated) in one or more embodiments of the present disclosure.

The lamination layer 2 may e.g. have a thickness th1 between 0.25 mm and 3 mm, such as between 0.4 mm and 2.7 mm, e.g. between 0.7 mm and 2.4 mm. The thickness th1 may in one or more embodiments of the present disclosure be obtained by means of a multilayer lamination sheet comprising a plurality of stacked sheets made from a lamination material such as e.g. PVB or EVA.

The multi-layer lamination layer may in one or more embodiments of the present disclosure e.g. comprise between 2 and 7 layers such as between 2-5 layers, e.g. between 3 and 5 layers of lamination material such as PVB or PVA. Each layer of these may have a thickness of about 0.2-0.5 mm such as between 0.3 and 0.4, e.g. about 0.38 mm, and may together provide a lamination layer 2 thickness of between 0.25 mm and 3 mm, such as between 0.4 mm and 3 mm, e.g. between 0.7 mm and 2.4 mm. For example in one or more embodiments, the lamination layer may comprise two sheets of 0.38 mm PVB or EVA, thus providing an about 0.76 mm lamination layer, or e.g. a layer 2 comprising three or four lamination sheets each having a thickness of 0.2-0.5 mm such as between 0.3 and 0.4, e.g. about 0.38 mm.

Alternatively or additionally, the lamination layer may be a multilayer lamination layer comprising layers providing different properties such as different optical properties, e.g. frosting effect, a colouring effect, a window tinting effect and/or the like, and/or it may provide further effects such as e.g. a heat reflecting effect.

FIG. 2 illustrates schematically a method and system for providing a lamination of a lamination assembly 10 according to embodiments of the present disclosure. The lamination assembly is arranged to be subjected to a compression pressure F during lamination of the VIG unit 11 by means of the system 100.

The lamination assembly 10 is arranged between clamping surfaces 4, 5 of clamping bodies 7, 8 of the system 100 for providing a heating step.

The lower clamping surface 4 provides a support and counter pressure/force for supporting a major surface 10b the lamination assembly when the clamping surfaces are moved relative to each other to provide the compression pressure F to the outer, major surfaces 10a, 10b of the lamination assembly 10.

Both clamping surfaces 4a, 4b is/are in the present example substantially plane and provided by rigid clamping bodies 7, 8 configured to be displaced by one or more mechanical clamping body displacers 6 to provide said compression pressure F.

The clamping bodies 7, 8 may comprise metal plates or blocks, or it may comprise fibre reinforced blocks or plates or any other suitable type of material composition.

Generally, it is understood that the clamping bodies 7, 8 may be rigid bodies, but may e.g. comprise a substantially plane surfaces 4, 5, or alternatively a surface comprising protrusions and recesses such as slits and/or holes. The rigid bodies 7, 8 may in one or more embodiments of the present disclosure be partly hollow, e.g. to enclose a heating medium and/or the like.

Generally, in one or more embodiments, the clamping bodies 7, 8 may have the same size or may be larger than the cross sectional area of the major surfaces of the glass sheets of the lamination assembly 10, and the compression pressure F and/or heating may be provided substantially evenly to substantially the entire major, outer surfaces 10a, 10b of the lamination assembly 10.

The clamping body displacer(s) 6 may in one or more embodiments of the present disclosure comprise one or more mechanical clamping body displacer(s) such as linear actuators, for example one or more pneumatic or hydraulic linear actuators, one or more electrically operated linear actuators e.g. comprising a threaded spindle and nut actuator type where nut and/or spindle are rotated to provide a distance change between the surface(s) 4, 5, it may comprise a toothed wheel assembly e.g. comprising a rack solution connected to one or more toothed wheels and/or the like. It may also comprise non-linear actuators such as non-linear guides (not illustrated).

The clamping body displacer(s) 6 is/are controlled by a displacement control arrangement 6a communicatively coupled to the one or more clamping body displacer(s) 6, and comprising control circuitry which is configured to control the distance between surfaces 4,5 based on input from sensors (not illustrated) and/or human operators operating a user interface communicatively connected to the control circuitry (see also FIG. 27b). The sensors may e.g. comprise pressure sensors such as strain gauges or the like configured to provide input to controller 6a so that the controller can adapt the provided compression pressure F in accordance with the measured force.

In one or more embodiments of the present disclosure, the sensor may be sensors configured to measure the electrical current supplied to the clamping body displacers 6, if these are electrically controlled, as the current supplied may be indicative of the compression pressure F provided to the lamination assembly.

In one or more embodiments of the present disclosure, the compression pressure F applied to the lamination assembly 10 may be between 1.05 atm and 5 atm, such as between 1.2 atm and 2.5 atm, e.g. between 1.45 atm and 2 atm. This may be controlled by controller 6a based on e.g. input from the one or more sensors.

The lamination assembly 10 is thus placed between the surfaces 4, 5, and the compression pressure F is provided by moving one or both of the bodies 7,8 towards each other, thereby reducing the distance between surfaces 4, 5.

The compression pressure F may in one or more embodiments of the present disclosure be provided while one or more heaters (not illustrated in FIG. 2) heats the lamination assembly 10. This heating may comprise heating the further sheet 3 to soften the lamination layer 2 between the further sheet 3 and the VIG unit 11, and heating the VIG unit 11 to prevent a warping of the VIG unit 11 due to a temperature difference caused by the heating of the lamination layer as e.g. described in relation to various embodiments later on.

FIG. 3 illustrates schematically an embodiments of the present disclosure, wherein one or more heater elements 9a, 9b, such as electrical heating elements, or heated fluid heating elements, are placed in or at the clamping bodies 7,8. This provides a heating of the bodies 7,8, and this heating is transferred to the outer major surfaces 10a, 10b of the lamination assembly 10 by the surfaces 4, 5, thereby providing a heating of the lamination layer 2 and the VIG unit.

The heating may in one or more embodiments of the present disclosure be provided after the compression pressure is provided.

It is understood that in further embodiments of the present disclosure, the element or elements 9a in or at the body 7 for heating the major surface 10a facing away from the lamination layer 2 may thereby be omitted. Alternatively, this heating may in further embodiments be provided by heating, such as convection heating, e.g. a forced convection heating by a heating arrangement by means of ambient air/gas in the environment wherein the lamination assembly 10 is placed, and/or by means of a radiation heating solution.

In an embodiment of the present disclosure (not illustrated), one or both clamping bodies 7, 8 may be provided by a sandwich construction. This may comprise two substantially solid blocks of a material such as aluminium, brass, copper or the like, and an electrical heating blanket 9a, 9b may be placed between these two blocks. The one of or each of these blocks may e.g. have a thickness of between 5 mm and 80 mm, such as between 10 mm and 40 m, e.g. around 20 mm. For example it may be a 20 mm aluminium block+electrical heating blanket+20 mm aluminium block configuration.

The bodies 7, 8 may in embodiments of the present disclosure comprise different or the same heat capacities and/or different types of heating elements 9a, 9b. For example, the top body 7 may be of the above mentioned sandwich construction whereas the lower body may be a solid body with electrical heating cartridges embedded therein. The lower body may in embodiments have a higher heat capacity as it may be used for heating the laminated side of the VIG unit 11 comprising the further sheet 3 and the lamination layer, whereas the other side may be un-laminated and hence demand lesser capacity.

FIG. 4 illustrates schematically embodiments of the present disclosure wherein a resilient, and preferably also elastic, layer 15 such as a mat is placed between the lamination assembly 11 and the major outer surface 10a of the VIG unit, facing away from the lamination layer 2.

The resilient layer may be made from e.g. a silicone material a rubber material (e.g. synthetic or natural rubber) and/or a fabric material such as a cotton material e.g. made or chosen to be able to act as a resilient layer at the desired temperature(s) without being damaged. It may also in further embodiments of the present disclosure e.g. comprise a flexible layer comprising a Polytetrafluoroethylene (PTFE) composition, e.g. to provide a protective layer.

The thickness of the resilient layer may be between 1 mm and 10 mm, such as between 2 mm and 6 mm, e.g. between 3 mm and 5 mm. for example the thickness may be between 1 and 5 mm. In one or more embodiments, the resilient layer 15 may be a silicon mat that may have a thickness between 2 mm and 6 mm, such as between 2 mm and 4.5 mm.

The resilient layer or layers 15 may be attached to the surface 4 of the body 7 and/or 8, or may be a loose sheet that is/are placed to support/cover the surface of the lamination assembly before the compression pressure is applied.

The resilient layer 15 may in one or more embodiments of the present disclosure e.g. provide a heat insulating functionality to e.g. provide that the surfaces 10a, 10b are heated according to different heating profiles so that the surface 10b is heated faster and/or at a higher temperature than the surface 10a as e.g. described in more details later on.

The resilient layer 15 may e.g. be chosen in order to control the heat flux when heating the further sheet and/or the VIG glass sheet 11a, e.g. to obtain a different heat flux for these surfaces.

In further embodiments of the present disclosure, a resilient layer 15 may also be placed between the body 8 and the further sheet 3 (not illustrated in FIG. 4) e.g. distribute the compression pressure, to protect the lamination assembly surfaces, to provide a thermal insulation and/or the like, see e.g. FIG. 27. This layer 15 may have one or more of the same properties as suggested above, and/or may in further embodiments also be thinner than the sheet between VIG unit glass sheet 11a and the body 7 in order to e.g. obtain an increased heat flux to the further sheet 3 compared to the heat flux to the glass sheet 11a, if the bodies 11a, 11b comprises a heating solution.

FIG. 5 illustrates schematically a lamination assembly 10 supported by a transport member 16 according to embodiments of the present disclosure. The transport member/arrangement 16 is configured to support and transport the lamination assembly 10 to and from a location so as to be subjected to said compression pressure F and/or heating, see e.g. description above relating to FIGS. 2-3 and/or description below.

The transport member support on the clamping surface 5 and slides over this surface.

The compression pressure F is applied so that the transport member 16 is clamped between the lamination assembly 11 and surface 5.

The transport member 16 may comprise a sheet of soft material such as a woven fabric material. In one or more aspects of the present disclosure, the transport member 16 may be a polymer material such as a nylon/polyamide material, e.g. a nylon fabric sheet. The transport member 16 is arranged between a clamping surface 3 and the lamination assembly 10 while the compression pressure F is provided, and thereafter, the transport member 16 may move the lamination assembly 10 when the lamination process is sufficiently done/finished, e.g. to a cooling down location for further cooling the now laminated VIG unit. This is done after the compression pressure F has been released again by increasing the distance between surfaces 4,5.

The cooling may generally, in various embodiments of the present disclosure, be provided by a forced cooling solution, e.g. in a convection cooling chamber where a temperature controller controls the temperature and where cooling air/gas is supplied by means of one or more nozzles or the like (Various embodiments of this is described in more details later on in relation to one or more of FIGS. 28-40), or it may be provided by means of natural cooling.

The surface 5 may in one or more embodiments of the present disclosure be applied with a friction reducing layer (not illustrated) such as e.g. Polytetrafluoroethylene (PTFE) based layer, to reduce friction when sliding the member 16 over the surface 5.

A transport member driver 17 such as an electric motor may control the movement of the transport member 16 and the lamination assembly 10 or lamination assemblies 10 transported on the transport member 16. The transport member 16 may in one or more aspects be arranged to provide/constitute a conveyer belt. Hence, when a sufficiently finished lamination assembly is moved away from the pressure arrangement 7,8, a new lamination assembly may be moved in between the bodies 7, 8 by the transport member 16. The belt 16 may e.g. be a PTFE conveyer belt with a poly-praraphenylene terephthalamide based mesh.

FIG. 6 illustrates schematically embodiments of the present disclosure where the lamination assembly 10 is arranged in a vacuum enclosure 18. The lamination assembly 10 is subjected to an evacuation step in the vacuum enclosure, e.g. during applying said compression pressure (F). This evacuation step may help to remove gas bobbles/remains between the lamination layer and the VIG unit 11 and/or between the lamination layer 2 and the further sheet 3.

The evacuation step may in one or more embodiments of the present disclosure help to apply a part of the compression pressure F, e.g. up to about 1 atm, and the remaining compression pressure may e.g. be provided by means of a mechanical clamping arrangement 7, 8, it may be provided in a pressure chamber (not illustrated) where the ambient air pressure outside the vacuum enclosure is raised and/or the like.

The evacuation step to evacuate the space between the vacuum enclosure 18 and the lamination assembly 2 is provided by a pump 18a arranged in fluid communication 18b (e.g. a tube/pipe or the like) with the interior of the vacuum enclosure 18.

The vacuum enclosure 18 is in the example of FIG. 6 a flexible sheet/bag that cover the lamination assembly 10 in an air-tight way and which can be evacuated to press onto the lamination assembly 10 and remove gas remains between the further sheet 3 and the VIG unit 11.

Figure 7:
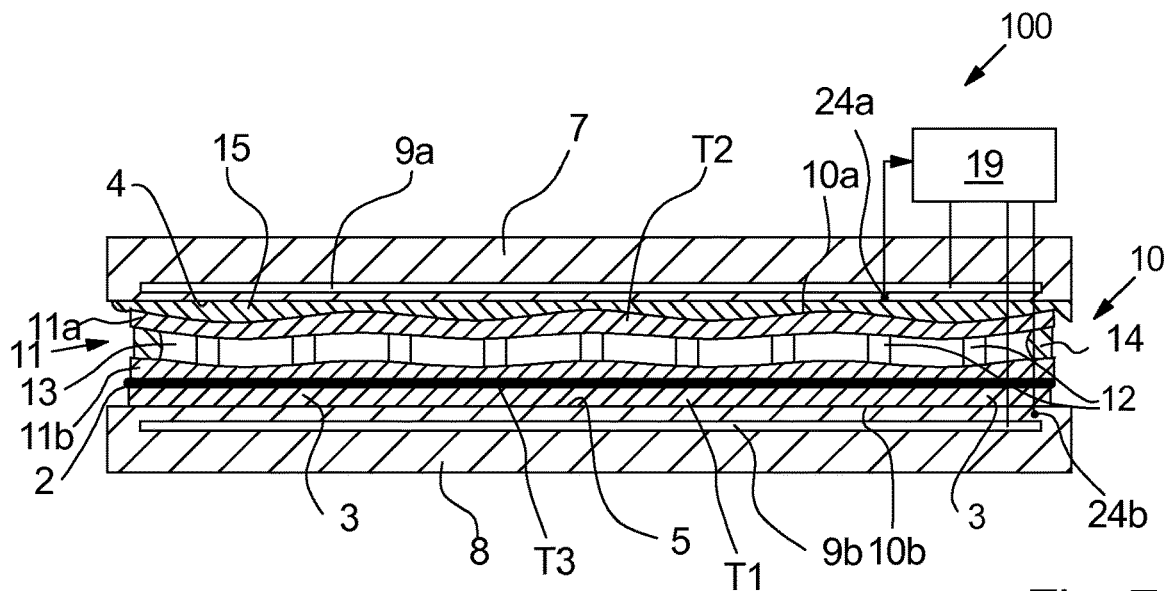

FIG. 7 illustrates schematically embodiments of the present disclosure where the outer major surfaces 10a, 10b of the lamination assembly are subjected to different heating temperatures T1, T2.

The outer major surface 10b of the further sheet 3 is subjected to a first heating temperature T1, and the outer, major surface 10a of the glass sheet 11a of the VIG unit 11 facing away from the further sheet 3 is subjected to a second heating temperature T2.

The first temperature T1 is higher than the second temperature T2 at substantially the same point in time in order to heat the lamination layer to soften the lamination layer to an extent where the lamination can be provided sufficiently, e.g. by means of applying a compression pressure as e.g. explained in various embodiments or aspects above and/or below.

Heating element or elements 9b provides temperature T1, and heating element or elements 9a provides temperature T2.

In one or more embodiments of the present disclosure, the temperature T1 provides that the lamination layer 2 is heated to a softening temperature between 85° C. and 160° C., such as between 90° C. and 155° C., e.g. between 95° C. and 150° C. In further embodiments of the present disclosure, the lamination layer temperature may be heated to e.g. between 90° C. and 110° C., such as between 95° C. and 105° C.

In further embodiments, the lamination layer may be heated to a temperature between 100° C. and 190° C., such as between 125° C. and 165° C., e.g. between 140° C. and 150° C. during lamination.

The temperature T2 may e.g. be set or adapted to be substantially corresponding to the temperature to which the glass sheet 11b of the VIG unit facing the lamination layer 2 is heated due to the heating by T1.

The heating element or elements 9a, 9b are arranged in or at the heating bodies 7, 8.

A resilient layer 15 as e.g. previously explained may be arranged between the surface 10a and the heating element or elements. In the present example, the layer 15 is arranged between the outwardly facing surface 10a of the VIG unit and the heating element or elements 9a. In further embodiments of the present disclosure, (not illustrated in FIG. 3) a resilient layer 15 may be arranged between the further sheet 3 and the heating element or elements 9b.

In further embodiments, the resilient, preferably elastic, layer/mat 15 may be omitted.

In still further embodiments of the present disclosure, the heating element or elements 9a, 9b, such as electrical heating wires, may be embedded in the resilient layer 15 (not illustrated), or be arranged between the layer 15 and the body 7 A temperature controller 19 may on embodiments of the present disclosure comprise closed loop temperature control circuitry such as a PD (proportional-derivative controller) or PID (proportional-integral-derivative controller), or any other suitable type of closed loop control circuitry configured to control the heating of the surfaces 10a, 10b respectively to the different temperatures. The controller 11 may e.g. receive temperature information from temperature sensors 24a, 24b in, at or near the bodies 7, 8 which may be used for determining the temperature of the surfaces 4,5, and the controller 19 may control the heating arrangements 9a, 9b based thereon.

In other embodiments, the temperature controller may comprise an open loop control system.

The temperature difference between the first T1 and second T2 temperature may in one or more embodiments be provided by different temperature settings of the first and second heating arrangements 9a, 9b, e.g. controlled by the temperature controller 19.

In one or more embodiments of the present disclosure, the initial heating temperature T1 at the outwardly facing major surface 10b of the further sheet 3 may be higher than the initial temperature T2 subjected to the major surface 10a of the glass sheet of the vacuum insulated glass VIG unit 11 facing away from the further sheet 3.

The heating temperature T1 at the outwardly facing major surface 10b of the further sheet 3 may in one or more embodiments of the present disclosure be gradually increased. The heating temperature T2 may be subjected to the major surface 10a of the glass sheet of the vacuum insulated glass VIG unit 11 facing away from the further sheet 3 may be gradually increased at a slower rate than said first heating temperature T1. For example so that dT1/dt>dT2/dt during the lamination process and determined at the same point in time, where T1 is said first temperature and T2 is said second temperature.

This may e.g., in one or more aspects of the present disclosure be provided during at least 10% of the heating time, such as at least 20% of the heating time, e.g. at least 35% of the heating time such as at least 50% of the heating time for heating the further sheet and/or the major surface of the glass sheet of the vacuum insulated glass unit facing away from the further sheet.

The first heating temperature T1 is in FIG. 7 provided by a first heating arrangement 9b, and the second heating temperature T2 is provided by a second heating arrangement 9a. These may e.g. comprise one or more electrical heaters, and/or be configured to provide heating by a fluid such as e.g. a heated oil which e.g. is supplied to the interior of heating bodies (7, 8) by a fluid flow of heated oil (not illustrated).

As can be seen in FIG. 7, the lamination assembly 2 may be arranged between first and second heating bodies 7, 8 comprising heating surfaces 4, 5 transferring heat to the VIG assembly at outwardly facing major surfaces 10a, 10b of the lamination assembly 10.

The second heating body 7 heats the outer, major surface 10a of the glass sheet of the VIG unit 11 facing away from the further sheet 3, and a heat insulating layer 15 such as a as a fabric layer, foam layer or the like as e.g. previously disclosed may be placed between the second heating body 7 and the lamination assembly 2 in further embodiments of the present disclosure.

The heating bodies 7, 8 may also, in one or more embodiments of the present disclosure, provide clamping bodies 7, 8 for providing a compression pressure F to the lamination assembly 10 during lamination of the vacuum insulated glass VIG unit 11 as e.g. disclosed above.

The heating surface 5 proximate the further sheet 3 and arranged to heat the further sheet 3 may transfer more heat to the outer surface 10b of the further sheet 3 per time unit than the heating surface 4 arranged to heat the outer, major surface of the glass sheet of the vacuum insulated glass VIG unit 11 facing away from the further sheet 3.

The heating by the first and second heating temperatures T1, T2 may in one or more aspects of the present disclosure be adapted in order to provide a substantially equal temperature of the glass sheets 11a, 11b of the VIG unit at the same time during the lamination process.

In one or more embodiments of the present disclosure, the first temperature T1 and the second temperature T2 are configured to follow different heating profiles.

Figure 8:
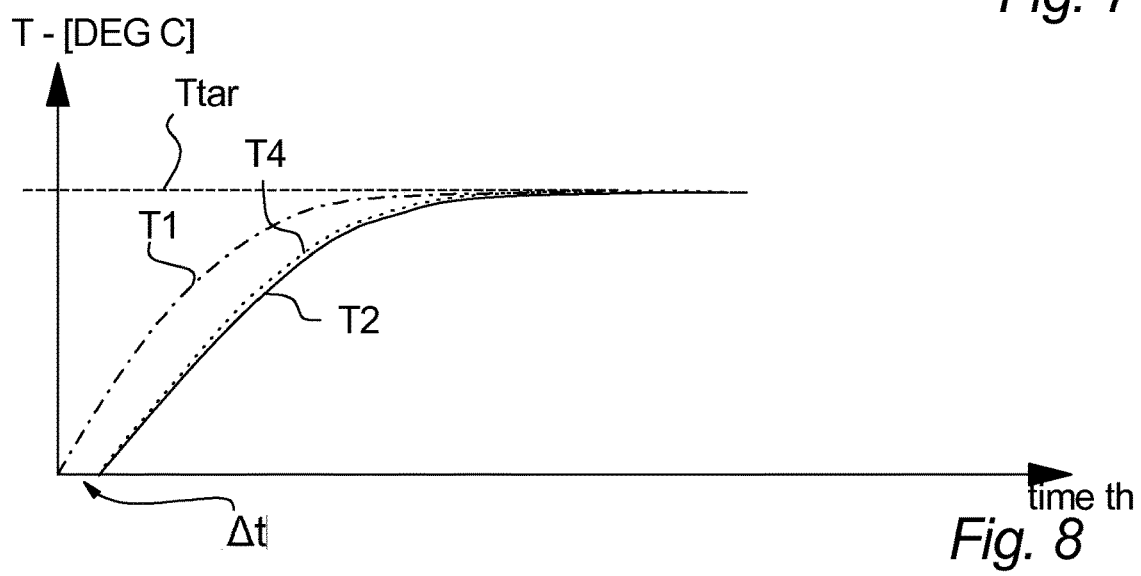

FIG. 8 illustrate an embodiment of the present disclosure where the first temperature T1 (dash/dotted line) and the second temperature T2 (solid line) are configured to follow different heating profiles. As can be seen, the surface of the further sheet 3 may be subjected to a faster temperature increase (see T1 profile as the dashed/dotted line), compared to the temperature increase of the glass sheet 11a of the VIG unit 11 comprising an outwardly facing surface 10a facing away from the lamination layer 2, towards a target temperature Ttar for the lamination layer.

The target temperature Ttar may in one or more embodiments of the present disclosure be at or near the temperature desired for softening the lamination layer sufficiently to provide the desired bonding and/or softness to allow a pressing of the VIG unit surface into the softened lamination layer 2.

The temperature T4 (dotted line) near the solid line T2 illustrates the temperature increase of the glass sheet 11b of the VIG unit proximate the lamination layer 2 due the T1 heating. As can be seen, this heating of glass sheet 11b may be delayed compared to the temperature T1 providing the heating of sheet 11b due to that the further sheet 3 and the lamination layer 2 are heated together with the glass sheet 11b.

T2 illustrates the temperature profile obtained by heating the glass sheet 11a of the VIG unit facing away from the lamination layer 2. As can be seen in FIG. 8, this heating may in one or more embodiments be time delayed $\Delta t$ to accommodate/adapt to the delay in the heating of the sheet 11b due to that the further sheet 3 and the lamination layer 2 are arranged between the VIG and the heating surface 5. This may e.g. be controlled by e.g. increasing the temperature of the heater or heaters 9a later than the heater or heaters 9b to give the heating provided by the heater or heaters 9a time to be transferred through the further sheet and the lamination layer to the glass sheet 11b. The time delay $\Delta t$ may e.g. be more than 10 seconds, such as more than 50 seconds, e.g. more than 3 minutes, such as more than 5 minutes. For example, the time delay may be between 10 seconds and 10 minutes.

The time delay may e.g. in one or more embodiments be provided by a timer function providing a count down from a start point (determined by e.g. an operator or a sensor), and after this, the controller 6a as previously disclosed may control the displacer(s) 6 so as to lower the upper body 7 to provide a conduction heating and compression pressure.

The time delay $\Delta t$ may also or alternatively be controlled by the temperature control arrangement 19 in one or more aspects of the present disclosure, e.g. by a closed loop control such as a PD or PID control, or an open loop control. Also or alternatively, the time delay $\Delta T$ be provided at least partly by placing a heat insulating layer 15, see e.g. FIG. 4, in between the heater arrangement heating the surface 10a, and/or by providing/selecting different materials and/or constructions of the bodies 7,8 having different heat transfer characteristics enabling that one body 8 transfer heat faster than the second body 7.

It is understood that the time delay time delay $\Delta T$ may provide that the lamination assembly is subjected to different temperatures at the same point in time at the oppositely directed outer major surfaces (10a, 10b) of the lamination assembly 10.

This may cause an desired adaption of the heating of the lamination assembly to varying heat capacity characteristics at the different sides of the VIG unit to be laminated. This may e.g. be relevant if one of the surfaces 11a is to remain unlaminated whereas the other surface 11b is to be attached to the lamination layer 2.

For example, the time delay $\Delta T$ may also in embodiments of the present disclosure help to provide that the first temperature T1 is higher than the second temperature T2, as the lamination layer 2 and further sheet 3 may initially be increased in temperature before the "active" conduction heating is provided/started at the other side of the VIG unit. For example, the further sheet 3 may face downwards and support on a clamping surface (with e.g. a resilient layer and other materials between the sheet 3 and the clamping surface) while getting initially heated. Then after the time delay $\Delta T$, the other clamping surface may be lowered onto the upwardly facing surface of the lamination assembly to heat it, thereby providing a time delayed conduction heating of this surface. This may provide an initial compression pressure to the major outer surfaces of the lamination assembly. In further aspects, after a further time delay, one or more clamping body displacers as previously described may be operated again to apply a further compression pressure to the lamination assembly (not illustrated in FIG. 8).

Figure 9:
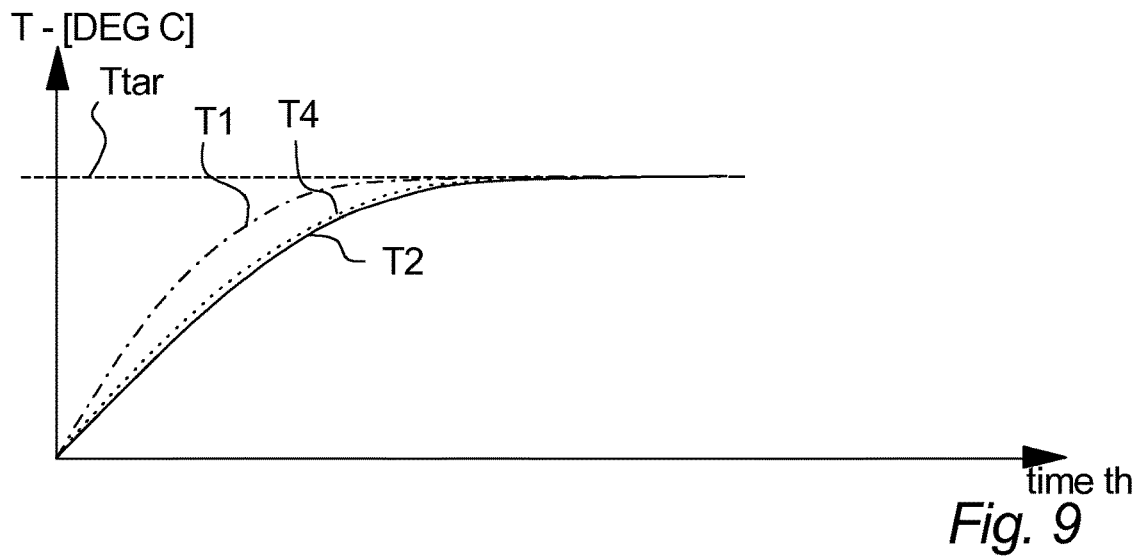

FIG. 9 illustrate a further an embodiment of the present disclosure where the first temperature T1 and the second temperature T2 are configured to follow different heating profiles. Here, the heating temperature T1 at the outwardly facing major surface 10b of the further sheet 3 is gradually increased. The heating temperature T2 subjected to the major surface 10a of the glass sheet of the unit 11 facing away from the further sheet 3 is gradually increased at a slower rate than the first heating temperature T1. The heating processes T1, T2 may here be started at substantially the same time, but due to the different heating slopes, the glass sheet temperature (T4—dotted line) of the glass sheet 11b will tend to follow the heat profile for the second temperature T2 due to that the further sheet 3 and the lamination layer need to be heated to heat the glass sheet 11b. The heating profile (solid line) for the second temperature T2 may in one or more embodiments of the present disclosure be adapted in order to follow the temperature change of glass sheet 11b, so that the glass sheets 11a, 11b does not vary too much towards the target temperature Ttar.

In FIGS. 8 and 9, the temperature of the glass sheet 11a may substantially follow the T2 heating profile.

Figure 10:
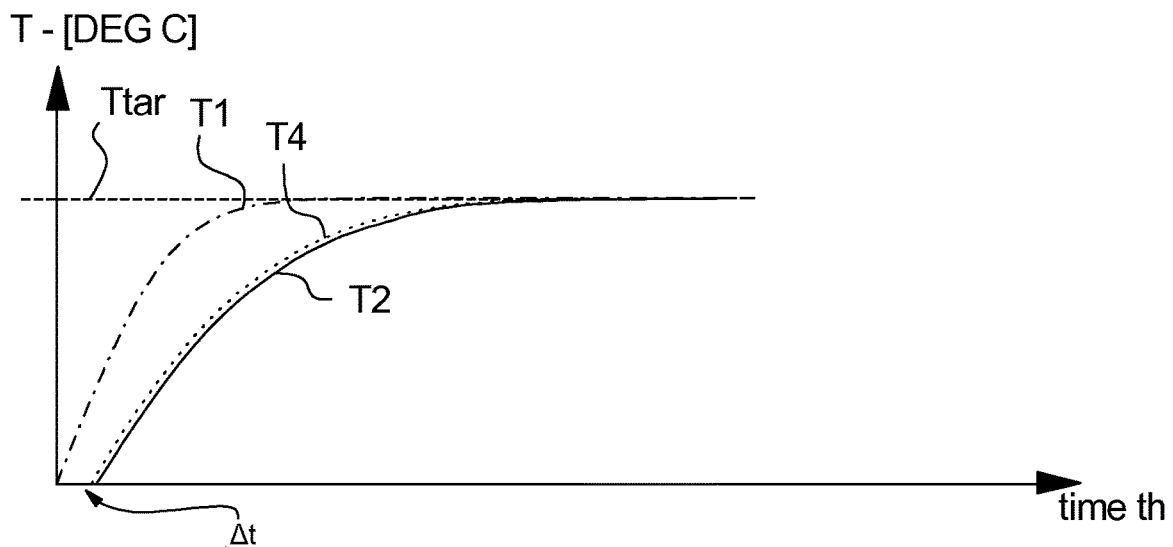

FIG. 10 illustrates an embodiment of the present disclosure where a combination of FIGS. 8 and 9 is disclosed where both a time delay is provided to the heating of the glass sheet 11a of the VIG unit and where the temperature T1 is raised on the further sheet 3 with a steeper slope than on the VIG unit glass sheet 11a having an outer surface facing away from the VIG gap 13 and the lamination layer 2.

Again, this may help to provide that the temperature T4 of the VIG glass sheet 11b facing the lamination layer is heated at a slope to which the heating temperature T2 is adapted.

FIG. 11 illustrates an embodiment of the present disclosure, where the temperature T1 end at a temperature above the desired target temperature Ttar for the lamination layer 2, e.g. as an overshot provide due to PD or PID regulation, so that the further sheet 3 may be subjected, at least in a short time span, to a temperature above the target temperature Ttar.

The temperature T2 of the sheet 11a however substantially follows the actual heating curve T4 of the glass sheet 11b provided due to the temperature T1.

FIG. 12 illustrates an embodiment of the present disclosure wherein the heating profile for temperature T1 provides a substantially constant temperature at the further sheet 3, e.g. as illustrated, at a temperature above the target temperature Ttar for the lamination layer 2. This provides the temperature raise as illustrated by T4 (dotted line) in the VIG glass sheet 11b proximate the lamination layer 2. The temperature T2 subjected to the VIG glass sheet 11a having a major surface facing away from the VIG gap 13 and the lamination layer 2 is regulated or in other ways adapted in order to substantially follow the T4 heating profile during the heating time th.

It is understood that the various embodiments described in relation to e.g. FIGS. 8-12 may provide a heating of the further sheet 3 and the VIG glass sheet 11a having a surface facing away from the VIG gap 13 and the lamination layer 2 which may be considered thermally asymmetric and/or thermal delayed due to the difference in T1 and T2, so that the temperature of the VIG unit glass sheets 11a, 11b may thereby be maintained at a desired temperature during the heating of the lamination layer and the resulting heating of the VIG glass sheet 11b proximate the lamination layer 2.

For example, the various embodiments described in relation to e.g. FIGS. 8-12 may help to provide an increased heat flux to the further sheet 3 and the lamination layer 2 compared to the heat flux provided to the VIG unit glass sheet 11a facing away from the further sheet 3, while avoiding a too large temperature difference between the glass sheets 11a, 11b during the lamination.

In one or more embodiments of the present disclosure, as e.g. illustrated in one or more of FIGS. 8-12, the heating T1 of the further sheet 3 and the heating T2 of the glass sheet 11a of the VIG unit facing away from the further sheet may follow different heating profiles.

In one or more embodiments of the present disclosure, as e.g. illustrated in one or more of FIGS. 8-12, the heating T1 of the further sheet 3 and the heating T4 of the glass sheet 11b facing the lamination layer follow different heating profiles, as a consequence of a heating of the further sheet 3 and the lamination layer 2.

FIG. 13 illustrates an embodiment of the present disclosure wherein an inflatable member 21 is inflated to provide the compression pressure F to the lamination assembly 10.

In FIG. 13, the clamping surface 4 pressing towards the lamination assembly 10 is provided directly by the inflatable member 21, but as illustrated in FIG. 13a, the inflatable member 21 may also be arranged to displace a further, e.g. heated, part comprising the surface 4.

The inflatable member 21 is inflated by a blower 22 such as a pump, controlled by a displacement controller 6a communicatively coupled to the blower 22, which inflates the member 21 based on control signals from the displacement controller 6a. The blower 22 may thus be considered a clamping body displacer which displaces the surface 4 pressing onto the lamination assembly.

The gas blown into the inflatable member may in one or more embodiments of the present disclosure be heated in order to provide a heating of the VIG unit glass sheet 10a. Also or alternatively, in one or more embodiments of the present disclosure (not illustrated) the inflatable member 21 may comprise a heating arrangement 9a embedded therein or at the member 21.

The blower 22 may in one or more embodiments of the present disclosure be configured to deflate the inflatable member after the lamination layer has been heated and the compression pressure F has been provided, to e.g. more rapidly move the member 21 away from the lamination assembly or to at least rapidly reduce the pressure to e.g. improve the manufacturing time. This may e.g. e provided by reversing a rotation direction of the blower. Alternatively, in one or more embodiments a suction unit (not illustrated) separate to blowing unit 22 may deflate the inflatable member 21.

The inflatable member in FIG. 13 may have a soft/flexible wall 21a that adapt to the surface 10a of the lamination assembly 10.

The inflatable member 21 is arranged between the lamination assembly 10 and a counter hold body 23, so that the counter hold body 23 provides a counter pressure ensuring that the inflatable member will provide the compression pressure to the lamination assembly when inflated rather than just expand away from the lamination assembly.

FIG. 13a illustrates schematically embodiments of the present disclosure wherein a rigid body 7 is provided between the inflatable member 21 and the lamination layer (see FIG. 13). The rigid body 7, such as a metal body as a plate or block, is displaced when the inflatable member 21 is inflated by the blower 22, and the rigid body comprises a clamping surface 4 acting directly or indirectly in the lamination assembly to provide the compression pressure F. In further embodiments, a resilient layer 15 (not illustrated in FIG. 13a or 13) may be arranged between surface or surfaces 4, 5)

The rigid body 7 may in one or more embodiments of the present disclosure comprise a heating arrangement 9a as e.g. described above or below.

Also, a resilient layer may be arranged between surface 4 and/or 5 and a lamination assembly as e.g. previously described.

FIG. 14 illustrates schematically one or more embodiments of the present disclosure wherein the first heating arrangement 9a comprises a plurality of heaters, such as electrical heaters, controlled by control 19. The same applies for the second heating arrangement 9b. The controller 19 may control the plurality of the heaters in the first heating arrangement 9a individually or in groups, or all heaters 9a may be controlled simultaneously to provide the desired heating of the lamination assembly, e.g. based on feedback from a plurality of temperature sensors 24a (not illustrated).

Additionally, the controller 19 may control the plurality of the heaters 9b of the second heating arrangement 9b individually or in groups, or all heaters 9b may be controlled simultaneously to provide the desired heating of the lamination assembly at e.g. the further sheet 3 of a lamination assembly, e.g. based on feedback from a plurality of temperature sensors 24b (not illustrated). In other embodiments of the present disclosure, the heating arrangements 9a, 9b may only comprise one heater each distributed in, at or near the bodies 7, 8.

FIG. 15 illustrates schematically embodiments of the present disclosure, wherein a fluid such as a liquid heating medium, e.g. an oil, molten salt or the like are used as heaters in a heating arrangement 9a, 9b for heating the lamination assembly by heating surfaces 4, 5 of a body 7, 8.

The fluid are distributed from containers 26a, 26b containing the fluid heating medium 25a, 25b respectively. In FIG. 15, individual pumps 27a, 27b provides a circulation pf the heating medium 25a, 25b through a piping system 28a, 28b in the bodies 7, 8 thereby heating the bodies and thus surfaces 4, 5.

The fluid flow of heating medium 25a, 25b provided by the pumps 27a, 27b may in one or more embodiments of the present disclosure be regulated by the temperature controller 19 to control the Temperature T1, T2 as previously explained.

The heating medium 25a, 25b in the containers 26a, 26b may be heated to different temperatures in one or more embodiments of the present disclosure to e.g. obtain a different heating temperature of surface 5 and 4 respectively as e.g. previously described.

In one or more embodiments of the present disclosure which is/are not illustrated, both piping system 28a, 28b may be supplied from the same container with heating medium having the same temperature.

It is understood that the containers ma 28a, 28b may each comprise a heater for heating the heating medium. In alternative or further embodiments (not illustrated), one or more heating medium heaters may be arranged to heat a fluid flow of heating medium 25a, 25b at a location in the supply line 29a, 29b between the containers 28a, 28b and the bodies 7, 8.

For both FIGS. 14 and 15, it is understood that the bodies 7, 8 comprising the surfaces 4, 5 in further embodiments may be configured to be displaced relative to each other by one or more clamping body displacers 6 (see e.g. previous description and figs.) so as to change the distance between the surfaces 4, 5 to provide a compression pressure F to a lamination assembly 10 arranged between the bodies 7, 8. The surfaces 4, 5 may thus both comprise heating and clamping surfaces.

FIGS. 16a-16b illustrates a lamination assembly before and after a lamination process according to embodiments of the present disclosure. In FIG. 16a, the glass sheet 11b of the VIG unit 11 facing the lamination layer support on the lamination layer. However, in the present example, the glass sheets 11a and 11b are tempered glass sheets such as thermally tempered glass sheets, having an uneven surface. Accordingly, not all of the major surface of the glass sheet 11b support sufficiently on the lamination layer.

When the compression pressure F is applied (see FIG. 16b) as e.g. previously explained in various embodiments of the present disclosure, the further sheet 3, such as an annealed glass sheet, and the glass sheet 11b are pressed towards each other, and as the lamination layer 2 is heated and thus softened, the surface of glass sheet 11b is forced into the lamination layer so that the lamination layer take up/absorb possible surface variations in the major surface of the tempered glass sheet facing lamination layer.

Crests of the tempered glass sheet 11b may thus be pushed into the softened lamination layer 2 and force it towards nearby troughs/depressions in the lamination layer 2 (see dotted arrows). This may in one or more aspects of the present disclosure be provided while an evacuation is provided to the lamination assembly to remove gas between the lamination layer 2 and the further sheet 3 and/or the VIG glass sheet 11b, see e.g. FIG. 6 and the description thereto.

FIG. 17a illustrates schematically a cross sectional view of a laminated VIG unit 200 according to embodiments of the present disclosure. The lamination layer 2 is arranged proximate/near the major surface of the glass sheet 11b of the VIG unit, This glass sheet 11b comprises comprising a gap evacuation opening 30 that has been used for evacuating the gap 13, and the gap evacuation opening 30 has been sealed by an evacuation opening seal 31, e.g. comprising a low melting point solder glass material, but it may also be another kind of seal, e.g. a metal seal, that has been heated in an evacuation cup (not illustrated) used for evacuating the gap 13 by covering and evacuating the gap 13.

In FIG. 17a, the sealed gap evacuation opening 30 and the evacuation opening seal 31 is covered by the lamination layer 2, so that the evacuation opening seal 31 extend into the lamination layer 2. This may have been provided by means of e.g. applying the compression pressure as e.g. described above.

FIG. 17b illustrates schematically a cross sectional view of a laminated VIG unit 200 according to embodiments of the present disclosure. Here, no lamination layer is present to cover the evacuation opening seal 31. This may e.g. be provided by utilizing a lamination layer where a part has been removed at the location of the evacuation opening 30 to provide space for the seal 31.

FIG. 17c illustrates schematically a cross sectional view of a laminated VIG unit 200 according to embodiments of the present disclosure. Here, no lamination layer 2 is present to cover the evacuation opening seal 31. Moreover, the further sheet 3 comprises a cut-out/recess or hole (as illustrated) at the location of the gap evacuation opening 13. The seal 31 may in one or more embodiments of the present disclosure extend into the opening 32 in the cut-out/recess or hole in the further sheet 3. However, in other embodiments the hole/opening 32 may be present but the seal 31 may not extend into the cut-out/recess or hole 32.

FIG. 17d, illustrates schematically a cross sectional view of a laminated VIG unit 200 according to embodiments of the present disclosure, where the hole 30 has a stepped configuration, and the seal 31 is placed in the stepped part of the evacuation hole 30, so it does not extend over a plane defined by the surface of the glass sheet 11b facing the lamination layer. Here, the lamination layer 2 and further sheet 3 cover the seal 31. In further embodiments of the present disclosure, the lamination layer 2 and/or further sheet 3 may however not cover the evacuation hole 30, e.g. as illustrated in FIGS. 17b and/or 17c. In still further embodiments of the present disclosure, the seal 31 in the stepped hole may however extend over a plane defined by the surface of the glass sheet 11b facing the lamination layer, e.g. as illustrated in FIGS. 17a, 17b and/or 17c.

FIG. 18, illustrates schematically a cross sectional view of a laminated VIG unit 200 according to embodiments of the present disclosure. The glass sheets 11a, 11b of the VIG unit enclosing the gap 13 are in the present example thermally tempered glass sheets, and having a rather uneven major surface such as e.g. varying in the range of e.g. up to 0.1 mm. This may have been caused by the manufacturing of the thermally tempered glass sheets. The thickness th1 of the lamination layer 2 varies in accordance with the surface variation of the thermally tempered glass sheet 11b abutting the lamination layer 2, and may thus have a thickness th1 between the glass sheet 11b and further sheet 3 which is between 0.25 mm and 3 mm, such as between 0.4 mm and 2.7 mm, e.g. between 0.7 mm and 2.4 mm, but varying across the surface.

The lamination layer thickness th1 may in one or more embodiments vary VAR1 with at least 0.1 mm such as at least 0.2 mm, e.g. at least 0.3 mm between the further sheet 3 and the VIG unit 11 across the major surface of the VIG unit, dependent on the surface variation of the thermally tempered glass sheet 11b.

The variation VAR1 may e.g. in one or more embodiments of the present disclosure be up to 0.6 mm between peak/crest to valley/though, e.g. the variation VAR1 may be between 0.2 mm and 0.5 mm from peak to valley.

The further sheet 3 is may be a glass sheet such as an annealed glass sheet which may suffer from far less surface variations, but it may also in other embodiment be a thermally tempered glass sheet.

The variation VAR1 may be estimated or measured between selected neighbouring crests/peaks and thoughs/vallys of the surface of the glass sheet 11b as illustrated, or e.g. estimated or measured from highest crest and the lowest though determined/selected, or another though, selected "globally" on the glass sheet 11b surface.

FIG. 19 illustrates schematically embodiments of the present disclosure where the lamination assembly 10 is arranged in a flexible vacuum enclosure 18 such as a flexible sheet/bag that cover the lamination assembly 10 in an air-tight way and which can be evacuated to press onto the lamination assembly 10 and remove gas remains between the further sheet 3 and the VIG unit 11. This evacuation is provided by a pump 18a arranged in fluid communication 18b (e.g. a tube/pipe or the like) with the interior of the vacuum enclosure 18.

The VIG assembly 2 is arranged in a pressure chamber 40 enclosed by walls 40a which can be pressurized by a pump 41 in fluid communication 42 with the pressure chamber 40. When pressurizing the pressure chamber 40 by the pump 41, this provides a compression pressure F to force the VIG unit and the further sheet towards each other. The remaining part of the compression pressure may be provided by means of the pump 18a and the vacuum enclosure 18, and/or the previously described bodies comprising clamping surfaces for providing a compression pressure (not illustrated in FIG. 19).

FIG. 20 illustrates a flow chart according to various embodiments of the present disclosure, e.g. as disclosed in relation to various embodiments described above.

In the first step S201, the lamination assembly 10 is provided, and arranged in a vacuum enclosure such as a bag or an evacuation chamber. Then the evacuation is provided in step S202, and the compression pressure is provided in step S203. Then the heating is provided in step 204 to heat the lamination layer 2 to soften it so that the compression pressure forces the glass sheets 11b, 3 towards each other. After this, the compression pressure is released in step S205, the lamination assembly 2 is removed again, and a new lamination assembly may be provided for the lamination process. It is understood that step S204 in further embodiments of the present disclosure may be started before a compression pressure above 1 atm. is applied.

FIG. 21 illustrates schematically a building 80 seen from the outside/exterior, comprising apertures 81 for windows 82 and a door 83 in the outer wall 84 of the building 80. The building also comprises a roof structure 85 comprising a roof window 82a.

The apertures 81 are covered by one or more laminated VIG units 200 manufactured in accordance with one or more of the embodiments of the present disclosure. The VIG units 200 are placed in a frame 71, and the frame 71 is then attached by fastening parts (not illustrated) such as mechanical fastening parts in the form of one or more hinges, screws, nails, mounting and/or the like to the wall 84 or a part of the roof structure 85 dependent on the aperture covering type (e.g. a roof window 82a.

Generally, it is to be understood that the glass sheets described in this document and used for VIG assemblies/units may in one or more embodiments be transparent to light such as light having a wavelength in the range of about 400 nm to 700 nm to at least such a degree which enables humans to see through the glass sheets of the VIG unit. Also the glass sheets may be configured so that infrared light (about 700 nm to 1 mm) is transmitted through the glass sheet, or reflected.

One or more of the glass sheets may e.g. comprise a low-E coating for improving the U-value of the VIG. The low E coating may be arranged at a major surface of one of the glass sheets 11a, 11b, and faces the gap 13 between the glass sheets.

In further embodiments of the present disclosure, the VIG units manufactured in accordance with one or more of the embodiments described in this document may be used for e.g. refrigerator units or ovens such as conventional household ovens as e.g. windows allowing viewing into the interior of such appliances.

FIG. 22 illustrates schematically a lamination process according to embodiments of the present disclosure,
where the space between the further sheet 3 and the VIG glass sheet 11b facing the lamination layer 2 is evacuated (see dashed line 52) by a vacuum pump to remove gas between these 3, 11b,
Where mechanical pressure (dash-dotted line 51) is applied to provide further pressure/compression on the glass sheet, and
where a heating (dotted line 53) is provided to soften the lamination layer 2.

The heating provides a temperature increase (solid line 50) in the interface between the lamination layer 2 and the VIG glass sheet 11b proximate the lamination layer 2, thereby heating the VIG glass sheet 11b.

It is generally understood that the values indicated in FIG. 22 are only examples according to embodiments of the present disclosure, and that e.g. other temperatures and/or pressure values may be selected in further embodiments of the present disclosure.

For example, the temperature to which the lamination layer is heated may in one or more embodiments of the present disclosure be in one of the ranges mentioned in relation to FIG. 7, for example, in one or more embodiments, between 90° C. and 110° C., such as between 95° C. and 105° C.

In the illustrated example, the VIG assembly is placed before time t1.

At time t1, the heating of the lamination layer is started.

At t2, the evacuation pump is started and this evacuates the space between the further sheet 3 and the VIG unit glass sheet 11b facing the lamination layer 2 as illustrated by dashed line 52. As can be seen, the evacuation of the space between the further sheet 3 and the VIG glass sheet 11b is provided between time t2 and time t3.

The heating provided to heat the further sheet 3 and thereby the lamination layer 2 is in the illustrated example kept substantially constant (see dotted line 53), but in further embodiments it may be controlled to vary according to a predetermined heating profile between t1 and t5. The heating 53 may in the present example be provided by heated clamping surface 5, which may be provided according to various embodiments explained above or below in the present disclosure.

The temperature at the VIG unit glass sheet 11a facing away from the lamination layer may be kept at the same temperature as the heating 53, but it may in further embodiments e.g. be kept lower or in other ways controlled, e.g. as explained in above, for example in relation to one or more of FIGS. 7-12.

At time t3, the mechanically applied compression pressure is applied (dashed-dotted line), after the space between further sheet and VIG unit is sufficiently evacuated. This may in embodiments of the present disclosure result in a time delayed heating of the other major surface/side of the VIG unit facing away from the further sheet 3 if the mechanically applied compression pressure also provides a heating by means of conduction heating as e.g. described above.

It is understood that in further embodiments, the mechanical compression pressure may be applied even before the indicated time t3 in FIG. 22, e.g. as illustrated in FIG. 24, where the pressure 51 is applied while the evacuation pump still reduces the pressure in the space between further sheet 3 and VIG unit 11 to evacuate gas. This may e.g. help to evacuate the space between the further sheet 3 and the VIG glass sheet 11b faster and/or more efficiently.

As can be seen in the example of FIG. 22, the heating of the lamination layer 2 gradually increases substantially from time t1 to the target temperature Ttar.

At t4, the applied compression pressure 51 is removed or reduced again, but the temperature 50 may continue to increase after the mechanical compression is removed or reduced at t4, e.g. as the further sheet 3 may continue to heat the lamination layer 2, e.g. as the lamination assembly still may support on the heating surface. At time t5, the vacuum is removed again, and the VIG assembly is removed at t6 to cool the lamination layer 2, e.g. by natural cooling or in a cooling compartment/chamber where the temperature is controlled to provide a cooling.

It is understood that t6, where the lamination assembly is removed, in further embodiments may be adjusted/moved dependent on e.g. the desired temperature for the lamination layer 2, the heating temperature 53 and/or the like.

In one or more embodiments of the present disclosure, the lamination process from start of the heating of the further sheet (t1) to the end where the lamination assembly is removed again (t6) may take between 5 and 30 minutes, such as between 10 and 15 minutes. This may however depend on or be adjusted dependent on the heating temperature 53 for the lamination layer 2, the desired target temperature Ttar for the lamination layer and/or the time (t3 to t4) the compression pressure is applied.

FIG. 23 illustrates schematically a lamination process according to embodiments of the present disclosure, where the lines 50-53 indicates the same parameters as in FIG. 22. The lamination assembly is placed at time t1. The heating of the lamination layer 2 by heating the further sheet 3 is however delayed in time (starting at time t2a) compared to the start of the evacuation (starting at time t2) of the space between the further sheet 3 and the VIG glass sheet 11b facing the lamination layer 2 by an evacuation pump and/or by the mechanical pressure as e.g. previously described.

The time delay between time t2 where the evacuation is started, and time t2a where the heating is started, may e.g. be adjusted/adapted so that the heating does not cause sealing of the lamination layer at the edges so that remaining gas in the space between the further sheet 3 and the VIG glass sheet 11b facing the lamination layer 2 cannot leave before the desired evacuation in the space between the further sheet 3 and the VIG unit has been obtained by the a vacuum pump and/or a further mechanical pressure as e.g. described in various embodiments above.

In further embodiments of the present disclosure, the heating may be provided from the start as e.g. illustrated in FIGS. 22 and 24, and may be timed with the evacuation speed, e.g. by selecting a properly sized evacuation pump and/or by controlling the heating speed, to avoid a that the sealing of the lamination layer 2 at the edges is caused too soon.

FIG. 25 illustrates schematically one or more embodiments of the present disclosure, substantially similar to the embodiments of FIG. 13a. However, the rigid body 7 and the inflatable member 21 for displacing the body 7 are here arranged below the lamination assembly 10 so that the lamination assembly support on the displaceable (and e.g. also heated) body 7. The body 7 and the lamination assembly 10 are thus displaced upwards when the member 21 is inflated, thereby providing the compression pressure F. When the compression pressure is released by e.g. stopping the blower 22 and e.g. opening a valve (not illustrated), and/or by reversing the blower 22, the rigid body 7 and the lamination assembly 10 automatically help to deflate the member 21 due to the weight of these and due to gravity.

FIG. 26 illustrates a further embodiment of the present disclosure where the further sheet 3 and lamination layer 2 are arranged on top of the VIG unit 11, facing VIG unit glass sheet 11b, and the compression pressure is applied by surfaces 4, 5 while the lamination assembly 10 is arranged in this way, e.g. in accordance with one or more of the embodiments described above. In further embodiments, as illustrated in a plurality of the figures previously described, the VIG unit 11 may in one or more embodiments of the present disclosure be arranged on top of the further sheet 2 and lamination layer 3 so that the VIG unit 11 provides a pressure on the lamination sheet 2 due to gravity. FIGS. 27 and 27a illustrates an embodiment of the present disclosure, where resilient layers 15a, 15b are used at both sides of a VIG assembly 10 during a lamination cycle where a compression pressure is applied between clamping bodies 6, 7 by clamping body displacers 6.

It is generally understood that the resilient layers 15a, 15b may have different thicknesses (see FIG. 27a). In embodiments of the present disclosure, the resilient layer 15a arranged at the major outer surface 10b where the further glass sheet 3 is placed may be thinner than the resilient layer 15b placed at the major outer surface 10a of the unlaminated side of the lamination assembly 10. In one or more embodiments, the thickness of the resilient layer 15b arranged at/proximate the surface 10b may be between 2 mm and 6 mm, such as between 2 mm and 4 mm e.g. obtained by a single or a plurality of layered mats. The thickness of the layer 15a arranged at/proximate the surface 10a may be between 4 mm and 10 mm, such as between 6 mm and 10 mm, e.g. about 8 mm obtained from for example layered mats such as a 3 mm and 5 mm resilient, elastic silicone mat. It is understood that any other suitable material for the mats 15 may be provided, and it may also be a combination of materials such as e.g. a fabric and silicone sheet combination.

FIG. 27a illustrates a further embodiment of the present disclosure (where the body 7 has been refracted from the lamination assembly), where a transportation arrangement 16 such as a conveyer belt or the like is placed between the lamination assembly 10 and the lower heating body 8 as previously explained. The resilient layer 15b is in FIG. 27a placed on this transportation arrangement 16 between the transportation arrangement 16 and the lamination assembly 10. In other embodiments, the resilient layer 15b may however be arranged between the transportation arrangement 16 and the lower body 8, and may be reused for several consecutive heating steps to heat a plurality of lamination assemblies without intermediate removal of the layer 15b, and the transportation arrangement may hence move relative to this resilient layer. A further low friction layer may in further embodiments of the present disclosure be provided between the resilient layer 15b and the transportation arrangement 16 so as to ease the sliding of the transportation arrangement 16 over the resilient layer 15b.

FIG. 27a illustrates a further embodiment of the present disclosure, wherein the upper resilient layer 15a is retained by a flexible retainer 16a such as a belt or the like, between the lamination assembly 10 and the resilient layer 15a. The retainer 16a can be displaced by the clamping body 7 when lowered towards the major surface 10a. This may e.g. provide easier adaption and/or replacement of the resilient layer 15a and may provide an advantageous way of reusing the layer 15a for several consecutive heating steps applied for different lamination assemblies. In other, further embodiments, the resilient layer 15a may be attached to the body 7, and the retaining top belt 16a may be omitted, or it may be a loose sheet of material (as may the layer 15a) arranged at the lamination assembly 10 before it enters in between the bodies 7, 8.

In still further embodiments of the present disclosure, as e.g. illustrated in FIG. 27a, a sheet 16b with an open air-permeable structure, such as a flexible mesh, fabric or perforated sheet, may be provided between the upper surface 10a and the body 7, such as between the upper surface 10a of the lamination assembly and the top belt 16a (as illustrated), or between the upper surface 10a of the lamination assembly and the resilient layer/member 15a. The sheet 16b with an open air-permeable structure 16b may e.g. be a synthetic fluoropolymer mesh of a tetrafluoroethylene such as a PTFE (Polytetrafluoroethylene) sheet, but other materials may also be used. This sheet 16b may help to avoid or reduce the risk of the lamination assembly 10 sticking to the top body 7, e.g. due to a suction cup effect, and is lifted by this from the bottom body 8 when the distance between the heating bodies 7,8 is increased again after the heating operation where the clamping of the lamination assembly between the bodies 7, 8 is provided.

FIG. 27b illustrates a still further embodiment illustrates an embodiment of the present disclosure where different compression pressure settings are applied dependent on VIG unit assembly type. A lamination system 100 for laminating VIG units by a heating and compression step by means by clamping bodies 7,8 as e.g. previously described, is used. The VIG unit is placed between the clamping bodies 7, 8. These bodies may be part of a clamping assembly also comprising one or more resilient layers (15, 15a, 15b), meshes 16b and/or the like as previously described. As may the system 100 comprise a transportation arrangement 16 and/or a further belt/sheet 16b as described above. These are however not illustrated in FIG. 27b.

In FIG. 27b, the mechanical clamping body displacer(s) 6, such as linear actuators or the like is/are controlled by a displacement control arrangement 6a communicatively coupled to the one or more clamping body displacer(s) 6.

This control arrangement 6a comprises control circuitry which is configured to control the distance between surfaces 4,5 of the bodies 7, 8.

In order not to either damage the lamination assembly (e.g. by providing cracks on the VIG unit's glass sheets or the lamination glass 3 or by compressing the support structures arranged in the evacuated gap of the VIG unit), and in order to at the same time provide a sufficient lamination, the system 100 is configured to adapt the compression pressure applied to the lamination assembly by means of the bodies 7,8 and the one or more clamping body displacers 6 based on a plurality of Pressure presets PRS_1-PRS_n stored in a data storage. As the system 100 may in embodiments of the present disclosure be configured to be used for laminating different sizes of VIG units, the pressure applied by the clamping body displacers 6 may be adapted to the size of VIG unit to be used. This may e.g. at least be based on the Length×Width measure of the VIG unit 11. Other factors such as the type of VIG unit (for example if it is a two layer VIG with one evacuated gap, a three layer VIG comprising two evacuated gaps, a hybrid VIG comprising an evacuated gap between a first and second glass sheet and a gas filled gap between a further glass sheet and one of the first and second glass sheets) may also result in different preset compression pressure values PRS_1-PRS_n.

The preset compression pressure values PRS_1-PRS_n are stored in a data storage DS. A user may hence, by means of a user interface UI, enter or select lamination assembly information such as VIG unit type information TY1n-TYn, such as a length×width size, select a predefined VIG unit type selectable by the interface UI and/or the like.

Based on the entered information, the control arrangement 100 selects a suitable pressure setting PRS1-PRSn stored in the data storage, and assures that this setting is applied by transmitting control signals to the clamping body displacer(s) 6 by means of control signal output OU, preferably while monitoring the clamping pressure applied by received input PRES_STAT.

The pressure settings PRS1-PRSn to be applied may in embodiments of the present disclosure be selected or calculated so that a compression pressure between 1.5 and 3.5 Newton/cm$^2$, for example between 2 and 3 Newton/cm$^2$, such as between 2.4 and 2.8 Newton/cm$^2$ is applied, and this may be controlled by selecting or calculating a pressure setting PRS1-PRSn corresponding to the VIG unit type such as a VIG size defined by a surface 10a, 10b area.

In further embodiments of the present disclosure a sensor arrangement for determining lamination assembly information may be used (not illustrated). This may e.g. comprise a barcode reader (e.g for matrix barcodes or conventional barcodes), an RFID reader or the like for automatically reading Identification Information (not illustrated) of the lamination assembly 10, e.g. by reading a VIG unit identifier on the VIG unit or on the lamination glass sheet 3, or placed between the lamination glass sheet 3 and the VIG unit 11. The sensor arrangement may e.g. in embodiments of the present disclosure be placed to read identification information on lamination assemblies arranged at a transport member (not illustrated in FIG. 27b, see e.g. FIG. 5) prior to entering in between the clamping bodies. Based on this information, the control arrangement 6a may retrieve relevant information from a data storage, e.g. the data storage DS relating to e type TY1n-TYn of VIG unit. Also, or alternatively, the sensor arrangement may be used for measuring the surface area if the VIG unit assembly, e.g. the area of the surface 10a as illustrated in other figures described above. Based on this retrieved information, the arrangement 6a such as the controller CT may calculate or select a compression pressure setting to be applied during the heating step for the respective lamination assembly type TY1n-TYn.

In still further embodiments of the present disclosure, the control arrangement 6a may, instead of selecting presets PRS1-PRSn, be configured to calculate a pressure setting. This may be provided each time a user provides one or more new selections by means of the User Interface UI, and/or when/if a sensor arrangement provides new lamination assembly information as mentioned above. The controller CT may hence provide a clamping pressure calculation having e.g. at least a predefined constant and a variable such as the VIG unit size information (such as length and width) as calculation parameters.

FIG. 28 illustrates schematically an embodiment of the present disclosure, where the heated lamination assembly 10 is subjected to a forced cooling step. The cooling step cools the lamination layer 2 to harden the lamination layer 2 after a heating step provided according to e.g. one or more embodiments described above, for example by means of a "heat and clamp" solution where clamping bodies 4, 5 are used to provide a compression pressure F during heating and softening of the lamination layer 2 as disclosed in relation to one or more of the figures described above.

The heated lamination assembly 10 enters a cooling chamber 300 enclosed by walls 301 through an inlet 302a by means of a transport system 16 such as a conveyer. The conveyer 16 may in embodiments of the present disclosure be the same, or be arranged in continuation of a transport solution 16 used during the heating step. See e.g. FIG. 5. While the heated lamination assembly 10 is placed in the chamber/compartment 300, it is subjected to a forced cooling provided by means of a cooling system 350. The cooling system 350 in FIG. 28 is configured to provide a convection cooling by means of a convection cooling arrangement 320, and a conduction cooling by means of a conduction cooling arrangement 310 respectively.

The lamination glass sheet 3 of the lamination assembly 10 supports on a surface 311 of the conduction cooling arrangement 310 to provide a heat transfer from the lamination glass sheet 3 to the conduction cooling arrangement 310, in the present example through the transport system 16 (but this 16 may be omitted in further embodiments). Hence, heat is transferred from the lamination layer 2, through the lamination glass sheet 3, and thus from the outer surface 10b of the lamination assembly 10 to the conduction cooling arrangement 310, thereby cooling the lamination layer 2 to harden the lamination layer 2.

The conduction cooling arrangement 310 provides a forced flow of a cooling fluid 310 such as a gas or a liquid, such as water, oil or another suitable cooling liquid inside guiding tunnels or pipes 313 for guiding the cooling fluid 312 arranged or embedded in a cooling body 314 such as a metal body, e.g. an aluminium, brass or copper body 314. The cooling fluid 312 is circulated in the guiding tunnels/pipes 313 by means of a pump or a blowing unit (not illustrated in FIG. 28), hence transferring the heat from the lamination assembly 10 away from the lamination assembly 10 and cooling body 314, e.g. to a cooling device configured to reduce the temperature of the returned cooling fluid 312 before it re-enters the tunnels/pipes 313.

The convection cooling arrangement 320 comprises a ventilation system 321 for moving the ambient gas such as air over the other outer surface 10a of the lamination assembly, to cool this surface 10a. This gas may in embodiments of the present disclosure be heated to a desired, higher temperature by use of a heating arrangement and/or or reduced in temperature by a cooling arrangement.

In embodiments of the present disclosure, the cooling step may be provided until the lamination layer 2 reaches a temperature where it is hardened again after the heating step. This temperature may vary dependent on the selected material for the lamination layer. In embodiments, the cooling step may be considered finished when the lamination layer 3 has a temperature below 95° C., such as around 90° C., or such as around 85° C.

Naturally, further forced cooling may be provided in the chamber 300 or at another location in order to e.g. fast get the lamination assembly's temperature to a point where it may be more easy, cost efficient and/or safe to handle by human hands or by automation system components. Such components may e.g. comprise robotic equipment utilizing e.g. suction cups or the like for handling and rearranging the cooled lamination assembly that now constitutes a laminated VIG unit.

The VIG unit 11 may thermally deflect if it is subjected to a temperature difference between the glass sheets 11a, 11b due to a rigid edge seal between the glass sheets. According to embodiments of the present disclosure, it may hence be relevant to provide the cooling of the sheet 3 and the glass sheet 11a in order to obtain a desired deflection condition of the VIG unit at the point where the lamination layer 2 hardens, to provide a more controlled stress condition in the final laminated VIG unit. This may e.g. be controlled by providing a controlled cooling temperature at the conduction cooling system 210, and by the convection cooling system 320, to control the thermal deflection of the VIG unit around/in a desired temperature range that may be selected based on the viscosity profile (e.g. given by a Tg (T glazing) of the lamination material 2.

It is generally understood that the difference in temperature between the VIG unit's glass sheets 11a, 11b may preferably be kept below 65° C., such as below 45° C., for example below 20° C., for example below 10° C. by means of said cooling system 350 during at least 50% such as at least 70%, e.g. at least 90% of the time of said cooling step. This may e.g. be provided so that the difference in temperature between said at least two glass sheets (11a, 11b) of the vacuum insulated glass unit) is kept below 45° C., such as below 20° C., for example below 10° C. by means of the cooling system 350, at least during the last 50%, such as during the last 25%, such as during the last 10% or last 5% of said cooling step by means of said cooling system before the lamination layer hardens.

The cooling system 350 may be configured so that the conduction cooling system 310 in embodiments of the present disclosure forces a larger heat transfer per time unit from the outer major surface 10b (the lamination side) of the lamination assembly 10, when compared to the heat transfer per time unit provided from the oppositely directed outer major surface 10a (unlaminated side) of the lamination assembly 10 subjected to the convection cooling by the convection cooling system 320.

In one or more aspects of the present disclosure, the total time from the heating step to soften the lamination layer 2 to bond it to the VIG unit 11 and the further sheet 3 as e.g. described previously, is initiated, and to the cooling step by means of the cooling system 350 is terminated and the lamination layer 2 is thus hardened again, may be less than 60 minutes, such as less than 40 minutes, for example less than 25 minutes.

It is generally understood that the cooling may be provided as a batch process in the chamber 300 or a substantially continuous process where multiple lamination assemblies are moved through the chamber 300, e.g. in a row on the transport system 16.

The now cooled lamination assembly 10 then leaves the cooling chamber 300 through an outlet 302a by means of the transport system 16.

FIG. 29 illustrates schematically a cooling step by means of a cooling system 350 according to further embodiments of the present disclosure, where convection cooling is provided at both outwardly facing major surfaces 10a 10b of the lamination assembly 10. A temperature controlled cooling gas 323a is supplied a plurality of gas nozzles/outlets 322, so as to cool the upwardly facing major surface 10a of the lamination assembly 11. In further embodiments, the plurality of nozzles may be omitted and a more indirect flow of gas 323a may be provided, e.g. by circulating the gas in the chamber 300. In the present case, the exposed surface 10a of the lamination assembly 10 facing upwards is the major outer surface 11a of the un-laminated side of the lamination assembly, and may thus be the outermost surface of the glass sheet 11a of the VIG unit.

The gas 323a is supplied through gas nozzles 322 distributed along the length of the cooling chamber 300, so as to blow and distribute cooling gas 323a to the surface 10a to cool the surface.

The lamination glass sheet 3 supports on a gas-permeable, perforated conveyer belt 16, and cooling gas 323b is supplied to the outer major surface 10b of the lamination glass sheet through a plurality of nozzles 324. The temperature and/or the amount of gas 323a, 323b supplied per time unit through the nozzles 322 and 324 respectively may be different in embodiments of the present disclosure. This may e.g. be set/adjusted so as to provide a faster cooling/heat transfer per time unit of the surface 10b compared to the cooling per time unit surface 10a during at least a part of the cooling step in the chamber 300. This may e.g. be achieved by providing a larger flow of gas 323b to the surface 10b of the lamination glass to cool the lamination layer 2, compared to the flow of gas 323b provided to surface 10a.

FIG. 30 illustrates schematically an embodiment of the present disclosure, where the cooling step is provided by mainly providing a convection cooling by the cooling system 350 to the lamination glass sheet 3 by means of a flow of cooling gas 323b directed towards this surface 10b. Some of the cooling gas reaches the surface 10b through a gas permeable conveyer arrangement 16. This gas cools the glass sheet's surface 3, and thereby the lamination layer 2. Some of this cooling gas is subsequently distributed to the other major surface 10a, hence also cooling this surface of the lamination assembly 10.

It is generally to be understood that a ventilator/blowing arrangement 321 may generate the flow of cooling gas 323b, and that a suitable heater or cooler 325 may control the temperature of the supplied gas 323b.

FIG. 31 illustrates schematically an embodiment of the present disclosure, where the cooling step is provided by means of conduction cooling as e.g. disclosed in relation to FIG. 28 to lower the temperature of the lamination glass sheet 3 and hence the lamination layer 2.

The conduction cooling is provided by means of a fluid such as a liquid circulated in a tube/tunnel arrangement 313 by means of a pump 341 or a blowing unit (not illustrated in FIG. 28). This cools the cooling body 314 and hence reduces the temperature of the lamination glass 3.

The pump/flow generator 341 supplies the cooling fluid into the tunnel arrangement 313 of the body 314. When the fluid leaves the cooling body, it is returned in a guiding pipe 315 to a cooling arrangement 342 which reduces the temperature of the cooling fluid before the fluid is reintroduced into the cooling body. The pump may be controlled by the cooling controller 340, and may operate substantially continuously during the cooling process. The cooling arrangement 342 may be controlled by the cooling controller during the cooling step in order to control and regulate the temperature of the cooling fluid provided to the cooling body 314. This regulation may be provided to obtain a substantially continuous fixed temperature of the cooling fluid within a relatively narrow temperature variation range, such as within ±10° C., for example within ±5° C. relative to a target temperature.

Alternatively, the temperature of the recirculating cooling fluid may be adjusted over time in order to control the speed of the cooling at different time points during the cooling step. This regulation may in further embodiments of the present disclosure be provided by the cooling controller 340 based on feedback from one or more temperature sensors (not illustrated) such as thermocouples or the like measuring the temperature of the fluid and/or the cooling body at or near the surface providing the cooling of the lamination assembly.

As can be seen, an active, controlled cooling of the surface 10a facing away from the lamination layer of the cooling body the cooling controller 340 may be provided by means of convection cooling as previously described. Here, the cooling controller 340 may control a ventilation/blowing arrangement 321 in order to increase or reduce the amount of cooling gas such as air provided per time unit. Additionally, the cooling controller 340 may provide a temperature control of the cooling gas by means of a gas temperature regulation unit such as a gas heater or cooler 325 which controls the temperature of the supplied cooling gas 325b. This temperature may be based on sensor feedback (not illustrated).

It is generally understood that the cooling of the first 10a and/or second surface 10b of the lamination assembly may be controlled by the same or different cooling controllers 340. The control may comprise a closed loop control circuitry such as a PD (proportional-derivative controller) or PID (proportional-integral-derivative controller), or any other suitable type of closed loop control circuitry configured to control the heating of the surfaces 10a, 10b respectively to the different temperatures. Alternatively, the control may be less advanced and e.g. rely on an on/off control including temperature hysteresis control, based on pre-set, fixed temperatures of the cooling gas or liquid and/or amount of gas or liquid supplied, so as to cool the outer major surfaces 10a, 10b.

FIG. 32 illustrates schematically a graph according to embodiments of a cooling step provided by means of the cooling system 350, according to embodiments of the present disclosure. The dash/dotted line L1 represents the temperature of the laminated glass sheet 11b of the VIG unit. It is in the figure, for simplicity, assumed/estimated that the temperature (T) of the laminated glass 11b of the VIG unit 11 is substantially the same as the lamination layer 2 temperature. The solid line L2 represents the temperature of the un-laminated glass sheet 11b of the VIG unit. The Y-axis denoted (T) represents a temperature in e.g. ° C., and the x-axis denoted tc represents the time elapsed time during the cooling step.

At the time to, the cooling step is initiated by the cooling system. The laminated side of the VIG unit where the lamination layer 2 and the lamination sheet 3 is placed has a higher thermal capacity/heat capacity than the other, un-laminated side of the VIG unit. Accordingly, reducing the temperature of the laminated side of the VIG unit to cool the lamination layer requires more heat transferred from this side, compared to the cooling of the other un-laminated side, to reach the same target temperature Tta.

As can be seen, the temperature of the un-laminated glass sheet 11a (L2) may relatively fast be reduced to be within a desired temperature hysteresis (defined between the dashed, horizontal hysteresis lines H1, H2) set based on a target temperature Tta (dotted horizontal line) of the lamination layer 2. See time tc1 where the temperature of the unlaminated glass sheet L2 reaches within the hysteresis at t1. For example, in embodiments of the present disclosure, a convection cooling arrangement may be set to a temperature around this target temperature Tta, so that the cooling gas is kept at that temperature, and keep it there, at least until the lamination layer 2 reaches within the same temperature range given by the hysteresis H1, H2.

It is generally understood that the target temperature Tta may be selected based on the viscosity characteristics of the lamination material and/or the desired end temperature of the lamination assembly. The target temperature Tta may e.g. be set based on a temperature around which the lamination layer 2 may be determined to be sufficiently hardened so that subsequent thermal deflection of the laminated VIG does not affect the lamination, at least within a selected temperature range.

Since a larger amount of heat needs to be transferred away from the laminated side of the VIG unit due to the higher heat capacity, to reach the same temperature within the target temperature Tta based hysteresis H1, H2, it may take a longer time to reach this temperature hysteresis, see L1. Eventually, it will reach a temperature within the hysteresis H1, H2, (see tc2) and here, the lamination layer may be sufficiently hard.

In further embodiments of the present disclosure, the time from tc0 and until tc2 for the lamination layer 2 to reach within the hysteresis H1, H2 may be reduced by forcing a larger heat transfer per time unit from the laminated side 10b, when compared to the heat transfer per time unit provided from the oppositely directed un-laminated side 10a, see FIG. 33. Alternatively the same heat transfer per time unit may be provided to both sides 10a, 10b, as illustrated in FIG. 32, though providing a longer time delay between tc1 and tc2 and hence a longer process time.

Since the temperature of the un-laminated glass sheet 11a of the VIG unit (in FIG. 32) is kept at or near the desired target temperature Tta within H1-H2, the VIG unit's thermal deflection may be very small when the glass sheet 11b reaches the same temperature range. Hence, a stress in the lamination layer of the final VIG unit due to thermal deflection may be low or substantially zero when the VIG unit glass sheets have substantially the same temperature, this may depend on the characteristics of the lamination layer material.

Generally, in aspects of the present disclosure, the cooling may be adapted or controlled to ensure that the temperature difference Δt_vig between the VIG unit glass sheets 11a, 11b is not too large during the cooling, to reduce the risk of damaging or weaken the VIG unit. Hence, in embodiments of the present disclosure, during the controlled cooling so as to harden the lamination layer 2, the difference in temperature between said glass sheets 11a, 11b of the vacuum insulated glass unit 11 enclosing the evacuated gap may be kept below 65° C., such as below 45° C., for example below 20° C., for example below 10° C. (measured at the substantially same point in time) by means of said cooling system.

This may in embodiments of the present disclosure apply for at least 50% such as at least 70%, e.g. at least 90% of the time, such as at least 99% of the time of said cooling step, which is ended at the time tc3. In FIG. 32, the temperature difference Δt_vig between the VIG glass sheets 11a, 11b is illustrated at the point in time tc1.

At tc3 the cooling step to make the lamination layer 2 harder is considered ended, in the present example at/near the lower temperature threshold H2.

A further, subsequent cooling after the time point tc3 may however in further embodiments of the present disclosure be provided to reduce the temperature of the lamination assembly with the now hardened lamination layer 2, see FIG. 32. This may for example be regulated by the cooling controller 340 as previously described or by moving the lamination assembly to a further location.

FIG. 33 illustrates schematically an embodiment of the present disclosure, where a more intense cooling is provided at the further sheet 3 compared to the cooling provided at the un-laminated side 10a of the VIG unit not comprising a lamination layer and further glass sheet. Hence, a larger heat transfer per time unit from the further sheet is obtained when compared to the heat transfer per time unit provided from the oppositely directed outer major surface 10a of the lamination assembly 10. This is despite the larger heat capacity on the laminated side given by the presence of the lamination layer that needs to be cooled to hardened, and also the further glass sheet 3.

Hence the time difference Δtc=tc2−tc1 between the point in time t1 where the VIG unit glass sheet 11a at the un-laminated side (L2), and the point in time t2 where the where VIG unit glass sheet at the laminated side (L1), reaches the temperature range where the lamination layer 2 hardens, in the present example within the hysteresis H1, H2, may be reduced. This may hence reduce the lamination process time while also providing a controlled cooling that may not e.g. risk damaging the VIG unit. Also or alternatively, it may help to provide a fast cooling while reducing the risk of unwanted stress conditions in the final laminated VIG unit when subsequently subjected to certain climatic conditions.

The cooling step (starting at time t0) and until the lamination layer 2 hardens sufficiently (at e.g. time tc3), and/or until the lamination assembly reached desired target "handling temperature", such as below 60° C. or below 45° C., may e.g. be provided for between 4 minutes and 60 minutes, such as between 6 minutes and 30 minutes, for example between 8 minutes and 15 minutes. For example, the cooling step in the chamber 300 may in aspects of the present disclosure be provided for a time less than 60 minutes, such as less than 30 minutes, for example less than 20 minutes such as less than 15 minutes. A further subsequent cooling after tc3 to further reduce the temperature of the lamination assembly may also be provided for a longer time subsequently after the hardening of the lamination layer 2 as illustrated in e.g. FIGS. 32 and 33.

In embodiments of the present disclosure, the cooling step may be provided from t0 and until the lamination assembly reached a temperature below 60° C. or below 45° C. at both surfaces 10a, 10b, and the time to reach this may be less than 60 minutes, such as less than 30 minutes, for example less than 20 minutes such as less than 15 minutes.

FIG. 34 illustrates schematically a cooling profile graph according to embodiments of the present disclosure. The cooling profile CP1 represents the temperature setting, and temperature of the cooling fluid/medium used for cooling the laminated side of the VIG unit, and the dash/dotted line L2 represents the temperature of the laminated VIG unit glass sheet 11b to which the lamination layer 2 is attached during the heating step.

As can be seen in FIG. 34, the temperature of the cooling fluid is initially set to a lower temperature which is significantly lower than a desired temperature target temperature Tta for the lamination assembly. It may for example be more than 30° C. such as more than 40° C., e.g. more than 50° C. below the target temperature Tta of the lamination material 2. For example, Tc1 may be below 50° C., such as below 40° C., e.g. below 30° C. Tta. This provides a faster cooling of the further glass sheet 3 than if the temperature was for example just 5° C. or 10° C. below the Tta, or at Ta, and hence a higher temperature transfer per time unit may be achieved, which is also illustrated By L1 where the temperature reduction per time unit is higher from t0 to ts than after the temperature of the cooling fluid is increased to Tc2 at the time ts. When the temperature of the cooling fluid is increased to Tc2, e.g. to be around the Tta or between 5° C.-15° C. below the target temperature Tta, this may help to reduce the heat transfer per time unit, and hence so to say avoid or reduce an undesired or unacceptable "overshot" situation for the temperature L1. Hence, this may help to reduce the time difference Δtc, see e.g. FIG. 33.

FIG. 35 illustrates an embodiment of the present disclosure wherein the temperature of the cooling fluid (see cooling profile CP) is maintained substantially constant during the cooling step from tc0-tc3. This provides a longer cooling time for the glass sheet 11b to reach the time tc2 where the temperature of the VIG glass sheet and the lamination layer 2 gets within the desired Target temperature Tta range (defined between Hysteresis H1 and target temperature in FIG. 35).

Though, the constant cooling temperature Tc1 may be lowered, which may speed up the cooling process and hence reduce the cooling time measured between t0-t2. In FIG. 36 (illustrating an embodiment of the present disclosure), this is the case, and hence the cooling time between tc0-tc2 may be reduced (ca seen when compared to FIG. 35), which may also help to reduce the overall cooling time for the lamination assembly.

In FIG. 36 (illustrating an embodiment of the present disclosure), the significantly lower temperature Tc1 (see FIG. 36) is maintained both during and after reaching time tc2, and this provides a continuous fast reduction in temperature through the temperature range around the target temperature Tta. This may be acceptable, but may demand a more controlled temperature regulation of the temperature of the unlaminated VIG unit glass sheet 11a, so as to e.g. control the final stress conditions caused by the VIG unit's thermal deflection and/or to avoid a too large temperature difference between the glass sheets 11a, 11b of the VIG unit 11.

In FIG. 35, a further embodiment of the present disclosure is illustrated, where, after t3 the cooling step to harden the lamination layer may be considered ended (to e.g. provide a controlled hardening of the lamination layer in a predefined temperature range), the heating profile temperature is reduced to further cool the VIG unit to a more advantageous handling temperature such as below 60° C. or below 45° C. It is generally understood that the cooling step may be considered ended when the temperature of the lamination layer 2 is at the target temperature Tta of the lamination layer material, or a predefined temperature below, such as about 5° C.-15° C. below this rated temperature.

In further embodiments of the present disclosure, the cooling step may be considered ended when the lamination assembly's surfaces 10a, 10b reaches a "handling temperature" such as a temperature below 60° C. such as below 45° C.

FIG. 37 illustrates schematically a lamination solution comprising a heating step followed by a cooling step according to various embodiments of the present disclosure. Initially, a lamination assembly 10 as previously disclosed is provided. This is first subjected to a heating step at a heating location 100 so as to soften the lamination layer to provide a bonding between the VIG unit 11 and the lamination layer 2, and a bonding between the further sheet 3 and the lamination layer 2. This heating step may in embodiments of the present disclosure be provided in any suitable way, such as heating and clamping between clamping bodies, in a pressure chamber, by prior evacuation to remove gas bobbles between the lamination layer and the further sheet, and a subsequent heating or the VIG unit in at the location 100 as for example previously described in relation to one or more of the FIGS. 1-27b. It is however understood that other heating solutions at location 100 may be provided in further embodiments.

After this heating, the heated lamination assembly 10 with the heated and soft lamination layer 2 is moved to the cooling location 300, e.g. by a conveyor solution 16 such as a conveyer band solution, roller conveyers or the like on which the assembly 10 supports. Here, it is subjected to a cooling step as e.g. previously described. This is obtained by a cooling system 350 providing a controlled cooling, such as a forced cooling, of one or both major outer surfaces 10a, 10b of the heated lamination assembly so as to cool the heated lamination assembly to harden the lamination layer 2. Then the lamination assembly with the hardened lamination layer 2 leaves the cooling location 300, possibly after a further cooling to further reduce the temperature of the lamination assembly to a temperature where it may more easily be handled by automation equipment.

FIG. 38 illustrates schematically an embodiment of the present disclosure where a controlled cooling is provided after the heating step at the location 100, e.g. as previously described. Here the cooling step at the location 300 is provided as a continues cooling process where the laminated VIG unit is subjected to different cooling conditions at different cooling zones Z1-Zn from the start and to the end of the location 300 such as one or more cooling chambers.

Embodiments of this are illustrated in FIG. 39 in more details where cooling is provide by convection cooling at three Zones Z1-Zn, but it is generally understood that it may also be two zones or more than three zones in further embodiments, at one or both sides of the VIG unit.

For example, if the system 300 illustrated in FIG. 38 or 39 in embodiments of the present disclosure is used for providing the cooling profile CP1 illustrated in FIG. 34, Zone 1 may provide the cooling from the time tc0 to the time ts, the zone Z2 may be used for providing the cooling from the time ts to the time tc3, and the zone Zn may be used for providing the further cooling after the cooling step, i.e. after the time point tc3. Alternatively, this may be obtained in the same chamber in further embodiments.

In FIG. 39, a plurality of nozzles are provided to cool both the upwardly facing surface 10a, and the downwardly facing surface 10b in the first Zone 1a. The temperature of the cooling gas may be controlled by the heater or cooler 325, and/or the amount of cooling gas supplied per time unit may be controlled by the blowing unit 321. It is understood that the setting of the temperature of the cooling gas and/or the setting of the amount of cooling gas supplied per time unit may either be different or the same for both outer major surfaces 10a, 10b. Then the lamination assembly 10 enters the second, subsequent zone, e.g. as illustrated through an opening in a partition arrangement separating the zones Z1, Z2 as illustrated, and/or through an air curtain (not illustrated). Here, a further cooling to harden the lamination layer is provided, e.g. by means of a different temperature of the cooling gas and/or the setting of the amount of cooling gas supplied per time unit compared to the Zone Z1, and this may apply for both or one of the surfaces 10a, 10b of the lamination assembly. Then the lamination assembly enters the Zone Z3 to further cool to harden the lamination layer, or to reduce the temperature of the hardened lamination layer 2 and the rest of the VIG unit to a lower temperature before it leaves the outlet 302b.

The conveyer arrangement 16 may be moved with a continuous speed (without stops) from the inlet 302a to the outlet 302b, or may be moved with, e.g. predefined, time intervals, so as to move the lamination assemblies on the arrangement 16 between the zones Z1-Zn. It is understood that the conveyer arrangement may also comprise a plurality of individually controllable subparts to be able to adjust the feeding of the individual lamination assembly through the zones Z1-Zn.

It is to be understood that in further embodiments of the present disclosure, it may be a conduction cooling (see e.g. FIG. 40) or another cooling solution used for cooling at least one of the sides 10a, 10b of the lamination assembly 10, as e.g. previously described, at one or more of the zones Z1-Zn and the type of cooling (e.g. convection cooling, conduction cooling or the like) may be varied or be the same at the different zones Z1-Zn. For example, at the first zone Z1, the conduction cooling may be used to cool the further sheet 3, and at the second Z2 and/or third zone Zn, it may be convection cooling that is used to cool the same sheet 3. For example, various cooling solutions as disclosed in relation to FIGS. 28-31 may be used for the different zones Z1-Zn and may be different for these zones.

The different zones Z1-Zn may in embodiments of the present disclosure hence subject the lamination assembly 10 to different cooling environments, e.g. by providing different cooling temperatures at the different zones, by providing a different amount of cooling gas (in case of convection cooling) by a forced cooling at the different zones, by shifting between convection and conduction cooling and/or the like.

FIG. 40 illustrates schematically an embodiment of the present disclosure, where the cooling step is provided at different zones Z1-Zn as described In relation to e.g. FIGS. 38 and 39. Here, the cooling of the downwardly facing surface 10b of the VIG unit, e.g. the side where the further sheet and lamination layer 2 is placed, is provided by conduction cooling systems 310, which are set different for the different zones to e.g. provide a predetermined cooling profile CP1 during the transport of the lamination assembly 10 through the chamber 300. The temperature of the cooling fluid in the conduction cooling systems 310 at the different zones Z1-Zn may hence be set to be different in an embodiment of the present disclosure.

It is generally understood that even though a lamination assembly comprising a further sheet 3 and lamination layer 2 at just one side of the VIG unit and that the other side 10a may hence be unlaminated, is illustrated in the figures and described above, a lamination assembly 10 may also in further embodiments of the present disclosure (not illustrated) comprise a further sheet and a lamination layer arranged at that surface. Such a lamination assembly hence comprises a VIG unit arranged between two lamination layers, and these two lamination layers are together with the VIG unit arranged between two further lamination glass sheets.

While the present disclosure has been described in detail in connection with only a limited number of embodiments or aspects, it should be readily understood that the present disclosure is not limited to such disclosed embodiments. Rather, the present disclosure can be modified to incorporate any number of variations, alterations, substitutions or equivalent arrangements not heretofore described, but which are commensurate in scope with the present disclosure. Additionally, while various embodiments or aspects of the present disclosure have been described, it is to be understood that aspects of the present disclosure may include only some of the described embodiments or aspects or combinations of the various embodiments or aspects. Accordingly, the present disclosure is not to be seen as limited by the foregoing description.

The invention claimed is:

1. A method of providing a laminated vacuum insulated glass unit, wherein the method comprises:
    providing a lamination assembly comprising:
        a vacuum insulated glass unit comprising at least two glass sheets separated by a plurality of support structures distributed in a gap between the glass sheets, and a lamination layer arranged between one of the glass sheets of the vacuum insulated glass unit and a further sheet,
    laminating the further sheet to the vacuum insulated glass unit by heating the lamination assembly so as to provide a single-side laminated vacuum insulated glass unit,
    wherein heating the lamination assembly comprises:
        subjecting the further sheet to a first heating temperature by means of a first heating arrangement, and
        simultaneously subjecting the glass sheet of the vacuum insulated glass unit facing away from the further sheet to a second temperature by means of a second heating arrangement,
    wherein the first heating temperature is higher than the second heating temperature.

2. The method according to claim 1, wherein an initial heating temperature at an outwardly facing major surface of the further sheet is higher than an initial heating temperature at an outwardly facing major surface of the glass sheet of the vacuum insulated glass unit facing away from the further sheet.

3. The method according to claim 1, wherein the heating of an outer major surface of the glass sheet of the vacuum insulated glass unit facing away from the further sheet is time delayed compared to the start of the heating at an outwardly facing major surface of the further sheet, thereby providing that said first heating temperature is higher than the second heating temperature.

4. The method according to claim 3, wherein said further sheet is heated by means of conduction heating, and said time delay provides a delayed conduction heating at the outwardly facing major surface of the glass sheet of the vacuum insulated glass unit facing away from the further sheet.

5. The method according to claim 1, wherein the higher first heating temperature is caused by differences in heat transmissivity between the first heating arrangement and the further sheet, and between the second heating arrangement and the glass sheet of the vacuum insulated glass unit facing away from the further sheet, respectively.

6. The method according to claim 1, wherein the further sheet and the glass sheet of the vacuum insulated glass unit facing away from the further sheet are heated according to different heating profiles.

7. The method according to claim 1, wherein the temperature difference between the first and second temperature is caused at least partly by different temperature settings of the first and second heating arrangements.

8. The method according to claim 1, wherein more thermal heat energy is provided by the first heating arrangement than the second heating arrangement.

9. The method according to claim 1, wherein more thermal heat energy is provided to the further sheet than to the glass sheet of the vacuum insulated glass unit facing away from the further sheet by said heating arrangements during said heating process.

10. The method according to claim 9, wherein the amount of thermal energy provided to the further sheet is at least 1.5 times higher than the amount of thermal energy provided to heat the glass sheet of the vacuum insulated glass unit facing away from the further sheet.

11. The method according to claim 1, wherein the lamination assembly is arranged between first and second heating bodies comprising heating surfaces transferring heat to the the lamination assembly so as to obtain said first and second temperature.

12. The method according to claim 11, wherein said heating bodies comprise clamping bodies configured to be displaced by one or more clamping body displacers to provide a compression pressure.

13. The method according to any of claim 11, wherein one or more resilient layers are arranged between the lamination assembly and at least one of said heating surfaces.

14. A method of providing a laminated vacuum insulated glass unit, wherein the method comprises:
providing a lamination assembly comprising:
a vacuum insulated glass unit comprising at least two glass sheets separated by a plurality of support structures distributed in a gap between the glass sheets, and
a lamination layer arranged between one of the glass sheets of the vacuum insulated glass unit and a further sheet,
arranging said lamination assembly between first and second clamping bodies having respective clamping surfaces, wherein at least one of said clamping surfaces is configured to be displaced by one or more clamping body displacers to change the distance between the clamping surfaces,
wherein a controller controls said one or more clamping body displacers to provide a compression pressure to the lamination assembly with the clamping surfaces,
subjecting the further sheet to a conduction heating between said clamping bodies by means of a first heating arrangement, and subjecting a surface of the lamination assembly facing away from the further sheet to a conduction heating between said clamping bodies by means of a second heating arrangement,
wherein the start of the conduction heating of the surface of the lamination assembly facing away from the further sheet is time delayed compared to the start of said conduction heating of the further sheet.

15. The method according to claim 14, wherein said time delay provides that the further sheet is subjected to a first heating temperature, and that the glass sheet of the vacuum insulated glass unit facing away from the further sheet is subjected to a second temperature,
wherein the first heating temperature is higher than the second heating temperature.

16. The method according to claim 14, wherein said first clamping body comprises said first heating arrangement and wherein said second clamping body comprises said second heating arrangement.

17. The method according to claim 14, wherein the time delayed conduction heating of the surface of the lamination assembly facing away from the further sheet is started by said controller by the controller operating said clamping body displacers to reduce the distance between said clamping surfaces, thereby providing a compression pressure to the lamination assembly by means of the clamping surfaces.

18. The method according to any of claim 14, wherein said time delay provides more thermal heat energy to the further sheet than to the surface of the lamination assembly facing away from the further sheet.

19. A method of providing a laminated vacuum insulated glass unit, wherein the method comprises:
providing a lamination assembly comprising:
a vacuum insulated glass unit comprising at least two glass sheets separated by a plurality of support structures distributed in a gap between the glass sheets, and
a lamination layer arranged between one of the glass sheets of the vacuum insulated glass unit and a further sheet, and
laminating the lamination assembly by simultaneously heating the further sheet using a first heating arrangement and an outer surface of the vacuum insulated glass unit facing away from the further sheet using a second heating arrangement to form a single-side laminated vacuum insulated glass unit, wherein more thermal heat energy is provided to the further sheet than the outer surface of the vacuum insulated glass unit facing away from the further sheet.

* * * * *